US012510529B2

United States Patent
Zühlke et al.

(10) Patent No.: US 12,510,529 B2
(45) Date of Patent: Dec. 30, 2025

(54) METHOD FOR DETERMINING AUTHENTICITY AND ADULTERATION OF MARKED PETROLEUM HYDROCARBONS

(71) Applicant: SICPA HOLDING SA, Prilly (CH)

(72) Inventors: Martin Zühlke, Berlin (DE); Daniel Riebe, Potsdam (DE); Toralf Beitz, Potsdam (DE); Thomas Tiller, Bussigny (CH); Juan Lopez Gejo, Lausanne (CH); Ünige Laskay, St. Sulpice (CH)

(73) Assignee: SICPA HOLDING SA, Prilly (CH)

( * ) Notice: Subject to any disclaimer, the term of this patent is extended or adjusted under 35 U.S.C. 154(b) by 881 days.

(21) Appl. No.: 17/782,463

(22) PCT Filed: Nov. 26, 2020

(86) PCT No.: PCT/EP2020/083470
§ 371 (c)(1),
(2) Date: Jun. 3, 2022

(87) PCT Pub. No.: WO2021/110525
PCT Pub. Date: Jun. 10, 2021

(65) Prior Publication Data
US 2023/0103579 A1    Apr. 6, 2023

(30) Foreign Application Priority Data
Dec. 3, 2019 (EP) .................................. 19213124

(51) Int. Cl.
*G01N 33/28* (2006.01)
*C10L 1/00* (2006.01)
*C10L 1/16* (2006.01)

(52) U.S. Cl.
CPC .......... *G01N 33/2882* (2013.01); *C10L 1/003* (2013.01); *C10L 1/1608* (2013.01); *C10L 2230/16* (2013.01)

(58) Field of Classification Search
CPC ................................................ G01N 33/2882
USPC ......................................................... 436/56
See application file for complete search history.

(56) References Cited

U.S. PATENT DOCUMENTS

| | | | |
|---|---|---|---|
| 4,141,692 A | 2/1979 | Keller | |
| 5,981,283 A * | 11/1999 | Anderson, II | G01M 3/20 436/27 |
| 6,740,874 B2 | 5/2004 | Döring | |
| 9,366,661 B1 | 6/2016 | Conroy et al. | |
| 2007/0222373 A1 * | 9/2007 | Arakane | H05B 33/14 544/336 |
| 2008/0118982 A1 | 5/2008 | Forshee et al. | |
| 2011/0290997 A1 | 12/2011 | Green et al. | |
| 2012/0090225 A1 | 4/2012 | Green et al. | |
| 2013/0082173 A1 | 4/2013 | Cadieux, Jr. et al. | |
| 2014/0008164 A1 | 1/2014 | Lai | |
| 2014/0179955 A1 | 6/2014 | Green et al. | |
| 2016/0178602 A1 * | 6/2016 | Gras | G01N 30/468 73/23.39 |

FOREIGN PATENT DOCUMENTS

| | | |
|---|---|---|
| EP | 0120641 | 10/1984 |
| JP | 1074479 | 3/1998 |
| TW | 201017162 | 5/2010 |
| WO | 2004068113 | 8/2004 |
| WO | 2012153132 | 11/2012 |
| WO | 2012154646 | 11/2012 |
| WO | 2013003573 | 1/2013 |
| WO | 2014008164 | 1/2014 |
| WO | 2014081556 | 5/2014 |

OTHER PUBLICATIONS

Riebe et al., "Atmospheric pressure chemical ionization of explosives induced by soft X-radiation in ion mobility spectrometry: mass spectrometry investigation of the ionization reactions of drift gasses, dopants and alkyl nitrates," J. Mass Spectrom. (2016), 51, 566-577.
Brendler et al., "Investigation of neuroleptics and other aromatic compounds by laser-based ion mobility mass spectrometry" Anal. Bional. Chem. 405, 7019, 11 pages.
Herod A A et al: " Fractionation by planar chromatography of a coal tar pitch for characterisation by size-exclusion chromatography, UV fluorescence and direct-probe mass spectrometry", Journal of Chromatography A, Elsevier, Amsterdam, NL, vol. 708, No. 1, Jul. 28, 1995 (Jul. 28, 1995) , pp. 143-160, XP004038799, ISSN: 0021-9673, DOI: 10.1016/0021-9673 (95) 00356-R.
Anonymous: "1,6-Diphenylhexatriene", Jun. 2, 2017 (Jun. 2, 2017), XP055702764, 4 pages.
International Report and Written Opinion issued with respect to application No. PCT/EP2020/083470.

* cited by examiner

*Primary Examiner* — Arlen Soderquist
(74) *Attorney, Agent, or Firm* — MUNCY, GEISSLER, OLDS & LOWE, P.C.

(57) ABSTRACT

The present invention provides a method for determining the authenticity of a petroleum hydrocarbon allegedly comprising at least one specific chemical marker, as well as a method for determining adulteration of a petroleum hydrocarbon marked with at least one specific chemical marker. The methods claimed and described herein rely upon the use of specific chemical markers in combination with laser ionization at a wavelength of between about 300 nm and about 370 nm coupled with ion mobility spectrometry or with mass spectrometry.

17 Claims, 37 Drawing Sheets i)

ii)

iii)

i)

ii)

iii)

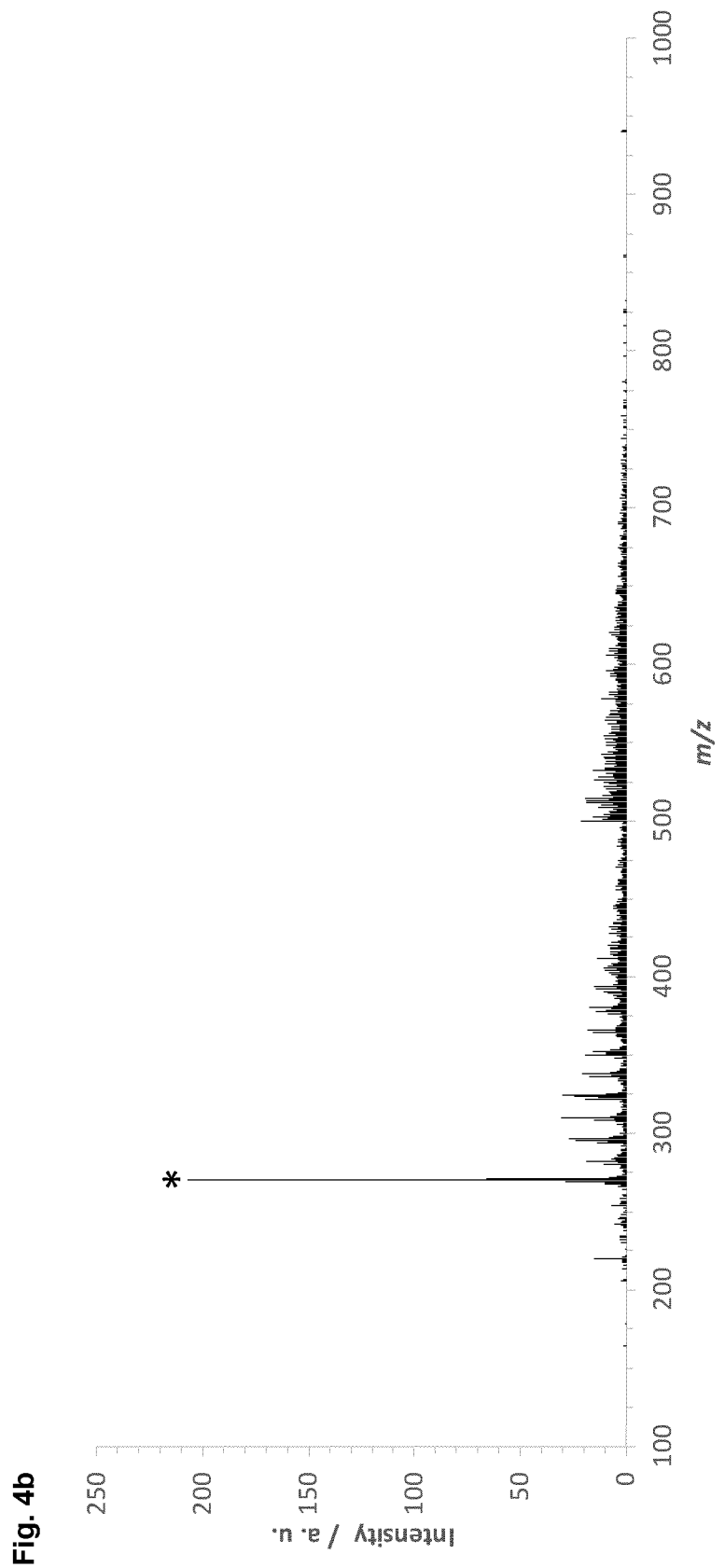

i)

ii)

iii)

i)

ii)

iii)

METHOD FOR DETERMINING AUTHENTICITY AND ADULTERATION OF MARKED PETROLEUM HYDROCARBONS

FIELD OF THE INVENTION

The present invention relates to the technical field of methods for determining authenticity of an allegedly marked petroleum hydrocarbon and methods for determining adulteration of a marked petroleum hydrocarbon.

BACKGROUND OF THE INVENTION

Marking of petroleum hydrocarbons with the scope of auditing the custody transfer of such products, to prevent and/or prove theft and/or counterfeiting is of great importance for the petroleum industry. In addition, marking of petroleum hydrocarbons may be also used to control whether a distributor has sold a low-priced petroleum hydrocarbon as a more expensive petroleum hydrocarbon or has used a low-priced petroleum hydrocarbon to dilute a more expensive petroleum hydrocarbon.

Additionally, national governments are interested in technical solutions that allow to determine whether applicable taxes have been paid on petroleum hydrocarbons, whether tax exempt petroleum hydrocarbons are being sold as tax paid petroleum hydrocarbons or if they are being used to dilute tax paid petroleum hydrocarbons, and whether a petroleum hydrocarbon, which meets environmentally mandated specifications has been diluted with a product that does not meet such specifications.

A limited number of methods for determining authenticity and adulteration of chemically marked petroleum hydrocarbons have been described.

For example, the use of gas chromatography for detecting the presence of 4,4'-bis(benzyl)-1,1'-biphenyl based chemical markers in liquid hydrocarbons has been described (US2014008164A1). Additionally, the use of gas chromatography coupled with mass spectrometry for detecting 1,3-diphenyl-2-buten-1-one based chemical markers (US2011290997A1), brominated or fluorinated benzene and naphthalene based chemical markers (WO2012153132A1), bis(phenoxymethyl)-1,1'-biphenyl based chemical markers (US20120090225A1), ortho-phenyl phenol ether based chemical markers (WO2012154646A1), tritylated alkyl aryl ether based chemical markers (WO2014008164A1), bisphenol A substituted benzyl ether based chemical markers (US20140179955A1), deuterated bis(4-(alkyloxy)phenyl) sulfane based chemical markers (U.S. Pat. No. 9,366,661B1), as well as deuterated 4,4'-oxybis((alkyloxy)benzene based chemical markers (U.S. Pat. No. 9,366,661B1) in a petroleum hydrocarbon marked with said chemical marker is known. Detection of perfluorinated $C_9$-$C_{18}$ polycyclic hydrocarbons (EP0120641A2) and chlorinated hydrocarbons and chlorocarbons (U.S. Pat. No. 4,141,692) in a petroleum hydrocarbon by gas chromatography coupled with electron capture has been also disclosed. Furthermore, international patent application publication number WO2013003573A1 teaches the use of gas chromatography coupled with flame ionization for detecting bis(alkyloxy)-1,1'-biphenyl based chemical markers in a marked petroleum hydrocarbon and the international patent application publication number WO2014081556A1 teaches the use of two-dimensional gas chromatography coupled with mass spectrometry for detecting alkyl aryl ethers and alkenyl aryl ethers in a petroleum hydrocarbon.

The main disadvantage associated with the use of the gas chromatography (GC) for detecting or quantifying a chemical marker in a marked petroleum hydrocarbon is that the GC column used in the separation of the marked petroleum hydrocarbon components has to be frequently replaced as a result of the contaminations caused by the high amount of petroleum hydrocarbon components injected on the column. The detection and quantification methods based on gas chromatography coupled with mass spectrometry (GC-MS) additionally require the frequent cleaning and/or replacement of the ionization source of the mass spectrometer.

Multi-dimensional methods, such as of two-dimensional gas chromatography coupled with mass spectrometry, represent an improvement as compared with single dimensional gas chromatography coupled with mass spectrometry, as only a fraction of the analyzed marked petroleum hydrocarbon sample is passed through the gas chromatography-mass spectrometer, the majority of fuel being diverted to waste, after separation on the first GC-column of the system. Nevertheless, back-flushing of the second GC-column between two samples is still very much time consuming. In addition, two-dimensional gas chromatography-mass spectrometry measurement requires the use of a deans switch to direct the sample onto the first or onto the second GC-column, which in turn causes a decrease in injection to injection reproducibility.

International patent application publication number WO2004068113A2 describes the use of ion mobility spectrometry for detection of a chemical marker of general formula RCAR', wherein R is a compound selected from the group consisting of alkyl, olefin, aryl, heterocycle and hydrogen; R' is a compound selected from the group consisting of alkyl, olefin, aryl, heterocycle and hydrogen; and wherein A is a compound selected from the group consisting of ketones, alcohol, amines, cyano, sulfate, nitrile, nitrate, halogen, organic acid, mercaptan, aldehyde, formyl, thiocyano, and isothiocyano. The ion mobility spectrometry detection method described by WO2004068113A2 uses nickel 63 ($^{63}$Ni) as ionization source, which results in unselective ionization of the sample leading to difficult identification of the marker ion peak among the fuel matrix ion peaks.

Because of the different limitations of the currently available analytical methods used for determining the authenticity and adulteration of marked petroleum hydrocarbons, there is a constant need for additional chemical markers and additional methods for detecting and quantifying said chemical markers to satisfy the high demand from government bodies and the petroleum industry. The problem addressed by the present invention is to provide additional methods for determining the authenticity and adulteration of marked petroleum hydrocarbons.

SUMMARY OF THE INVENTION

Accordingly, it is the object of the present invention to provide a method for determining authenticity of a petroleum hydrocarbon, wherein the petroleum hydrocarbon allegedly comprises at least one chemical marker selected from:

i) a compound of general formula (I)

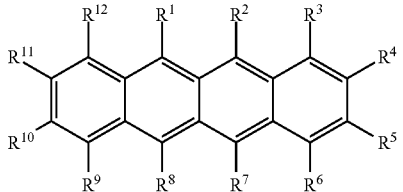

wherein
the residues $R^1$-$R^{12}$ are independently of each other selected from the group consisting of hydrogen, $C_1$-$C_4$-alkyl,

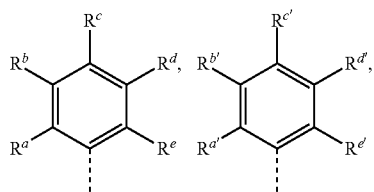

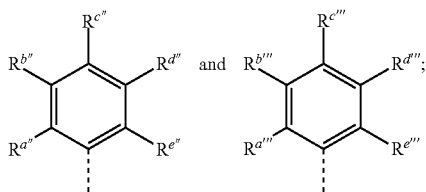

the residues $R^a$-$R^e$, $R^{a'}$-$R^{e'}$, $R^{a''}$-$R^{e''}$ and $R^{a'''}$-$R^{e'''}$ are independently of each other selected from the group consisting of hydrogen and $C_1$-$C_4$-alkyl, with the proviso that at least two of the residues $R^1$-$R^{12}$ are selected from:

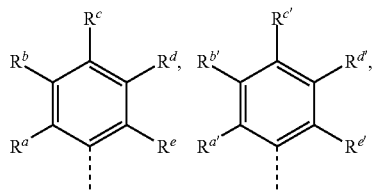

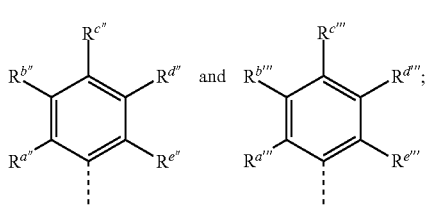

ii) a compound of general formula (II)

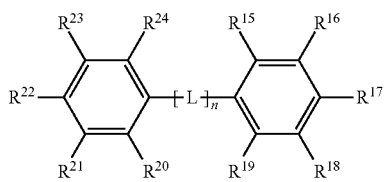

wherein
the residue -L- represents —$CR^{13}$=$CR^{14}$—;
the residues $R^{13}$ and $R^{14}$ are independently of each other selected from the group consisting of hydrogen and methyl;
the residues $R^{15}$-$R^{24}$ are independently of each other selected from the group consisting of hydrogen and $C_1$-$C_4$ alkyl;
and n is an integer comprised between 2 and 6;
iii) an aromatic compound substituted by one or more N,N-disubstituted amino groups, wherein the substituents of the one or more N,N-disubstituted amino groups are independently of each other selected from $C_1$-$C_6$-alkyl or the two substituents of a N,N-disubstituted amino group taken together form a residue —$(CH_2)_p$—, wherein p is an integer comprised between 2 and 6;
and
iv) an aromatic compound substituted by at least one group selected from $C_1$-$C_4$-alkyloxy;
wherein the method comprises the following steps:
a-1) acquiring a sample of the petroleum hydrocarbon;
b-1) vaporizing said sample to provide a gaseous sample;
c-1) illuminating the gaseous sample with a pulsed laser light of a predetermined wavelength of between about 300 nm and about 370 nm, thereby producing gaseous ions; and
d-1) analyzing the gaseous ions obtained at step c-1) by ion mobility spectrometry or mass spectrometry to detect a presence or an absence of said at least one chemical marker in the petroleum hydrocarbon, and thereby determining the authenticity of said petroleum hydrocarbon.

Another aspect of the present invention is directed to a method for determining adulteration of a marked petroleum hydrocarbon, wherein the marked petroleum hydrocarbon comprises a petroleum hydrocarbon and at least one chemical marker selected from:
i) a compound of general formula (I)

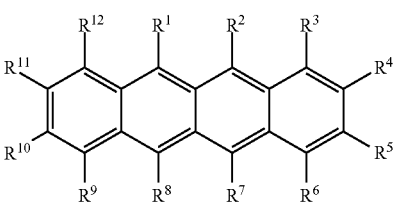

wherein
the residues $R^1$-$R^{12}$ are independently of each other selected from the group consisting of hydrogen, $C_1$-$C_4$-alkyl,

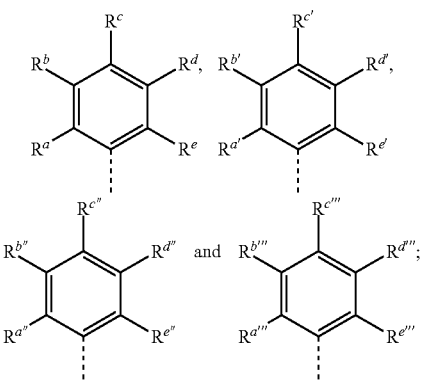

the residues $R^a$-$R^e$, $R^{a'}$-$R^{e'}$, $R^{a''}$-$R^{e''}$ and $R^{a'''}$-$R^{e'''}$ are independently of each other selected from the group consisting of hydrogen and $C_1$-$C_4$-alkyl, with the proviso that at least two of the residues $R^1$-$R^{12}$ are selected from:

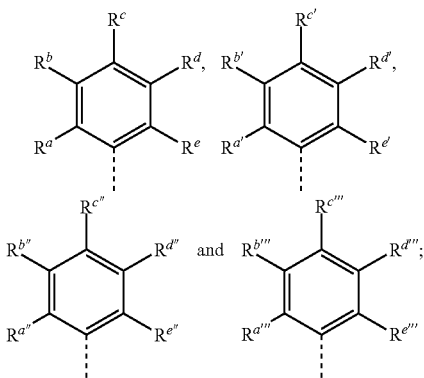

ii) a compound of general formula (II)

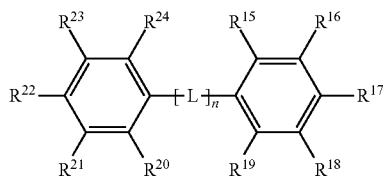

wherein
the residue -L- represents —$CR^{13}$=$CR^{14}$—;
the residues $R^{13}$ and $R^{14}$ are independently of each other selected from the group consisting of hydrogen and methyl;
the residues $R^{15}$-$R^{24}$ are independently of each other selected from the group consisting of hydrogen and $C_1$-$C_4$ alkyl;
and n is an integer comprised between 2 and 6;
iii) an aromatic compound substituted by one or more N,N-disubstituted amino groups, wherein the substituents of the one or more N,N-disubstituted amino groups are independently of each other selected from $C_1$-$C_6$-alkyl or the two substituents of a N,N-disubstituted amino group taken together form a residue -$(CH_2)_p$—, wherein p is an integer comprised between 2 and 6;
and
iv) an aromatic compound substituted by at least one group selected from $C_1$-$C_4$-alkyloxy;
wherein the method comprises the following steps:
a-2) acquiring a sample of the marked petroleum hydrocarbon;
b-2) vaporizing said sample to provide a gaseous sample;
c-2) illuminating the gaseous sample with a pulsed laser light of a predetermined wavelength of between about 300 nm and about 370 nm, thereby producing gaseous ions;
d-2) analyzing the gaseous ions obtained at step c-2) by ion mobility spectrometry or mass spectrometry to determine a concentration of said at least one chemical marker in the marked petroleum hydrocarbon; and
e-2) determining adulteration of the marked petroleum hydrocarbon by comparing the concentration determined at item d-2) with a concentration of the at least one chemical marker in an unadulterated sample of the marked petroleum hydrocarbon.

In the methods claimed and described herein, the step of vaporizing the sample to provide a gaseous sample is achieved preferably by one of the following methods: thermal desorption, laser desorption or evaporation in an injector of a gas chromatograph, and more preferably by thermal desorption or evaporation in an injector of a gas chromatograph.

A preferred embodiment according to the present invention is directed to the method for determining the authenticity of a petroleum hydrocarbon as claimed and described herein, as well as to the method for determining adulteration of a marked petroleum hydrocarbon as claimed and described herein, wherein the predetermined wavelength of the pulsed laser light is of about 308 nm, about 337 nm or about 355 nm, more preferably of about 355 nm.

BRIEF DESCRIPTION OF DRAWINGS

FIG. 4b illustrates the mass spectrum of a marked gasoline containing the chemical marker $N^1,N^1,N^5,N^5$-tetraethyl-naphthalene-1,5-diamine obtained by laser ionization at 355 nm coupled with mass spectrometry. The peak corresponding to the ion (M$^+$) of the chemical marker (m/z of 270) is indicated by a "*".

DETAILED DESCRIPTION

Definitions

Figure 1A:
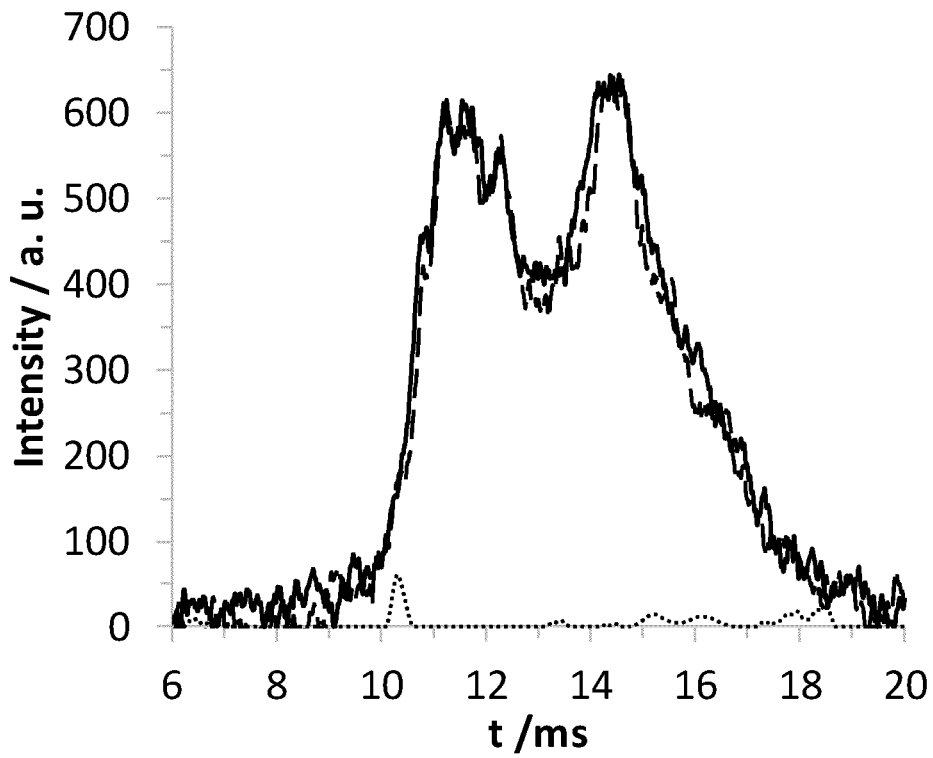
FIG. 1a illustrates for comparative purposes the superimposed ion mobility spectra of an unmarked diesel (black continuous line), of the corresponding marked diesel containing the chemical marker $N^1,N^1,N^4,N^4$-tetramethyl benzene-1,4-diamine (dashed black line) and of a composition of hexane containing the chemical marker $N^1,N^1,N^4,N^4$-tetramethyl benzene-1,4-diamine (dotted black line) obtained by atmospheric pressure chemical ionization coupled with ion mobility spectrometry. The chemical marker $N^1,N^1,N^4,N^4$-tetramethyl benzene-1,4-diamine is characterized by a drift time of about 10.3 ms.

The following definitions are to be used to interpret the meaning of the terms discussed in the description and recited in the claims.

As used herein, the article "a/an" indicates one as well as more than one and does not necessarily limit its referent noun to the singular.

As used herein, the term "about" means that the amount or value in question may be the specific value designated or some other value in its neighborhood. Generally, the term "about" denoting a certain value is intended to denote a range within ±5% of the value. As one example, the phrase "about 100" denotes a range of 100 t 5, i.e. the range from 95 to 105. Preferably, the range denoted by the term "about" denotes a range within ±3% of the value, more preferably ±1%. Generally, when the term "about" is used, it can be expected that similar results or effects according to the invention can be obtained within a range of ±5% of the indicated value.

As used herein, the term "and/or" means that either all or only one of the elements of said group may be present. For example, "A and/or B" means "only A, or only B, or both A and B". In the case of "only A", the term also covers the possibility that B is absent, i.e. "only A, but not B".

The term "comprising" as used herein is intended to be non-exclusive and open-ended. Thus, for instance a solution comprising a compound A may include other compounds besides A. However, the term "comprising" also covers, as a particular embodiment thereof, the more restrictive meanings of "consisting essentially of" and "consisting of", so that for instance "a solution comprising A, B and optionally C" may also (essentially) consist of A and B, or (essentially) consist of A, B and C.

Where the present description refers to "preferred" embodiments/features, combinations of these "preferred" embodiments/features are also deemed to be disclosed as long as the specific combination of "preferred" embodiments/features is technically meaningful.

Surprisingly, the inventors have found that illumination of a gaseous sample of a petroleum hydrocarbon marked with a specific chemical marker as described at items i), ii), iii) and iv) herein with a pulsed laser light of a predetermined wavelength of between about 300 nm and about 370 nm, such as 308 nm, 337 nm or 355 nm, results in selective (i.e. the hydrocarbons of the petroleum hydrocarbon undergo poor ionization, while the specific chemical marker is efficiently ionized) or even exclusive (i.e. only the specific chemical marker undergoes ionization) ionization of the chemical marker. Coupling of the above-mentioned selective or exclusive ionization with mass spectrometry or ion mobility spectrometry enables easy detection of the presence and quantification of the specific chemical marker described at items i), ii), iii) and iv) herein in an expedient manner and thereby, determining authenticity and adulteration of the marked petroleum hydrocarbon. Subjecting a gaseous sample of the herein described marked petroleum hydrocarbon to atmospheric pressure chemical ionization, ionization by radioactive beta emitters, or ionization with pulsed laser light of a predetermined wavelength lower than about 300 nm (for e.g. 266 nm) results in the unselective ionization of the sample of marked petroleum hydrocarbon and does not allow when coupled with mass-spectrometry, or ion mobility spectrometry the detection of the presence of the chemical marker and/or its quantification because the peak corresponding to the chemical marker is masked by the peaks originating from the petroleum hydrocarbon as illustrated for example by FIG. 1a, FIG. 1b, FIG. 1e, FIG. 2a, FIG. 3a, FIG. 3b, FIG. 3g, FIG. 6a, FIG. 6d, FIG. 8a, and FIG. 8e. Illumination of a gaseous sample of the herein described marked petroleum hydrocarbon with pulsed laser light of a predetermined wavelength higher than 370 nm (for e.g. 406 nm) does not contain sufficient energy to ionize the chemical marker as shown for example by FIG. 1i, FIG. 3j, FIG. 6g and FIG. 8i.

Hence, the present invention provides a method for determining the authenticity of a petroleum hydrocarbon, wherein the petroleum hydrocarbon allegedly comprises at least one chemical marker selected from:

i) a compound of general formula (I)

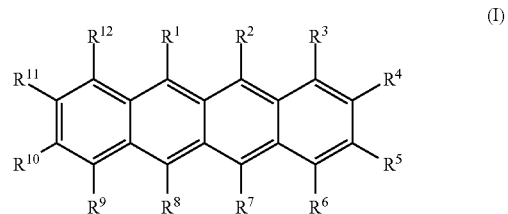

(I)

wherein
the residues $R^1$-$R^{12}$ are independently of each other selected from the group consisting of hydrogen, $C_1$-$C_4$-alkyl,

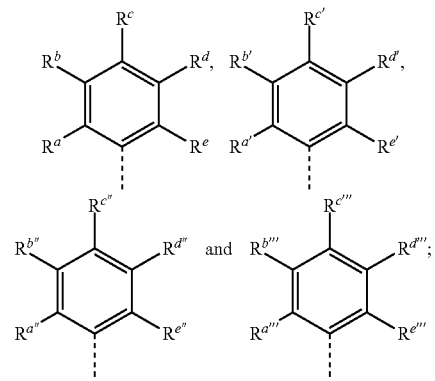

the residues $R^a$-$R^e$, $R^{a'}$-$R^{e'}$, $R^{a''}$-$R^{e''}$ and $R^{a'''}$-$R^{e'''}$ are independently of each other selected from the group consisting of hydrogen and $C_1$-$C_4$-alkyl, with the proviso that at least two of the residues $R^1$-$R^{12}$ are selected from:

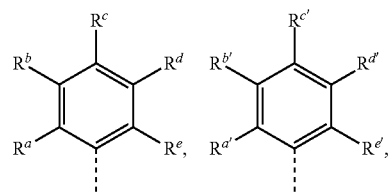

-continued

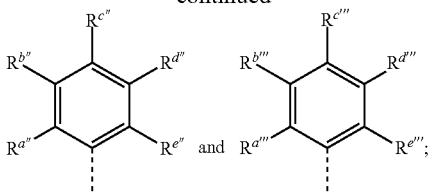

ii) a compound of general formula (II)

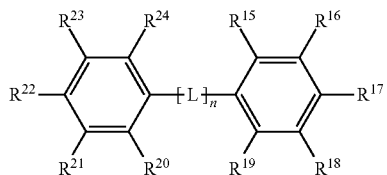

(II)

wherein
the residue -L- represents —CR$^{13}$=CR$^{14}$—;
the residues R$^{13}$ and R$^{14}$ are independently of each other selected from the group consisting of hydrogen and methyl;
the residues R$^{15}$-R$^{24}$ are independently of each other selected from the group consisting of hydrogen and C$_1$-C$_4$ alkyl;
and n is an integer comprised between 2 and 6;
iii) an aromatic compound substituted by one or more N,N-disubstituted amino is groups, wherein the substituents of the one or more N,N-disubstituted amino groups are independently of each other selected from C$_1$-C$_6$-alkyl or the two substituents of a N,N-disubstituted amino group taken together form a residue —(CH$_2$)$_p$—, wherein p is an integer comprised between 2 and 6;
and
iv) an aromatic compound substituted by at least one group selected from C$_1$-C$_4$-alkyloxy;
wherein the method comprises the following steps:
a-1) acquiring a sample of the petroleum hydrocarbon;
b-1) vaporizing said sample to provide a gaseous sample;
c-1) illuminating the gaseous sample with a pulsed laser light of a predetermined wavelength of between about 300 nm and about 370 nm, preferably a predetermined wavelength selected from about 308 nm, 337 nm and 355 nm, thereby producing gaseous ions; and
d-1) analyzing the gaseous ions obtained at step c-1) by ion mobility spectrometry or mass spectrometry to detect a presence or an absence of said at least one chemical marker in the petroleum hydrocarbon, and thereby determining the authenticity of said petroleum hydrocarbon.

Detection of the peak corresponding to the ion (M$^+$) of the at least one chemical marker in the mass spectrum or the ion mobility spectrum at step d-1) of the method according to the present invention is indicative of the authenticity of said petroleum hydrocarbon. For certain applications, such as marking of low tax petroleum hydrocarbon, detection of the presence of the at least one chemical marker in the allegedly authentic petroleum hydrocarbon is typically considered a sufficient condition for acknowledging the authenticity of said petroleum hydrocarbon. In an equivalent manner, detection of the presence of a chemical marker used for marking low tax petroleum hydrocarbon in an alleged high tax petroleum hydrocarbon (i.e. a petroleum hydrocarbon that is not supposed to contain said chemical marker) is a sufficient condition for acknowledging that the high tax petroleum hydrocarbon is not authentic.

As attested for example by FIG. 1c, FIG. 1d, FIG. 1f, FIG. 1h, FIG. 2b, FIG. 3c-FIG. 3f, FIG. 3h, FIG. 3i, FIG. 4a, FIG. 4b, FIG. 5a, FIG. 5b, FIG. 6b, FIG. 6c, FIG. 6e, FIG. 6f, FIG. 7a-FIG. 7c, FIG. 8b, FIG. 8c, FIG. 8d, FIG. 8f, FIG. 8g, FIG. 8h, FIG. 9a, FIG. 9b and FIG. 10a, the presence of a specific chemical marker as described at items i), ii), iii) and iv) herein in a petroleum hydrocarbon can be detected by illuminating a gaseous sample of said petroleum hydrocarbon with a pulsed laser light of a predetermined wavelength of between about 300 nm and about 370 nm, such as 308 nm, 337 nm, and 355 nm, and analysis of the resulting gaseous ions by ion mobility spectrometry, or mass spectrometry. These surprising results achieved even with low concentrations of the at least one chemical marker are due to the selective ionization of the at least one chemical marker upon illumination of the gaseous sample of said petroleum hydrocarbon with a pulsed laser light of a predetermined wavelength of between about 300 nm and about 370 nm, such as 308 nm, 337 nm, and 355 nm. As evidenced by FIG. 11, the petroleum hydrocarbon matrix has a non-significant influence on the ionization selectivity. As demonstrated by FIG. 1a, FIG. 2a, FIG. 3a, FIG. 6a and FIG. 8a, the ionization selectivity achieved by illuminating the gaseous sample of marked petroleum hydrocarbon described herein with a pulsed laser light of a predetermined wavelength of between about 300 nm and about 370 nm cannot be achieved with atmospheric pressure chemical ionization, a method of ionization used as alternative to ionization by radioactive beta emitters. Moreover, as shown by FIG. 1b, FIG. 1e, FIG. 3b, FIG. 3g, FIG. 6d, and FIG. 8e, illumination of a gaseous sample of marked petroleum hydrocarbon as described herein with a pulsed laser light of a predetermined wavelength lower than 300 nm, such as 266 nm, results in non-selective ionization of said sample and cannot be used for determining the authenticity of the marked petroleum hydrocarbon described herein. The methods of unselective ionization coupled with ion mobility spectrometry (see for e.g.: FIG. 1a, FIG. 1b, FIG. 1e, FIG. 3a, FIG. 3b, FIG. 3g, FIG. 6a, FIG. 6d, FIG. 8a and FIG. 8e) or mass spectrometry (see for e.g.: FIG. 2a) do not allow the detection of the presence of the at least one chemical marker as described herein in the marked petroleum hydrocarbon described herein because the peak of the chemical marker is masked by the peaks originating from the petroleum hydrocarbon. Moreover, a pulsed laser light of a predetermined wavelength higher than 370 nm (for e.g. 406 nm) does not contain sufficient energy for ionizing a gaseous sample of the herein described marked petroleum hydrocarbon and consequently, cannot be used for determining the authenticity of the marked petroleum hydrocarbon described herein.

A further aspect of the present invention is directed to a method for determining adulteration of a marked petroleum hydrocarbon, wherein the marked petroleum hydrocarbon comprises a petroleum hydrocarbon and at least one chemical marker selected from:

i) a compound of general formula (I)

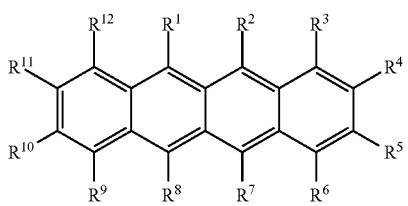

(I)

wherein the residues $R^1$-$R^{12}$ are independently of each other selected from the group consisting of hydrogen, $C_1$-$C_4$-alkyl,

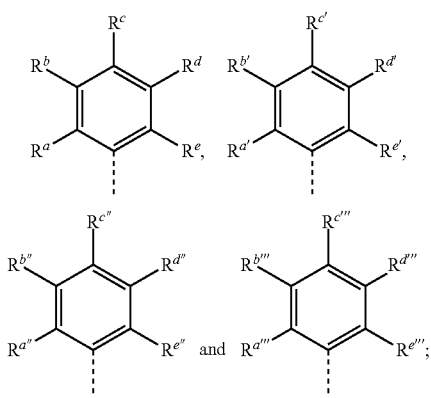

the residues $R^a$-$R^e$, $R^{a'}$-$R^{e'}$, $R^{a''}$-$R^{e''}$ and $R^{a'''}$-$R^{e'''}$ are independently of each other selected from the group consisting of hydrogen and $C_1$-$C_4$-alkyl, with the proviso that at least two of the residues $R^1$-$R^{12}$ are selected from:

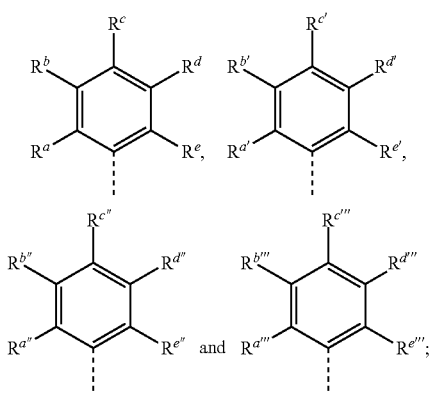

ii) a compound of general formula (II)

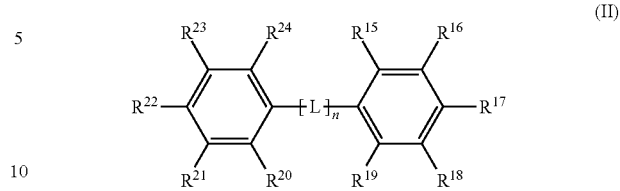

(II)

wherein the residue -L- represents —$CR^{13}$=$CR^{14}$—;

the residues $R^{13}$ and $R^{14}$ are independently of each other selected from the group consisting of hydrogen and methyl;

the residues $R^{15}$-$R^{24}$ are independently of each other selected from the group consisting of hydrogen and $C_1$-$C_4$ alkyl;

and n is an integer comprised between 2 and 6;

v) an aromatic compound substituted by one or more N,N-disubstituted amino groups, wherein the substituents of the one or more N,N-disubstituted amino groups are independently of each other selected from $C_1$-$C_6$-alkyl or the two substituents of a N,N-disubstituted amino group taken together form a residue —$(CH_2)_p$—, wherein p is an integer comprised between 2 and 6;

and vi) an aromatic compound substituted by at least one group selected from $C_1$-$C_4$-alkyloxy;

wherein the method comprises the following steps:

a-2) acquiring a sample of the marked petroleum hydrocarbon;

b-2) vaporizing said sample to provide a gaseous sample;

c-2) illuminating the gaseous sample with a pulsed laser light of a predetermined wavelength of between about 300 nm and about 370 nm, preferably a predetermined wavelength selected from about 308 nm, 337 nm and 355 nm, thereby producing gaseous ions;

d-2) analyzing the gaseous ions obtained at step c-2) by ion mobility spectrometry or mass spectrometry to determine a concentration of said at least one chemical marker in the marked petroleum hydrocarbon; and e-2) determining adulteration of the marked petroleum hydrocarbon by comparing the concentration determined at item d-2) with a concentration of the at least one chemical marker in an unadulterated sample of the marked petroleum hydrocarbon.

As used herein, the term "adulteration" of a petroleum hydrocarbon refers to altering, mixing, diluting, laundering, etc., of the petroleum hydrocarbon. In some cases, a petroleum hydrocarbon (e.g. a petroleum hydrocarbon taxed at a higher rate) can be combined (e.g. illegally) with another petroleum hydrocarbon (e.g. an untaxed petroleum hydrocarbon or petroleum hydrocarbon taxed at a lower rate) or solvent to form an adulterated (e.g., altered, mixed, diluted, laundered, etc.) petroleum hydrocarbon. For example, a petroleum hydrocarbon can be mixed with one or more other petroleum hydrocarbons, solvents, and the like, or combinations thereof. If undetected, the adulterated petroleum hydrocarbon can be sold, sometimes illegally, at the price of the petroleum hydrocarbon taxed at the higher rate to yield a profit. In some instances, the adulterated petroleum hydrocarbon can be potentially hazardous for the user, such as for example when a hazardous solvent is used for adulterating the petroleum hydrocarbon. In other instances, the petroleum hydrocarbon can be treated or laundered in an attempt to remove identifying features, such as chemical markers from the petroleum hydrocarbon (e.g. to disguise the origin of the petroleum hydrocarbon the amount of tax paid on the petroleum hydrocarbon, etc.) before the petroleum hydrocarbon is mixed with another petroleum hydrocarbon to form an adulterated petroleum hydrocarbon.

As demonstrated for example by FIG. 1g, FIG. 2c, FIG. 3k, FIG. 4c, FIG. 6h, FIG. 7d and FIG. 10b, illumination of a gaseous sample of a petroleum hydrocarbon marked with at least one chemical marker as described herein with pulsed laser light of a predetermined wavelength of between about 300 nm and about 370 nm, preferably of about 308 nm, about 337 nm or about 355 nm, and more preferably of about 355 nm, coupled with ion mobility spectrometry or mass spectrometry enables quantification of the at least one chemical marker described herein in a petroleum hydrocarbon over a broad concentration range.

The term "petroleum hydrocarbon" refers to products having a predominantly hydrocarbon composition, although they may contain minor amounts of oxygen, nitrogen, sulfur or phosphorus. As used herein, the term "petroleum hydrocarbon" includes crude oils, as well as products derived from petroleum refining processes. Preferably, a "petroleum hydrocarbon" includes without limitation crude oil, lubricating oil, mineral oil, hydraulic fluid, brake fluid, gasoline, diesel fuel, kerosene, jet fuel, heating oil and heavy fuel oil. More preferably, the petroleum hydrocarbon is selected from mineral oil, gasoline and diesel fuel, and especially preferably the petroleum hydrocarbon is selected from gasoline and diesel fuel. The term "marked petroleum hydrocarbon" refers to a petroleum hydrocarbon that has been uniformly mixed with a certain amount of the at least one chemical marker described herein so that the concentration of the at least one chemical marker in the marked petroleum hydrocarbon is substantially constant. As used herein the wording "petroleum hydrocarbon allegedly comprising at least one chemical marker" refers to a petroleum hydrocarbon, which based on the information related to its production, distribution chain and/or selling point is supposed to contain at least one chemical marker as defined herein uniformly mixed therein.

The term "$C_1$-$C_6$-alkyl group" as used herein refers to a saturated linear or branched-chain monovalent hydrocarbon radical of one to six carbon atoms ($C_1$-$C_6$). Examples of $C_1$-$C_6$-alkyl groups include methyl (Me, —$CH_3$), ethyl (Et, —$CH_2CH_3$), 1-propyl (n-Pr, n-propyl, —$CH_2CH_2CH_3$), 2-propyl (i-Pr, iso-propyl, —$CH(CH_3)_2$), 1-butyl (n-Bu, n-butyl, —$CH_2CH_2CH_2CH_3$), 2-methyl-1-propyl (i-Bu, i-butyl, —$CH_2CH(CH_3)_2$), 2-butyl (s-Bu, s-butyl, —$CH(CH_3)CH_2CH_3$), 2-methyl-2-propyl (t-Bu, t-butyl, —$C(CH_3)_3$), 1-pentyl (n-pentyl, —$CH_2CH_2CH_2CH_2CH_3$), 2-pentyl (—$CH(CH_3)CH_2CH_2CH_3$), 3-pentyl (—$CH(CH_2CH_3)_2$), 2-methyl-2-butyl (—$C(CH_3)_2CH_2CH_3$), 3-methyl-2-butyl (—$CH(CH_3)CH(CH_3)_2$), 3-methyl-1-butyl (—$CH_2CH_2CH(CH_3)_2$), 2-methyl-1-butyl (—$CH_2CH(CH_3)CH_2CH_3$), 1-hexyl (—$CH_2CH_2CH_2CH_2CH_2CH_3$), 2-hexyl (—$CH(CH_3)CH_2CH_2CH_2CH_3$), 3-hexyl (—$CH(CH_2CH_3)(CH_2CH_2CH_3)$), 2-methyl-2-pentyl (—$C(CH_3)_2CH_2CH_2CH_3$), 3-methyl-2-pentyl (—$CH(CH_3)CH(CH_3)CH_2CH_3$), 4-methyl-2-pentyl (—$CH(CH_3)CH_2CH(CH_3)_2$), 3-methyl-3-pentyl (—$C(CH_3)(CH_2CH_3)_2$), 2-methyl-3-pentyl (—$CH(CH_2CH_3)CH(CH_3)_2$), 2,3-dimethyl-2-butyl (—$C(CH_3)_2CH(CH_3)_2$) and 3,3-dimethyl-2-butyl (—$CH(CH_3)C(CH_3)_3$).

The term "$C_1$-$C_4$-alkyl" as used herein refers to a saturated linear or branched-chain monovalent hydrocarbon radical of one to four carbon atoms ($C_1$-$C_4$). Examples of $C_1$-$C_4$-alkyl groups include methyl (Me, —$CH_3$), ethyl (Et, —$CH_2CH_3$), 1-propyl (n-Pr, n-propyl, —$CH_2CH_2CH_3$), 2-propyl (i-Pr, iso-propyl, —$CH(CH_3)_2$), 1-butyl (n-Bu, n-butyl, —$CH_2CH_2CH_2CH_3$), 2-methyl-1-propyl (i-Bu, i-butyl, —$CH_2CH(CH_3)_2$), 2-butyl (s-Bu, s-butyl, —$CH(CH_3)CH_2CH_3$) and 2-methyl-2-propyl (t-Bu, t-butyl, —$C(CH_3)_3$).

The term "$C_1$-$C_4$-alkyloxy" means a $C_1$-$C_4$-alkyl group, wherein the $C_1$-$C_4$-alkyl is as defined herein, that is linked to the rest of a molecule or to another group through an oxygen atom. Illustrative examples of $C_1$-$C_4$-alkyloxy include methoxy, ethoxy, n-propoxy, iso-propoxy, n-butoxy, iso-butoxy, sec-butoxy and tert-butoxy.

To avoid contamination of the mass spectrometer or ion mobility spectrometer, the sample of allegedly marked petroleum hydrocarbon acquired at step a-1) of the method for determining authenticity claimed herein or the sample of marked petroleum hydrocarbon acquired at step a-2) of the method for determining adulteration claimed herein, may be further diluted. Thus, an embodiment according to the present invention pertains to a method for determining authenticity as claimed herein or a method for determining adulteration as claimed herein, further comprising step f) conducted between step a-1) and step b-1) or between step a-2) and step b-2):

f) diluting the sample with an organic solvent.

For practical reasons, the organic solvent used at step f) of the methods claimed herein must be miscible with the sample of the allegedly marked petroleum hydrocarbon or of the marked petroleum hydrocarbon i.e. the organic solvent and the sample must form a homogenous mixture when mixed together. The organic solvent used at step f) may also serve as a vehicle for internal standard addition by containing a defined amount of the at least one chemical marker expected to be present in the petroleum hydrocarbon allegedly comprising the at least one chemical marker or in the marked petroleum hydrocarbon. Preferably, the organic solvent used at step f) is not per se ionizable upon illumination with pulsed laser light of a predetermined wavelength of between about 300 nm and about 370 nm. Examples of the organic solvents that may be used at step f) of the inventive methods include, but are not limited to: pentane, hexane, heptane, octane, toluene, ethanol, methanol, isopropanol, acetone, dimethylformamide, and mixtures thereof. In a preferred embodiment the organic solvent is hexane. Preferably, the ratio between the volume of the sample acquired at step a-1) or a-2) and the volume of the organic solvent is of between about 1:10 and about 1:1000, preferably of about 1:100. An optimal dilution ratio can be determined by a person skilled in the art of analytical chemistry by routine work.

At step b-1) of the method for determining authenticity claimed and described herein and at step b-2) of the method for determining the adulteration claimed and described herein, the sample of petroleum hydrocarbon and the sample of marked petroleum hydrocarbon, respectively is subjected to vaporization to provide a gaseous sample. As well-known to the skilled person, the term "vaporizing said sample" refers to the process of converting said sample from liquid state to gaseous state. In the methods claimed and described herein, the step of vaporizing the sample to provide a gaseous sample is preferably achieved by one of the following methods: thermal desorption, laser desorption or evaporation in an injector of a gas chromatograph, and more preferably by thermal desorption or evaporation in an injector of a gas chromatograph.

As used herein, thermal desorption refers to a vaporization method wherein the liquid sample is heated gradually or at constant temperature with a flow of inert gas. Prior to the heating step, the liquid sample may be adsorbed onto a solid material. As well known to the skilled person laser desorption is a vaporization method relying upon the interaction between the molecules of the sample to be vaporized and the pulsed laser light. Upon adsorption of the incident laser radiation, the molecules of the sample are vaporized. As well known to the skilled person, evaporation in an injector of a gas chromatograph is a vaporization method relying upon injection of a minute amount (few µL) of the liquid sample in the heated injector port of the gas chromatograph.

The methods claimed herein include illumination of the gaseous sample obtained at step b-1) or b-2) with pulsed laser light of a predetermined wavelength of between about 300 nm and about 370 nm, preferably of about 308 nm, 337 nm or 355 nm, which results in ionization of the gaseous sample, and surprisingly in the selective or exclusive ionization of the at least one chemical marker. An indicator of the selective ionization of a specific chemical marker as described herein in presence of a specific petroleum hydrocarbon is the ratio between the intensity of the peak corresponding to the chemical marker and the peak originating from the petroleum hydrocarbon exhibiting the highest intensity in the mass spectrum or the ion mobility spectrum. This ratio can be optimized for a specific chemical marker and a specific petroleum hydrocarbon via routine work by varying the is pulsed laser wavelength from about 300 nm to about 370 nm and/or varying the pulse energy density for a specific wavelength. Preferably, the predetermined wavelength of the pulsed laser light is of about 308 nm, about 337 nm or about 355 nm, and more preferably is of about 355 nm.

At step d-1) of the method for determining authenticity claimed and described herein and at step d-2) of the method for determining adulteration claimed and described herein, the gaseous ions obtained at step c-1) or c-2) are analyzed by ion mobility spectrometry or mass spectrometry. As well known to the person skilled in the art of analytical chemistry, ion mobility spectrometry is an analytical technique, which separates gaseous ions in an electric field in the presence of an inert gas on the basis of their mobilities. The ion mobility is a measure of the size-to-charge ratio of an ion. Mass spectrometry is an analytical technique that separates gaseous ions according to their specific mass-to-charge ratio (m/z), and then records the relative abundance of each ion type.

Detection of the peak corresponding to the ion ($M^+$) of the at least one chemical marker in the mass spectrum or the ion mobility spectrum at step d-1) of the method according to the present invention is indicative of the authenticity of said petroleum hydrocarbon.

The concentration of the at least one chemical marker in the sample of marked petroleum hydrocarbon may be determined by using an external calibration curve, wherein standard reference solutions of said chemical marker are prepared at different concentrations and subsequently analyzed using the same instrumental parameters as for the sample of marked petroleum hydrocarbon. The detector response is plotted against the standard reference concentrations and the slope and intercept of the calibration curve is recorded. The concentration of the chemical marker in the marked petroleum hydrocarbon the adulteration of which is tested is determined based on the recorded detector signal obtained for said sample and the aforementioned slope and intercept of the calibration curve. Alternatively, the concentration of the at least one chemical marker in the sample of marked petroleum hydrocarbon may be determined by the internal standard addition technique by adding to the marked petroleum hydrocarbon a solvent that contains a chemical component with similar physical characteristics as the chemical marker (i.e. the internal standard), such as the deuterated form of the chemical marker to be quantified, in the said marked petroleum product. The detector response of the internal standard and of the chemical marker is recorded and the concentration of the chemical marker is calculated from the ratio of the detector response of the internal standard and of the marker. This technique is particularly useful for correcting the matrix effects in the case of adulteration of the marked petroleum hydrocarbon with an unknown product. A further method for determining the concentration of the at least one chemical marker in the marked petroleum hydrocarbon relies upon comparison of the detector response of the chemical marker in the sample of marked petroleum hydrocarbon with the detector response recorded for a reference petroleum hydrocarbon marked with a known concentration of said chemical marker. The ratio of the detector responses from the reference petroleum hydrocarbon and the sample of marked petroleum hydrocarbon is indicative of the relative chemical marker concentration of the two said petroleum hydrocarbons.

At step e-2) of the method for determining adulteration claimed and described herein, the concentration of the at least one chemical marker determined at step d-2) is compared with a concentration of the at least one chemical marker in an unadulterated sample of the marked petroleum hydrocarbon and it is decided whether the marked petroleum hydrocarbon has been adulterated or not. The concentration of the at least one chemical marker in the unadulterated sample of the marked petroleum hydrocarbon is/was determined by subjecting the unadulterated sample of petroleum hydrocarbon to steps a-2), b-2), c-2) and d-2) described herein. A difference in concentration of the at least one chemical marker of at least 10-wt %, preferably of at least 7.5-wt %, and more preferably of at least 5-wt % between the sample of the marked petroleum hydrocarbon acquired at step a-2) and the unadulterated sample of marked petroleum hydrocarbon indicates that said marked petroleum hydrocarbon has been adulterated.

To ensure that the ion of the at least one chemical marker is easily vaporized and remains in gaseous state during the analysis by ion mobility spectrometry or mass spectrometry, the at least one chemical marker described herein should have a boiling point lower than about 650° C. at 760 mm Hg, preferably lower than about 600° C. at 760 mm Hg, more preferably lower than about 500° C. at 760 mm Hg, and even more preferably lower than about 450° C. at 760 mmHg. Such a chemical marker is particularly useful for marking subsidized petroleum hydrocarbons, such as subsidized kerosene and subsidized diesel, because it renders economically not viable the removal of the chemical marker from the subsidized petroleum via distillation that is known as one the most used techniques for eliminating the chemical markers from the subsidized petroleum hydrocarbons. Meanwhile, such a chemical marker is also useful for marking high tax petroleum hydrocarbons, such as high tax kerosene and high tax diesel, because due to its boiling point that is within or close to the boiling range of the petroleum hydrocarbon, it renders difficult its isolation from the petroleum hydrocarbon matrix and its identification by criminals involved in dilution or substitution of high taxed petroleum hydrocarbon with lower grade petroleum hydrocarbon, and thereby aids in minimizing the lost revenue caused by theses illegal activities, the risk of brand degradation, as well as the environmental damage.

The method for determining authenticity claimed and described herein and the method for determining adulteration claimed and described herein may be implemented on-site for rapid testing, or in a laboratory.

In the methods claimed herein, the at least one chemical marker may be a compound of general formula (I). Preferably, the concentration of the at least one chemical marker of general formula (I) in the sample acquired at step a-1) or at step a-2) is of at least about 1 µM (micromolar). Depending on the method used for analyzing the ions at step d-1) or d-2), namely mass spectrometry or ion mobility spectrometry, higher concentration of the at least one chemical marker of general formula (I) in the composition of petroleum hydrocarbon may be required. Owing to the high solubility of the chemical marker of general formula (I) in a variety of petroleum hydrocarbons, even high marking concentration of about 0.2 mM (millimolar) may be considered.

The at least one chemical marker of general formula (I) used in the methods claimed and described herein has preferably at the most four of the residues $R^1$-$R^{12}$ selected from the group consisting of:

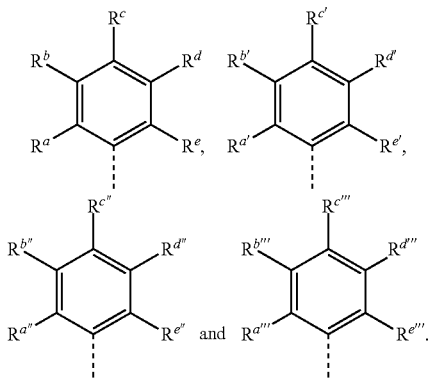

A preferred embodiment according to the present invention is directed to a method for determining authenticity as claimed and described herein and a method for determining adulteration as claimed and described herein, wherein the at least one chemical marker is a compound of general formula I wherein
the residue $R^1$ represents

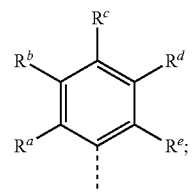

the residues $R^2$-$R^{12}$
and $R^a$-$R^e$ have the meanings as defined herein. Thus, a preferred embodiment according to the present invention pertains to a method for determining authenticity as claimed and described herein and a method for determining adulteration as claimed and described herein, wherein the at least one chemical marker is of neral formula (I-a),

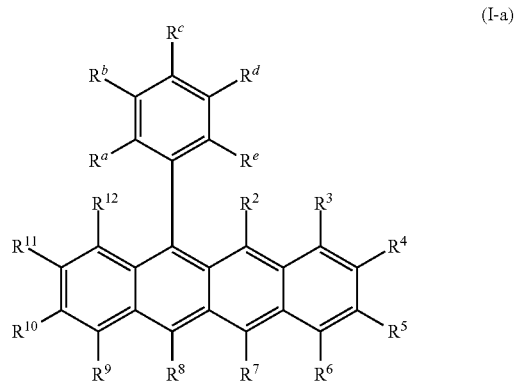

wherein the residues $R^2$-$R^{12}$, $R^a$-$R^e$, $R^{a'}$-$R^{e'}$, $R^{a''}$-$R^{e''}$ and $R^{a'''}$-$R^{e'''}$ have the meanings defined herein.

A more preferred embodiment according to the present invention is directed to a method for determining authenticity as claimed and described herein and a method for determining adulteration as claimed and described herein, wherein the at least one chemical marker is a compound of general formula (I), wherein
the residue $R^7$ represents

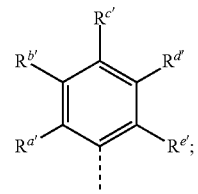

or
the residue $R^8$ represents

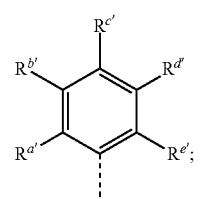

or
the residue $R^2$ represents

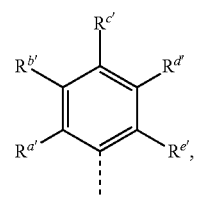

the residue $R^7$ represents

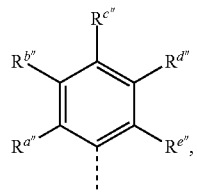

and the residue $R^8$ represents

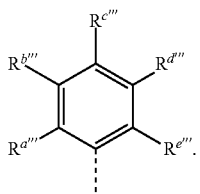

Hence, methods as claimed and described herein, wherein the at least one chemical marker is a compound of general formula (I-b),

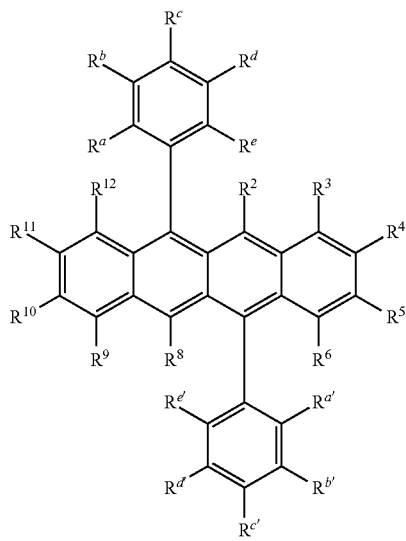
(I-b)

with the residues $R^2$-$R^6$, $R^8$-$R^{12}$, $R^a$-$R^e$ and $R^{a'}$-$R^{e'}$ having the meanings defined herein;

a compound of general formula (I-c)

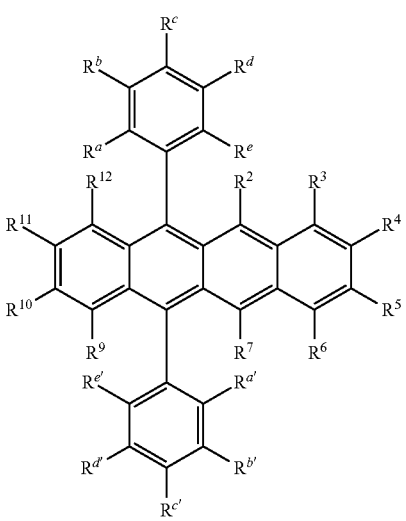
(I-c)

with the residues $R^2$-$R^7$, $R^9$-$R^{12}$, $R^a$-$R^e$ and $R^{a'}$-$R^{e'}$ having the meanings defined herein, or
a compound of general formula (I-d)

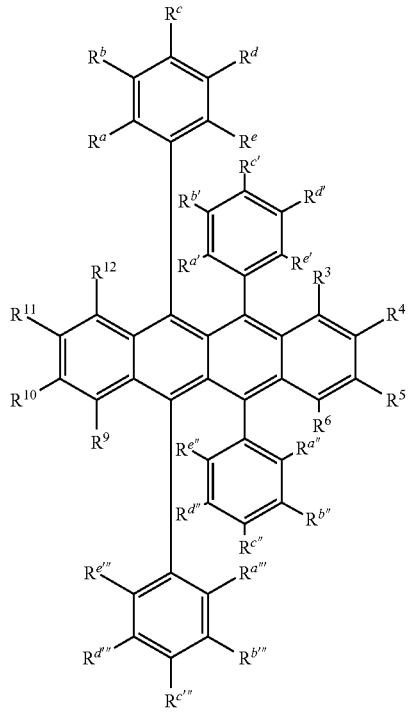
(I-d)

with the residues $R^3$-$R^6$, $R^9$-$R^{12}$, $R^a$-$R^e$, $R^{a'}$-$R^{e'}$, $R^{a''}$-$R^{e''}$ and $R^{a'''}$-$R^{e'''}$ having the meanings defined herein, are especially preferred.

Further examples of compounds of general formula (I) that can be detected and quantified as described herein include:

a compound of general formula (I-e)

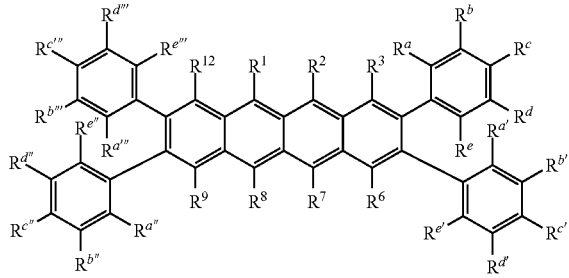

wherein the residues $R^1$-$R^3$, $R^6$-$R^9$, $R^{12}$, $R^a$-$R^e$, $R^{a'}$-$R^{e'}$, $R^{a''}$-$R^{e''}$ and $R^{a'''}$-$R^{e'''}$ have the meanings defined herein; as well as a compound of general formula (I-f)

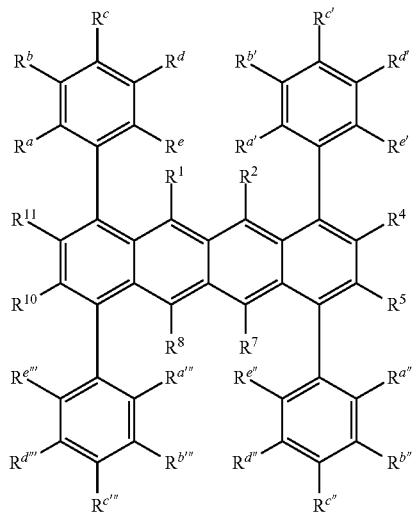

wherein the residues $R^1$, $R^2$, $R^4$, $R^5$, $R^7$, $R^8$, $R^{10}$, $R^{11}$, $R^a$-$R^e$, $R^{a'}$-$R^{e'}$, $R^{a''}$-$R^{e''}$ and $R^{a'''}$-$R^{e'''}$ have the meanings defined herein.

Preferably, in the general formulae (I), (I-a), (I-b), (I-c), (I-d), (I-e) and (I-f) described herein, the residues $R^a$-$R^e$, $R^{a'}$-$R^{e'}$, $R^{a''}$-$R^{e''}$ and $R^{a'''}$-$R^{e'''}$ represent hydrogen and/or the residues $R^1$-$R^{12}$ other than

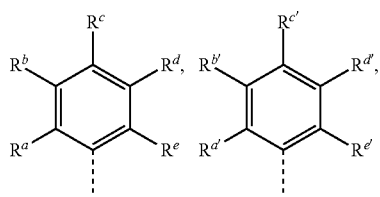

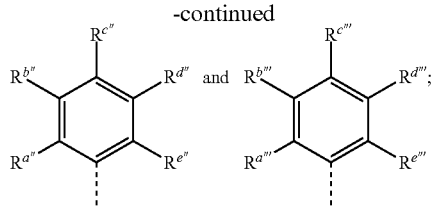

represent hydrogen.

More preferably, in the general formulae (I), (I-a), (I-b), (I-c), (I-d), (I-e) and (I-f) described herein, the residues $R^a$-$R^e$, $R^{a'}$-$R^{e'}$, $R^{a''}$-$R^{e''}$ and $R^{a'''}$-$R^{e'''}$ represent hydrogen and the residues $R^1$-$R^{12}$ other than

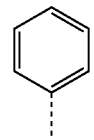

represent hydrogen.

Examples of compounds of general formula (I) that are commercially available, include, but are not limited to: 1,11-diphenyl-naphthacene (CAS no.: 927669-50-9; provider: Advanced Organic Synthesis); 5,12-diphenyl-naphthacene (CAS no.: 27130-32-1; provider: Chemieliva Pharmaceutical Co); 5,6,11,12-tetraphenyl-naphthacene (CAS no.: 517-51-1; provider: Chemieliva Pharmaceutical Co); and 5,12-bis[4-(1,1-dimethylethyl)phenyl]-naphthacene (CAS no.: 478799-46-1; provider: Chemieliva Pharmaceutical Co). The remaining compounds of general formula (I) described herein can be prepared by well-known organic chemistry reactions starting from commercially available naphthacenequines or naphthacenes.

In the methods claimed herein, the at least one chemical marker may be a compound of general formula (II). The compound of general formula (II) is particularly useful for marking low tax petroleum hydrocarbon. Thus, a method for determining the authenticity of a low tax petroleum hydrocarbon, wherein the low tax petroleum hydrocarbon allegedly comprises at least one chemical marker of general formula (II)

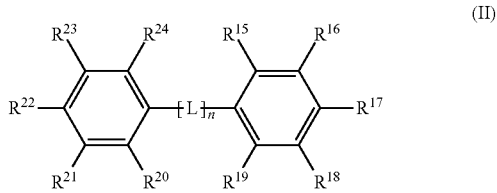

wherein
the residue -L- represents —$CR^{13}$=$CR^{14}$—;
the residues $R^{13}$ and $R^{14}$ are independently of each other selected from the group consisting of hydrogen and methyl;
the residues $R^{15}$-$R^{24}$ are independently of each other selected from the group consisting of hydrogen and $C_1$-$C_4$ alkyl;
and n is an integer comprised between 2 and 6; and wherein the method comprises the following steps:

a-1) acquiring a sample of the low tax petroleum hydrocarbon;

b-1) vaporizing said sample to provide a gaseous sample;

c-1) illuminating the gaseous sample with a pulsed laser light of a predetermined wavelength of between about 300 nm and about 370 nm, preferably of about 308 nm, about 337 nm, or about 355 nm, more preferably of about 355 nm, thereby producing gaseous ions; and d-1) analyzing the gaseous ions obtained at step c-1) by ion mobility spectrometry or mass spectrometry to detect a presence or an absence of said at least one chemical marker of general formula (II) in the petroleum hydrocarbon, and thereby determining the authenticity of said petroleum hydrocarbon, is particularly preferred.

A further preferred embodiment according to the present invention is directed to a method for determining authenticity as claimed and described herein, more preferably for determining authenticity of a low tax petroleum hydrocarbon, and a method for determining adulteration as claimed and described herein, wherein m out of the n double bonds —$CR^{13}$=$CR^{14}$— present a Z stereochemistry and n−m out of the n double bonds —$CR^a$=$CR^b$— present an E stereochemistry, wherein m is an integer comprised between 0 and 6 (i.e. selected from 0, 1, 2, 3, 4, 5 and 6) and m≤n. In the chemical marker of general formula (II), the positions of the m double bonds —$CR^{13}$=$CR^{14}$— presenting a Z stereochemistry and the positions of the n−m double bonds —$CR^{13}$=$CR^{14}$— presenting an E stereochemistry is random.

The integer m may be equal to the integer n. Hence, the chemical marker of general formula (II) may contain only double bonds —$CR^{13}$=$CR^{14}$— having a Z stereochemistry. Alternatively, the integer m may be lower than the integer n so that the chemical marker of general formula (II) contains both double bonds —$CR^{13}$=$CR^{14}$— with a Z stereochemistry and double bonds —$CR^{13}$=$CR^{14}$— with an E stereochemistry.

Preferably, the integer m is 0 so that the chemical marker of general formula (II) contains only double bonds —$CR^{13}$=$CR^{14}$— having an E stereochemistry. A chemical marker of general formula (II) containing exclusively double bonds —$CR^{13}$=$CR^{14}$— with an E stereochemistry (m=0) has the advantage of exhibiting higher mass spectrometry and/or ion mobility spectrometry signal intensity compared to the corresponding derivative containing m out of the n double bonds —$CR^{13}$=$CR^{14}$— having a Z stereochemistry, wherein m is an integer comprised between 1 and 6.

Thus, a preferred embodiment according to the present invention pertains to a method for determining authenticity as claimed and described herein, preferably for determining authenticity of a low tax petroleum hydrocarbon, and a method for determining adulteration as claimed and described herein, wherein the at least one chemical marker is of general formula (I-a)

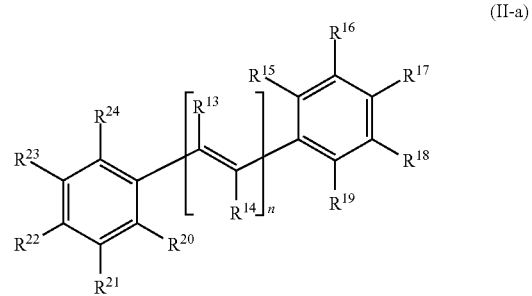

(II-a)

with the residues $R^{13}$-$R^{24}$ and the integer n having the meanings as defined herein.

Methods as claimed and described herein, wherein the at least one chemical marker is a compound of general formula (II) or (II-a), with n being an integer selected from 5 and 6 and the residues $R^{15}$-$R^{24}$ being selected from the group consisting of hydrogen, methyl and ethyl, are also preferred.

It is preferred that in general formulae (II) and (II-a), the integer n is comprised between 2 and 4 and more preferably, the integer n is 3. It is further preferred that in general formulae (II) and (II-a) the residues $R^{13}$ and $R^{14}$ represent hydrogen and/or the residues $R^{15}$-$R^{24}$ represent hydrogen.

Examples of commercially available chemical markers of general formula (II) include, but are not limited to: 6-diphenyl-1,3,5-hexatriene (CAS. no.: 1720-32-7; provider: Sigma Aldrich); (1E,3E)-1,4-diphenylbuta-1,3-diene (CAS no.: 538-81-8; provider: ASW MedChem); ((1E,3E)-penta-1,3-diene-1,4-diyl)dibenzene (CAS no.: 23637-42-5; provider: Chemileva Pharmaceutical); 1-methyl-4-((1E,3E)-4-phenylbuta-1,3-dien-1-yl)benzene (CAS no.: 37985-11-8; provider: Chemileva Pharmaceutical); ((1E,3E)-2-methylbuta-1,3-diene-1,4-diyl)dibenzene (CAS no.: 23637-43-6; provider: Chemileva Pharmaceutical); ((2E,4E)-hexa-2,4-diene-2,5-diyl)dibenzene (CAS no.: 16914-12-8; provider: Chemileva Pharmaceutical); 1-methyl-2-((1E,3E)-4-phenylbuta-1,3-dien-1-yl)benzene (CAS no.: 93333-38-1; provider: Chemileva Pharmaceutical); 1-methyl-3-((1E,3E)-4-phenylbuta-1,3-dien-1-yl)benzene (CAS no.: 82102-26-9; provider: Chemileva Pharmaceutical); (1E,3E)-1,4-di-o-tolylbuta-1,3-diene (CAS no.: 848354-92-7; provider: Shanghai Chemhere Co.); (1E,3E)-1,4-di-m-tolylbuta-1,3-diene (CAS no.: 1261146-08-0; provider: Chemileva Pharmaceutical); (1E,3E)-1,4-di-p-tolylbuta-1,3-diene (CAS no.: 72033-82-0; provider: Chemileva Pharmaceutical); ((1E,3E)-2-methylpenta-1,3-diene-1,4-diyl)dibenzene (CAS no.: 117847-11-7; provider: Chemileva Pharmaceutical); ((1E,3E)-2,3-dimethylbuta-1,3-diene-1,4-diyl)dibenzene (CAS no.: 54631-95-7; provider: Shanghai Chemhere Co.); 1-methyl-4-((1E,3E)-3-methyl-4-phenylbuta-1,3-dien-1-yl)benzene (CAS no.: 916764-21-1; provider: Chemileva Pharmaceutical); (1E,3E)-1,4-di-m-tolylbuta-1,3-diene (CAS no.: 12611146-10-4; provider Chemileva Pharmaceutical); 4,4'-((1E,3E)-2-methylbuta-1,3-diene-1,4-diyl)bis(methylbenzene) (CAS no.: 102080-29-5; provider: Chemileva Pharmaceutical); (1E,3E)-1,4-dimesitylbuta-1,3-diene (CAS no.: 1261146-09-1; provider: Chemileva Pharmaceutical); 4,4'-((2E,4E)-hexa-2,4-diene-2,5-diyl)bis(methylbenzene) (CAS no.: 110746-28-6; provider: Chemileva Pharmaceutical); 1,2,4,5-tetramethyl-3-((1E,3E)-4-phenylbuta-1,3-dien-1-yl)benzene (CAS no.: 39117-47-0; provider: Chemileva Pharmaceutical); (1E,3E)-1,4-bis(2,4,5-trimethylphenyl)buta-1,3-diene (CAS no.: 96214-75-4; provider: Chemileva Pharmaceutical); (1Z,3Z)-1,4-diphenylbuta-1,3- diene (CAS no.: 5807-76-1; provider: Chemileva Pharmaceutical); (1Z,3Z)-1,4-di-o-tolylbuta-1,3-diene (CAS no.: 1006055-80-6; provider: Chemileva Pharmaceutical); (1Z, 3E)-1,4-diphenylbuta-1,3-diene (CAS no.: 5808-05-9; provider: Chemileva Pharmaceutical); ((1E,3Z)-penta-1,3-diene-1,4-diyl)dibenzene (CAS no.: 40391-41-1; provider: Chemileva Pharmaceutical); ((1Z,3E)-2-methylbuta-1,3-diene-1,4-diyl)dibenzene (CAS no.: 83897-70-5; provider: Chemileva Pharmaceutical); 1-methyl-4-((1Z,3E)-4-phenylbuta-1,3-dien-1-yl)benzene (CAS no.: 57668-27-6; provider: Chemileva Pharmaceutical); ((2Z,4E)-hexa-2,4-diene-2,5-diyl)dibenzene (CAS no.: 84174-09-4; provider: Chemileva Pharmaceutical); ((1E,3E)-2,3-dimethylbuta-1,3-diene-1,4-diyl)dibenzene (CAS no.: 38023-36-8; provider: Chemileva Pharmaceutical); (1E,3E,5E,7E)-1,8-diphenylocta-1,3,5,7-tetraene (CAS no.: 22828-29-1; provider: Chemileva Pharmaceutical); (1E,3E,5E)-1,6-diphenylhexa-1,3,5-triene (CAS no.: 17329-15-6; provider: ASW MedChem); ((1E,3E,5E)-3-methylhexa-1,3,5-triene-1,6-diyl)dibenzene (CAS no.: 155337-76-1; provider: Aurora Fine Chemicals LLC); ((1E,3E,5E)-hepta-1,3,5-triene-1,6-diyl)dibenzene (CAS no.: 140654-064; provider: Chemileva Pharmaceutical); 1-methyl-4-((1E,3E,5E)-6-phenylhexa-1,3,5-trien-1-yl)benzene (CAS no.: 36288-10-5; provider: Chemileva Pharmaceutical); 1-methyl-3-(6-phenylhexa-1,3,5-tren-1-yl)benzene (CAS no.: 95278-12-9; provider: Chemileva Pharmaceutical); 1-methyl-2-(6-phenylhexa-1,3,5-trien-1-yl)benzene (CAS no.: 95278-13-0; provider: Chemileva Pharmaceutical); 1,6-di-p-tolylhexa-1,3,5-triene (CAS no.: 31382-31-7; provider: Chemileva Pharmaceutical); 3,4-dimethylhexa-1,3,5-triene-1,6-diyl)dibenzene (CAS no.: 1295646-09-1; provider: Chemileva Pharmaceutical); 1,3-dimethyl-5-(6-phenylhexa-1,3,5-trien-1-yl)benzene (CAS no.: 63296-77-5; provider Chemileva Pharmaceutical); 1-isopropyl-4-(6-(p-tolyl)hexa-1,3,5-trien-1-yl)benzene (CAS no.: 558453-19-3; provider: Shanghai Chemhere Co.); 2,4-dimethyl-1-(6-phenylhexa-1,3,5-trien-1-yl)benzene (CAS no.: 63296-78-6; provider: Chemileva Pharmaceutical); (1Z,3E,5Z)-1,6-diphenylhexa-1,3,5-triene (CAS no.: 170080-16-7; provider: Chemileva Pharmaceutical); (1Z,3Z,5E)-1,6-diphenylhexa-1,3,5-triene (CAS no.: 205808-71-5; provider: Chemileva Pharmaceutical); (1Z, 3Z,5Z)-1,6-diphenylhexa-1,3,5-triene (CAS no.: 170080-17-8; provider: Chemileva Pharmaceutical); ((1E,3E,5E)-2,3-dimethylhexa-1,3,5-triene-1,6-diyl)dibenzene (CAS no.: 57833-31-5; provider: Chemileva Pharmaceutical); (1E,3E, 5E,7E)-1,8-di-p-tolylocta-1,3,5,7-tetraene (CAS no.: 82720-17-0; provider: Chemileva Pharmaceutical); 1-methyl-4-((1E,3E,5E,7E)-8-phenylocta-1,3,5,7-tetraen-1-yl)benzene (CAS no.: 94871-35-9; provider: Chemileva Pharmaceutical); ((1E,3Z,5E,7E)-2,7-dimethylocta-1,3,5,7-tetraene-1,8-diyl)dibenzene (CAS no.: 82720-21-6; provider: Chemileva Pharmaceutical); (1E,3E,5E,7E,9E)-1,10-diphenyldeca-1,3,5,7,9-pentaene (CAS no.: 20576-64-1; provider: Chemileva Pharmaceutical); (3,8-dimethyldeca-1,3,5,7,9-pentaene-1,10-diyl)dibenzene (CAS no.: 1884-48-6; provider: Chemileva Pharmaceutical); and (1E,3E,5E,7E,9E,11E)-1,12-diphenyldodeca-1,3,5,7,9,11-hexaene (CAS no.: 20576-65-2; provider: Shanghai Chemhere Co.).

In the methods claimed and described herein, the at least one chemical marker may be an aromatic compound substituted by one or more N,N-disubstituted amino groups, wherein the substituents of the one or more N,N-disubstituted amino groups are independently of each other selected from $C_1$-$C_6$-alkyl or the two substituents of a N,N-disubstituted amino group taken together form a residue —$(CH_2)_p$— with p being an integer comprised between 2 and 6 i.e. selected from 2, 3, 4, 5 and 6. Preferably, the concentration of the aromatic compound substituted by one or more N,N-disubstituted amino groups in the sample acquired at step a-1) or at step a-2) is of at least about 0.2 µM (micromolar). Depending on the method used for analyzing the ions at step d-1) or d-2), namely mass spectrometry or ion mobility spectrometry, higher concentration of the aromatic compound substituted by one or more N,N-disubstituted amino groups in the composition of petroleum hydrocarbon may be required. Owing to the high solubility of the aromatic compound substituted by one or more N,N-disubstituted amino groups in a variety of petroleum hydrocarbons, even high marking concentration of about 1 mM (millimolar) may be considered.

A preferred embodiment according to the present invention is directed to a method for determining authenticity as claimed and described herein, as well as a method for determining adulteration as claimed and described herein, wherein the aromatic compound substituted by one or more N,N-disubstituted amino groups is a compound of general formula (III)

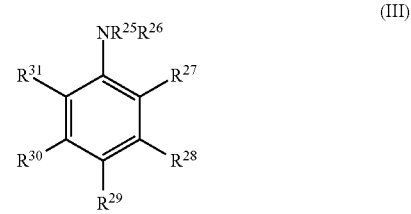

(III)

wherein
the substituents $R^{25}$ and $R^{26}$ are independently of each other selected from $C_1$-$C_6$-alkyl, or alternatively the substituents $R^{25}$ and $R^{26}$ taken together form a residue —$(CH_2)_p$—, with p being an integer comprised between 2 and 6;
the residues $R^{27}$ and $R^{28}$ are independently of each other selected from the group consisting of hydrogen, $C_1$-$C_6$-alkyl, —$NR^{32}R^{33}$ and —$NR^{34}R^{35}$, wherein
the substituents $R^{32}$ and $R^{33}$ are independently of each other selected from $C_1$-$C_6$-alkyl, or alternatively the substituents $R^{32}$ and $R^{33}$ taken together form a residue —$(CH_2)_{p1}$—, with p1 being an integer comprised between 2 and 6, and
the substituents $R^{34}$ and $R^{35}$ are independently of each other selected from $C_1$-$C_6$-alkyl, or alternatively the substituents $R^{34}$ and $R^{35}$ taken together form a residue —$(CH_2)_{p2}$—, with p2 being an integer comprised between 2 and 6; and wherein
A. the residues $R^{29}$, $R^{30}$ and $R^{31}$ are independently of each other selected from the group consisting of hydrogen, $C_{1-6}$-alkyl, —$NR^{36}R^{37}$, —$NR^{38}R^{39}$ and —$NR^{40}R^{41}$; or
B. the residue $R^{29}$ is selected from the group consisting of hydrogen, $C_1$-$C_6$-alkyl and —$NR^{36}R^{37}$, and the residues $R^{30}$ and $R^{31}$ taken together form with the adjacent aromatic ring a 6-membered aromatic ring, optionally substituted by a group —$NR^{38}R^{39}$; or
C. the residue $R^{31}$ is selected from the group consisting of hydrogen, $C_1$-$C_6$-alkyl and —$NR^{36}R^{37}$, and the residues $R^{29}$ and $R^{30}$ taken together form with the adjacent aromatic ring a 6-membered aromatic ring, optionally substituted by a group —$NR^{38}R^{39}$;

wherein
the substituents $R^{36}$ and $R^{37}$ are independently of each other selected from $C_1$-$C_6$-alkyl, or alternatively the substituents $R^{36}$ and $R^{37}$ taken together form a residue —$(CH_2)_{p3}$—, with p3 being an integer comprised between 2 and 6,
the substituents $R^{38}$ and $R^{39}$ are independently of each other selected from $C_1$-$C_6$-alkyl, or alternatively the substituents $R^{38}$ and $R^{39}$ taken together form a residue —$(CH_2)_{p4}$—, with p4 being an integer comprised between 2 and 6, and
the substituents $R^{40}$ and $R^{41}$ are independently of each other selected from $C_1$-$C_6$-alkyl, or alternatively the substituents $R^{40}$ and $R^{41}$ taken together form a residue —$(CH_2)_{p5}$—, with p5 being an integer comprised between 2 and 6. Thus, the at least one chemical marker may be a compound of formula (III-b)

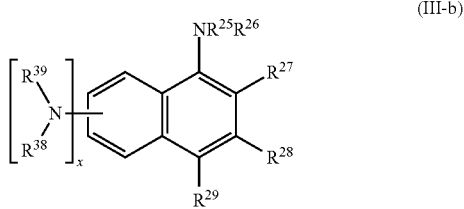

(III-b)

wherein
the substituents $R^{25}$ and $R^{26}$ are independently of each other selected from $C_1$-$C_6$-alkyl, or alternatively the substituents $R^{25}$ and $R^{26}$ taken together form a residue —$(CH_2)_p$—, with p being an integer comprised between 2 and 6;
the residues $R^{27}$-$R^{29}$ are independently of each other selected from the group consisting of hydrogen and $C_1$-$C_6$-alkyl;
x is an integer selected from 0 and 1; and
the substituents $R^{38}$ and $R^{39}$ are independently of each other selected from $C_1$-$C_6$-alkyl, or alternatively the substituents $R^{38}$ and $R^{39}$ taken together form a residue —$(CH_2)_{p4}$—, with p4 being an integer comprised between 2 and 6. In general formula (III-b), preferably the residues $R^{27}$-$R^{29}$ are independently of each other selected from the group consisting of hydrogen and $C_1$-$C_4$-alkyl, and more preferably represent hydrogen.

A further preferred embodiment pertains to a method for determining authenticity as described and claimed herein, as well as to a method for determining adulteration as claimed and described herein, wherein the at least one chemical marker is a compound of general formula (III-a)

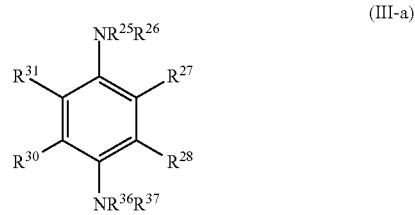

(III-a)

wherein
the residues $R^{27}$ and $R^{28}$ are independently of each other selected from the group consisting of hydrogen and $C_1$-$C_6$-alkyl;
the residues $R^{30}$ and $R^{31}$ are independently of each other selected from the group consisting of hydrogen and $C_1$-$C_6$-alkyl, or the residues $R^{30}$ and $R^{31}$ taken together form with the adjacent aromatic ring a 6-membered aromatic ring, optionally substituted by a group —$NR^{38}R^{39}$;
the substituents $R^{25}$ and $R^{26}$ are independently of each other selected from $C_1$-$C_6$-alkyl, or alternatively the substituents $R^{25}$ and $R^{26}$ taken together form a residue —$(CH_2)_p$—, with p being an integer comprised between 2 and 6;
the substituents $R^{36}$ and $R^{37}$ are independently of each other selected from $C_1$-$C_6$-alkyl, or alternatively the substituents $R^{36}$ and $R^{37}$ taken together form a residue —$(CH_2)_{p3}$—, with p3 being an integer comprised between 2 and 6; and
the substituents $R^{38}$ and $R^{39}$ are independently of each other selected from $C_1$-$C_6$-alkyl, or alternatively the substituents $R^{38}$ and $R^{39}$ taken together form a residue —$(CH_2)_{p4}$—, with p4 being an integer comprised between 2 and 6.

In general formula (III-a), the residues $R^{27}$, $R^{26}$, $R^{30}$ and $R^{31}$ are preferably selected from the group consisting of hydrogen and $C_1$-$C_6$-alkyl.

Examples of commercially available aromatic compounds substituted by one or more N,N-disubstituted amino groups as described herein, include but are not limited to: N,N-dimethylbenzenamine (CAS no.: 121-69-7; provider: ASW MedChem); $N^1,N^1,N^4,N^4$-tetramethyl-1,4-benzenediamine (CAS no.: 100-22-1; provider ASW MedChem); $N^1,N^1$-diethyl-$N^4,N^4$-dimethyl-1,4-benzenediamine (CAS no.: 5775-53-1; provider: Chemieliva Pharmaceutical); $N^1,N^1$, $N^4,N^4$-tetraethyl-1,4-benzenediamine (CAS no.: 18996-77-5; provider: Chemieliva Pharmaceutical); $N^1,N^1,N^4,N^4$,2,5-hexamethyl-1,4-benzenediamine (CAS no.: 858341-35-2; provider: Chemieliva Pharmaceutical); $N^1,N^1,N^4,N^4$-tetrakis(1-methylethyl)-1,4-benzenediamine (CAS no.: 6864-03-5; provider: Chemieliva Pharmaceutical); $N^1,N^1,N^4,N^4$,2,3,5,6-octamethyl-1,4-benzenediamine (CAS no.: 66907-63-9; provider: Chemieliva Pharmaceutical); N,N,3,5-tetramethylbenzenamine (CAS no.: 4913-13-7; provider: ASW MedChem); 3,5-diethyl-N,N-dimethylbenzenamine (CAS no.: 99052-31-0; provider: Milestone Pharmtech); 3,5-bis(1,1-dimethylethyl)-N,N-diethylbenzenamine (CAS no.: 94042-96-3; provider: Chemieliva Pharmaceutical); $N^1,N^1,N^3,N^3$-tetramethyl-1,3-benzenediamine (CAS no.: 22440-93-3; provider: ABClabtory Scientific Co.); $N^1,N^1,N^3,N^3$-tetraethyl-1,3-benzenediamine (CAS no.: 64287-26-9; provider: Chemieliva Pharmaceutical); $N^1,N^1,N^3,N^3$,4-pentamethylbenzene-1,3-diamine (CAS no.: 65198-15-4; provider: Chemieliva Pharmaceutical); $N^1,N^1,N^3,N^3$-tetramethyl-5-propyl-1,3-benzenediamine (CAS no.: 1586869-62-6; provider: Chemieliva Pharmaceutical); N,N-dimethylnaphthalen-1-amine (CAS no.: 86-56-6; provider: Alchem Pharmtech); N-ethyl-N-methyl-naphthalen-1-amine (CAS no.: 83777-94-0; provider: Chemieliva Pharmaceutical); N,N,4-trimethylnaphthalen-1-amine (CAS no.: 4523-52-8; provider: ASW MedChem); N,N,5-trimethylnaphthalen-1-amine (CAS no.: 847449-78-9; provider: Chemieliva Pharmaceutical); N,N,2-trimethylnaphthalen-1-amine (CAS no.: 57585-25-8; provider: Chemieliva Pharmaceutical); N,N-diethylnaphthalen-1-amine (CAS no.: 84-95-7; provider: ASW MedChem); N-isopropyl-N-methylnaphthalen-1-amine (CAS no.:

110014-41-0; provider: Chemieliva Pharmaceutical); N,N,4,5-tetramethylnaphthalen-1-amine (CAS no.: 4619-41-4; provider: Chemieliva Pharmaceutical); N-ethyl-N-isopropylnaphthalen-1-amine (CAS no.: 114326-20-4; provider: Chemieliva Pharmaceutical); N-ethyl-N,2-dimethylnaphthalen-1-amine (CAS no.: 130523-07-8; provider: Chemieliva Pharmaceutical); N,N-bis(1-methylethyl)-naphthalen-1-amine (CAS no.: 4960-24-1; provider: Chemieliva Pharmaceutical); N-(1,1-dimethylethyl)-N-methyl-naphthalen-1-amine (CAS no.: 110014-43-2; provider: Chemieliva Pharmaceutical); $N^1,N^1,N^5,N^5$-tetramethyl-naphthalene-1,5-diamine (CAS no.: 10075-69-1; provider: Chemieliva Pharmaceutical); $N^1,N^1,N^4,N^4$-tetramethyl-naphthalene-1,4-diamine (CAS no.: 13764-14-2; provider: Chemieliva Pharmaceutical); N-(1-ethylpropyl)-N-methyl-naphthalen-1-amine (CAS no.: 110014-42-1; provider: Chemieliva Pharmaceutical); N,2-dimethyl-N-(1-methylethyl)-naphthalen-1-amine (CAS no.: 130523-08-9; provider: Chemieliva Pharmaceutical); $N^1,N^1,N^8,N^8$-tetramethyl-naphthalene-1,4-diamine (CAS no.: 20734-58-1; provider: ASW MedChem); N,N-diethyl-2-methyl-naphthalen-1-amine (CAS no.: 21614-05-1; provider: Chemieliva Pharmaceutical); N,N-diethyl-8-methyl-naphthalen-1-amine (CAS no.: 130523-22-7; provider: Chemieliva Pharmaceutical); N-(2,2-dimethylpropyl)-N-methyl-naphthalene-1-amine (CAS no.: 110014-40-9; provider: Chemieliva Pharmaceutical); N-(2,2-dimethylpropyl)-N-ethyl-naphthalene-1-amine (CAS no.: 114326-22-6; provider: Chemieliva Pharmaceutical); N,2-diethyl-N-methyl-naphthalene-1-amine (CAS no.: 130523-10-3; provider: Chemieliva Pharmaceutical); N,N-dibutyl-naphthalene-1-amine (CAS no.: 204126-63-6; provider: Chemieliva Pharmaceutical); N-ethyl-2-methyl-N-(1-methylethyl)-naphthalene-1-amine (CAS no.: 130523-09-0; provider: Chemieliva Pharmaceutical); 2-ethyl-N-methyl-N-(1-methylethyl)-naphthalene-1-amine (CAS no.: 130523-12-5; provider: Chemieliva Pharmaceutical); $N^1$-ethyl-$N^1,N^8,N^8$-trimethyl-naphthalene-1,8-diamine (CAS no.: 79687-92-6; provider: Chemieliva Pharmaceutical); N-ethyl-N-(1-ethylpropyl)-naphtahalene-1-amine (CAS no.: 114326-21-5; provider: Chemieliva Pharmaceutical); N-ethyl-N-methyl-2-(1-methylethyl)-naphtahalene-1-amine (CAS no.: 130523-14-7; provider: Chemieliva Pharmaceutical); 8-butyl-N,N-dimethyl-naphthalene-1-amine (CAS no.: 1469538-06-4; provider: Chemieliva Pharmaceutical); N,N-bis(2-methylpropyl)-naphtahalene-1-amine (CAS no.: 109556-56-1; provider: Chemieliva Pharmaceutical); N,N,2-triethyl-naphthalene-1-amine (CAS no.: 130523-11-4; provider: Chemieliva Pharmaceutical); N,2-diethyl-N-(1-methylethyl)-naphthalene-1-amine (CAS no.: 130523-13-6; provider: Chemieliva Pharmaceutical); N-methyl-N,2-bis(1-methylethyl)-naphthalene-1-amine (CAS no.: 130523-16-9; provider: Chemieliva Pharmaceutical); N,N-diethyl-2-(1-methylethyl)-naphthalene-1-amine (CAS no.: 130523-15-8; provider: Chemieliva Pharmaceutical); 2-(1,1-dimethylethyl)-N-ethyl-N-methyl-naphthalene-1-amine (CAS no.: 130523-18-1; provider: Chemieliva Pharmaceutical); $N^1,N^1,N^8,N^8$-tetraethyl-naphthalene-1,8-diamine (CAS no.: 53463-80-2; provider: Chemieliva Pharmaceutical); $N^1,N^1,N^5,N^5$-tetraethyl-naphthalene-1,5-diamine (CAS no.: 861347-34-4); $N^1,N^5$-dimethyl-$N^1,N^5$-bis(1-methylethyl)-naphthalene-1,5-diamine (CAS no.: 110971-36-3; provider: Chemieliva Pharmaceutical); N-ethyl-N,2-bis(1-methylethyl)-naphthalene-1-amine (CAS no.: 130523-17-0; provider: Chemieliva Pharmaceutical); 2-(1,1-dimethylethyl)-N-methyl-N-(1-methylethyl)-naphthalene-1-amine (CAS no.: 130523-20-5; provider: Chemieliva Pharmaceutical); 2-(1,1-dimethylethyl)-N,N-diethyl-naphthalene-1-amine (CAS no.: 130523-19-2; provider: Chemieliva Pharmaceutical); 3-butyl-N,N-diethyl-naphthalene-1-amine (CAS no.: 398458-74-7; provider Chemieliva Pharmaceutical); 2-(1,1-dimethylethyl)-N-ethyl-N-(1-methylethyl)-naphthalene-1-amine (CAS no.: 130523-21-6; provider: Chemieliva Pharmaceutical); $N^1$-butyl-$N^1,N^8,N^8$-trimethyl-naphthalene-1,8-diamine (CAS no.: 852630-17-2, provider: Chemieliva Pharmaceutical); $N^1,N^8$-dibutyl-$N^1,N^8$-dimethyl-naphthalene-1,8-diamine (CAS no.: 852630-27-4; provider: Chemieliva Pharmaceutical); N,N-dimethyl-naphthalene-2-amine (CAS no.: 2436-85-3; provider: ASW MedChem); N-ethyl-N-methyl-naphtahalene-1-amine (CAS no.: 68172-51-0; provider: Chemieliva Pharmaceutical); N,N,4-trimethyl-naphtahalene-2-amine (CAS no.: 4523-53-9; provider: Chemieliva Pharmaceutical); N,N,1-trimethyl-naphtahalene-2-amine (CAS no.: 5672-92-4; provider: Chemieliva Pharmaceutical); N,N-diethyl-naphtahalene-2-amine (CAS no.: 13672-17-8; provider: Chemieliva Pharmaceutical); N-methyl-N-(1-methylethyl)-naphtahalene-2-amine (CAS no.: 110014-44-3; provider: Chemieliva Pharmaceutical); N,N,4,5-tetramethyl-naphtahalene-2-amine (CAS no.: 4536-94-1; provider: Chemieliva Pharmaceutical), N-butyl-N-methyl-naphtahalene-2-amine (CAS no.: 872801-93-9; provider: Chemieliva Pharmaceutical); N,N-bis(1-methylethyl)-naphtahalene-2-amine (CAS no.: 92596-72-0; provider: Chemieliva Pharmaceutical); N,N-dibutyl-naphtahalene-2-amine (CAS no.: 97943-52-7; provider: Chemieliva Pharmaceutical); N,N-bis(2-methylpropyl)-naphthalene-2-amine (CAS no.: 109554-95-2; provider: Chemieliva Pharmaceutical); 1-(naphthalen-1-yl)piperidine (CAS no.: 62062-39-9; provider: Chemieliva Pharmaceutical); and N,N-dibutyl-1-methyl-naphthalene-2-amine (CAS no.: 92834-61-2; provider: Chemieliva Pharmaceutical).

In the methods claimed and described herein, the at least one chemical marker may be an aromatic compound substituted by at least one group selected from $C_1$-$C_4$-alkoxy. Preferably, the concentration of the aromatic compound substituted by at least one group selected from $C_1$-$C_4$-alkoxy in the sample acquired at step a-1) or at step a-2) is of at least about 1 µM (micromolar). Depending on the method used for analyzing the ions at step d-1) or d-2), namely mass spectrometry or ion mobility spectrometry, higher concentration of the at least one chemical marker of general formula (I) in the composition of petroleum hydrocarbon may be required. Owing to the high solubility of the chemical marker of general formula (I) in a variety of petroleum hydrocarbons, even high marking concentration of about 1 mM (millimolar) may be considered.

A preferred embodiment according to the present invention is directed to a method for determining authenticity as claimed and described herein and a method for determining adulteration as claimed and described herein, wherein the at least one chemical marker is a compound of general formula (IV)

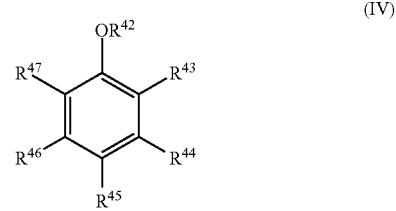

(IV)

wherein
- D. the residue $R^{42}$ is selected from $C_1$-$C_4$-alkyl; the residues $R^{43}$, $R^{44}$, $R^{46}$ and $R^{47}$ are independently of each other selected from the group consisting of hydrogen, $C_1$-$C_4$-alkyl, $C_1$-$C_4$-alkyloxy; and the residue $R^{45}$ is selected from the group consisting of hydrogen, $C_1$-$C_4$-alkyl, $C_1$-$C_4$-alkyloxy, phenyl optionally substituted by one or more groups selected from $C_1$-$C_4$-alkyl and $C_1$-$C_4$-alkyloxy and biphenyl optionally substituted by one or more groups selected from $C_1$-$C_4$-alkyl and $C_1$-$C_4$-alkyloxy; or
- E. the residue $R^{42}$ is selected from $C_1$-$C_4$-alkyl; the residues $R^{43}$ and $R^{44}$ form with the adjacent carbon atoms of the aromatic ring a 6-membered aromatic ring or a 10-membered bi-cyclic aromatic ring, optionally substituted by one or more groups selected from $C_1$-$C_4$-alkyl and $C_1$-$C_4$-alkyloxy; and the substituents $R^{45}$-$R^{47}$ are independently of each other selected from the group consisting of hydrogen, $C_1$-$C_4$-alkyl and $C_1$-$C_4$-alkyloxy; or
- F. the residue $R^{42}$ is selected from $C_1$-$C_4$-alkyl; the residues $R^{44}$ and $R^{45}$ form with the adjacent carbon atoms of the aromatic ring a 6-membered aromatic ring or a 10-membered bi-cyclic aromatic ring, optionally substituted by one or more groups selected from $C_1$-$C_4$-alkyl and $C_1$-$C_4$-alkyloxy; and the substituents $R^{43}$, $R^{46}$ and $R^{47}$ are independently of each other selected from the group consisting of hydrogen, $C_1$-$C_4$-alkyl and $C_1$-$C_4$-alkyloxy; or
- G. the residue $R^{42}$ is selected from $C_1$-$C_4$-alkyl; the residues $R^{43}$ and $R^{44}$ form with the adjacent carbon atoms of the aromatic ring a 6-membered aromatic ring, optionally substituted by one or more groups selected from $C_1$-$C_4$-alkyl and $C_1$-$C_4$-alkyloxy; the residues $R^{46}$ and $R^{47}$ form with the adjacent carbon atoms of the aromatic ring a 6-membered aromatic ring, optionally substituted by one or more groups selected from $C_1$-$C_4$-alkyl and $C_1$-$C_4$-alkyloxy; and the residue $R^{45}$ is selected from the group consisting of hydrogen, $C_1$-$C_4$-alkyl and $C_1$-$C_4$-alkyloxy; or
- H. the residue $R^{42}$ is selected from $C_1$-$C_4$-alkyl; the residues $R^{43}$ and $R^{44}$ form with the adjacent carbon atoms of the aromatic ring a 6-membered aromatic ring, optionally substituted by one or more groups selected from $C_1$-$C_4$-alkyl and $C_1$-$C_4$-alkyloxy; the residues $R^{45}$ and $R^{46}$ form with the adjacent carbon atoms of the aromatic ring a 6-membered aromatic ring, optionally substituted by one or more groups selected from $C_1$-$C_4$-alkyl and $C_1$-$C_4$-alkyloxy; and the residue $R^{47}$ is selected from the group consisting of hydrogen, $C_1$-$C_4$-alkyl and $C_1$-$C_4$-alkyloxy.

A more preferred embodiment according to the present invention pertains to methods as claimed and described herein, wherein the at least one chemical marker is a compound of general formula (IV-a)

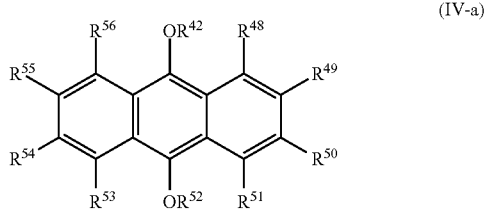

(IV-a)

wherein
the residues $R^{42}$ and $R^{52}$ are independently of each other selected from $C_1$-$C_4$-alkyl; the residues $R^{48}$-$R^{51}$ and $R^{53}$-$R^{56}$ are independently of each other selected from the group consisting of hydrogen and $C_1$-$C_4$-alkyl.

In the general formula (IV-a), the residues $R^{53}$-$R^{56}$ may represent hydrogen, or the residues $R^{44}$-$R^{51}$ and $R^{53}$-$R^{56}$ may independently of each other represent $C_1$-$C_4$-alkyl, or the residues $R^{48}$-$R^{51}$ and $R^{53}$-$R^{56}$ may represent hydrogen. Preferably, in the general formula (IV-a), the residues $R^{42}$ and $R^{52}$ are the same.

Examples of commercially available aromatic compounds substituted by at least one group selected from $C_1$-$C_4$-alkoxy, include, but are not limited to: methoxybenzene (CAS no.:100-66-3; provider: abcr GmbH); 1,4-dimethoxybenzene (CAS no.: 150-78-7; provider: abcr GmbH); 1,4-diethoxybenzene (CAS no.: 122-95-2; provider abcr GmbH); 1,4-bis(1-methylethoxy)benzene (CAS no.: 7495-78-5; provider: Chemieliva Pharmaceutical); 1,4-dimethoxy-2-methylbenzene (CAS no.: 24599-58-4; provider: Alchem Pharmtech); 1,4-dimethoxy-2,5-dimethyl-benzene (CAS no.: 2674-32-0; provider: Chemieliva Pharmaceutical Co.); 1,4-dimethoxy-2,3-dimethylbenzene (CAS no.: 39021-83-5; provider: Chemieliva Pharmaceutical Co.); 1,4-diethoxy-2-methylbenzene (CAS no.: 41901-72-8; provider: Chemieliva Pharmaceutical Co.); 1,4-dibutoxy-benzene (CAS no.: 104-36-9; provider: Chemieliva Pharmaceutical Co.); 1,3-dimethoxybenzene (CAS no.: 151-10-0; provider: Alchem Pharmtech); 1,3-diethoxybenzene (CAS no.: 2049-73-2; provider: Chemieliva Pharmaceutical Co.); 1,3-dimethoxy-5-methyl-benzene (CAS no.: 4179-19-5; provider: ASW MedChem); 1,3,5-trimethoxybenzene (CAS no.: 621-23-8; provider: AK Scientific); 1,3,5-triethoxybenzene (CAS no.: 2437-88-9; provider: Chemieliva Pharmaceutical); 1,3-dimethoxy-5-(1-methylethoxy)benzene (CAS no.: 86635-94-1; provider: Chemieliva Pharmaceutical); 2-ethoxy-1,3,5-trimethoxybenzene (CAS no.: 69832-53-7; provider: Chemieliva Pharmaceutical); 1,3,5-trimethoxy-2,4,6-trimethylbenzene (CAS no.: 1521-62-6; provider: Chemieliva Pharmaceutical); 1,3-dimethoxy-2-methyl-5-(1-methylethoxy)-benzene (CAS no.: 93680-97-8; provider: Chemieliva Pharmaceutical); 1,3-dibutoxy-5-methoxy-benzene (CAS no.: 869740-90-9; provider: Chemieliva Pharmaceutical); 1,2,3,4,5,6-hexamethoxybenzene (CAS no.: 22015-34-5; provider: Chemieliva Pharmaceutical); 4-methoxy-1,1'-biphenyl (CAS no.: 613-37-6; provider: ASW MedChem); 4-methoxy-4'-methyl-1,1'-biphenyl (CAS no.: 53040-92-9; provider: ASW MedChem); 4-ethoxy-biphenyl (CAS no.: 613-40-1; provider: Chemieliva Pharmaceutical); 2-methyl-9,10-dimethoxyanthracene (CAS no.: 26708-05-4; provider: Chemieliva Pharmaceutical Co.); 2-ethyl-9,10-dimethoxyanthracene (CAS no.: 26708-04-3; provider Aldrich); 2-(1,1-dimethyl-ethyl)-9,10-dimethoxyanthracene (CAS no.: 62770-63-2; provider: Alchem Pharmtech); 2-ethyl-9,10-diethoxyanthracene (CAS no.: 205515-07-7; provider: Chemieliva Pharmaceutical Co.); 9,10-dimethoxyanthracene (CAS no.: 2395-97-3; provider: Chemieliva Pharmaceutical Co.); 9,10-diethoxyanthracene (CAS no.: 68818-86-0; provider: ASW MedChem); 9,10-bis(1-methylethoxy)-anthracene (CAS no.: 134767-44-5; provider: Chemieliva Pharmaceutical Co.); 9,10-bis(1,1-dimethylethoxy)-anthracene (CAS no.: 873914-42-2; provider: Shanghai Chemhere Co.); 9,10-dibutoxy-anthracene (CAS no.: 76275-14-4; provider: Chemieliva Pharmaceutical Co.); 9-ethoxy-10-methoxy-anthracene (CAS no.: 106500-38-3; provider: Chemieliva Pharmaceutical Co.); 9,10-dimethoxy-1,4,5,8-tetramethyl-anthracene (CAS no.:

76466-58-5; provider Chemieliva Pharmaceutical Co.); 9,10-dimethoxy-1,2,3,4,5,6,7,8-octamethyl-anthracene (CAS no.: 75670-41-6; provider: Chemieliva Pharmaceutical Co.); 9,10-dimethoxy-1,2,3,4-tetramethyl-anthracene (CAS no.: 72049-50-4; provider: Chemieliva Pharmaceutical Co.); 2,6-dimethyl-9,10-dimethoxyanthracene (CAS no.: 1221786-94-2; provider: Rare Chemicals GmbH); 1,2-dimethoxy-anthracene (CAS no.: 132814-35-8; provider: Shanghai Chemhere Co.); 1,3-dimethoxyanthracene (CAS no.: 144493-74-3; provider: Chemieliva Pharmaceutical Co.); 1,4-dimethoxy-9-ethyl-anthracene (CAS no.: 107328-77-8; provider: Chemieliva Pharmaceutical Co.); 1,4-diethoxy-anthracene (CAS no.: 75830-00-1; provider: Chemieliva Pharmaceutical Co.); 1,5-dimethoxy-anthracene (CAS no.: 16294-32-9; provider: Chemieliva Pharmaceutical Co.); 1,5-diethoxy-anthracene (CAS no.: 75829-95-7; provider: Chemieliva Pharmaceutical Co.); 1,8-dimethoxy-anthracene (CAS no.: 16294-34-1; provider: Chemieliva Pharmaceutical Co.); 1,8-diethoxy-anthracene (CAS no.: 75829-96-8; provider: Chemieliva Pharmaceutical Co.); 1,8-dimethoxy-3-methyl-anthracene (CAS no.: 144493-77-6; provider Chemieliva Pharmaceutical Co.); 1,8-dimethoxy-2,7-dimethyl-anthracene (CAS no.: 1202400-23-4; provider: Chemieliva Pharmaceutical Co.); 2,3-dimethoxy-anthracene (CAS no.: 51790-19-3; provider: Chemieliva Pharmaceutical Co.); 2,3-diethoxy-anthracene (CAS no.: 863889-35-4; provider: Chemieliva Pharmaceutical Co.); 2,6-dimethoxy-anthracene (CAS no.: 36319-03-6; provider: Chemieliva Pharmaceutical Co.); 2,6-diethoxy-anthracene (CAS no.: 75830-05-6; provider: Chemieliva Pharmaceutical Co.); 2,6-dimethoxy-9-methyl-anthracene (CAS no.: 110038-59-0; provider: Chemieliva Pharmaceutical Co.); 2,6-dimethoxy-9,10-dimethyl-anthracene (CAS no.: 105858-59-1; provider: Chemieliva Pharmaceutical Co.); 2,6-dipropoxy-anthracene (CAS no.: 1395499-89-4; provider: Chemieliva Pharmaceutical Co.); 2,6-dibutoxy-anthracene (CAS no.: 134277-70-6; provider: Chemieliva Pharmaceutical Co.); and 2,7-dimethoxy-anthracene (CAS no.: 55360-36-6; provider: Chemieliva Pharmaceutical Co.).

EXAMPLES

The present invention is now described in greater detail with respect to non-limiting examples.

I. Apparatus and Protocol Used in the Methods According to the Present Invention Two different, but comparable set-ups were built: the first one described at item I.a below was used for conducting pulsed laser ionization coupled with mass spectrometry measurements and the second one described at item I.b below was used for conducting pulsed laser ionization coupled with ion mobility spectrometry measurements. In both set-ups, an optical parametric oscillator (OPO) pumped by a Nd:YAG laser (NT342A-SH, Ekspla) was used for samples ionization.

I.a Description Instrument and Protocol Used in the Methods Based on Laser Ionization Coupled with Mass Spectrometry.

The set-up contains a thermal desorption unit (Thermo desorber TC-13.006 from PAS Technology), an optical parametric oscillator (OPO) pumped by a Nd:YAG laser (NT342A-SH, Ekspla), and a commercial mass spectrometer (LTQ XL™, Thermo Fisher Scientific) equipped with a self-made ion source (*J. Mass Spectrom.* (2016), 51, 566-577) having two quartz windows transparent to a laser beam. The thermal desorption unit is connected via a metal capillary (stainless steel tubing ⅛" outer diameter×2.0 mm inner diameter, about 60 mm long from Ziemer Chromatographie) to the ion source of the mass spectrometer.

The compositions of petroleum hydrocarbon were analyzed by the following method: 2 μL of the liquid sample were introduced using a syringe (Hamilton, 10 μL) into the thermal desorption unit heated to 250° C. Following vaporization, the gaseous sample was transferred via the metal capillary heated to 200° C. (about 60 mm long) using a $N_2$ flow (600 mL/min) in the ionization chamber heated to 120° C. (about 18 mm long, inner diameter of 20 mm) of the ion source, where the gaseous sample was subjected to laser ionization. The ionized sample was then transferred into the MS spectrometer ($N_2$ flow: 1000 mL/min; V: 50 Volts) and the MS spectrum was measured in relative intensities as a function of mass-to-charge ratio (m/z).

I.b Description Instrument and Protocol Used in the Methods Based on Laser Ionization Coupled with Ion Mobility Spectrometry.

The set-up used contains an injector of a commercial gas chromatograph (HP 5890 SII, Hewlett Packard, now: Agilent) used only for sample vaporization, a self-made ion mobility spectrometer (*Anal. Bional. Chem.* 405, 7019) having quartz windows transparent to a laser beam and an optical parametric oscillator (OPO) pumped by a Nd:YAG laser (NT342A-SH, Ekspla). The injector of the gas chromatograph is connected via a capillary (deactivated fused silica capillary, 0.18 mm inner diameter, 400 mm long from Perkin Elmer) to the ion source of the ion mobility spectrometer. The drift tube of the ion mobility spectrometer is 100 mm long and has an inner diameter of 25 mm. The ion currents on the Faraday plate are amplified (1 GV/A amplifier, ISAS Dortmund) and recorded on a USB oscilloscope (Handyscope HS3, 5 MHz, Tiepie Engineering).

The compositions of petroleum hydrocarbon were analyzed by the following method: 2 μL of the liquid sample were introduced using a syringe (Hamilton, 10 μL) into an injector (inlet gas: $N_2$; flow inlet gas: 200 mL/min) heated to 250° C. of the commercial gas chromatograph. Following vaporization, the gaseous sample was transferred using a $N_2$ flow of 15 mL/min via the uncoated metal capillary heated to 200° C. (400 mm long) into the ionization chamber heated to 180° C. (about 18 mm long, inner diameter of 20 mm) of the ion mobility spectrometer, where the gaseous sample was subjected to laser ionization. The ionized sample entered the heated drift tube (150° C.) of the ion mobility spectrometer. Nitrogen (flow: 200 mL/min; drift tube voltage: 4.5 kV or 6.5 kV) or helium (flow: 200 mL/min; drift tube voltage: 2.5 kV) was used as drift gas. The ion currents on the Faraday plate were amplified (1 GV/A amplifier, ISAS Dortmund) and recorded on a USB oscilloscope (Handyscope HS3, 5 MHz, Tiepie Engineering).

II. Apparatus and Protocol Used for Comparative Purposes

The atmospheric pressure chemical ionization (APCI) by soft X-radiation is a method of unselective ionization that for regulatory reasons (such as safety and disposal concerns) is currently used as alternative to ionization by radioactive beta emitters, such as $^{63}Ni$. The experiments conducted with atmospheric pressure chemical ionization coupled with ion mobility spectrometry (APCI-IMS) or atmospheric pressure chemical ionization coupled with mass spectrometry (APCI-MS) are presented for comparative purposes.

Two different, but comparable set-ups were built: the first one described at item II.a below was used for conducting APCI coupled with mass spectrometry measurements and the second one described at item II.b below was used for APCI coupled with ion mobility spectrometry measurements. In both set-ups, a soft X-radiation source (miniature X-ray tube, 40 mm length, rhodium target on a beryllium window), with an energy of 2.7/2.8 keV (Lα/Lβ-transitions of Rh) by Bruker Daltonik (U.S. Pat. No. 6,740,874 B2, May 25, 2004, Bruker Saxonia Analytik GmbH) was used for samples ionization.

II.a Description Instrument and Protocol Used in the Method Based on APCI Coupled with Mass Spectrometry (APCI-MS).

The set-up differs from the set-up described at item I.a in that the optical parametric oscillator (OPO) pumped by a Nd:YAG laser (NT342A-SH, Ekspla) was replaced by a soft X-radiation source (miniature X-ray tube, 40 mm length, rhodium target on a beryllium window), with an energy of 2.7/2.8 keV (Lα/Lβ-transitions of Rh) by Bruker Daltonik (U.S. Pat. No. 6,740,874 B2, May 25, 2004, Bruker Saxonia Analytik GmbH). Further, a 100-µm thick polyimide foil transparent to X-ray radiation was inserted between ionization chamber and X-ray source to seal the chamber.

The compositions of petroleum hydrocarbon were analyzed by the following method: 2 µL of the liquid sample were introduced using a syringe (Hamilton, 10 µL) into the thermal desorption unit heated to 250° C. Following vaporization, the gaseous sample was transferred via the metal capillary heated to 200° C. (about 60 mm long) using a $N_2$ flow (600 mL/min) in the ionization chamber heated to 120° C. (about 18 mm long, inner diameter of 20 mm) of the ion source, where the gaseous sample was subjected to ionization. The ionized sample was then transferred into the MS spectrometer ($N_2$ flow: 1000 mL/min; V: 50 Volts) and the MS spectrum was measured in relative intensities as a function of mass-to-charge ratio (m/z).

II.b Description Instrument and Protocol Used in the Method Based on APCI Coupled with Ion Mobility Spectrometry (APCI-IMS).

The set-up used contains an injector of a commercial gas chromatograph (HP 5890 SII, Hewlett Packard, now: Agilent) used only for sample vaporization, and a commercially available hand-held ion mobility spectrometer (RoadRunner, Bruker Daltonik). The ion mobility spectrometer contains a soft X-radiation source (miniature X-ray tube, 40 mm length, rhodium target on a beryllium window), with an energy of 2.7/2.8 keV (Lα/Lβ-transitions of Rh) by Bruker Daltonik (U.S. Pat. No. 6,740,874 B2, May 25, 2004, Bruker Saxonia Analytik GmbH). The injector of the gas chromatograph is connected via a capillary (deactivated fused silica capillary, 0.18 mm inner diameter, 400 mm long from Perkin Elmer) to the ion source of the ion mobility spectrometer. The inlet system and the internal flow system of the ion mobility spectrometer were modified to enable its connection through the capillary to the injector of the gas chromatograph.

The compositions of petroleum hydrocarbon were analyzed by the following method: 2 µL of the liquid sample were introduced using a syringe (Hamilton, 10 µL) into an injector (inlet gas: $N_2$; flow inlet gas: 200 mL/min; split ratio 1:12) heated to 250° C. of the commercial gas chromatograph. Following vaporization, the gaseous sample was transferred using a $N_2$ flow of 400 mL/min via the uncoated metal capillary heated to 200° C. (400 mm long) in the ionization chamber heated to 180° C. of the ion mobility spectrometer, where the gaseous sample was subjected to APCI ionization. The ionized sample entered the heated drift tube (150° C.) of the ion mobility spectrometer. Nitrogen (flow: 118 mL/min or 200 mL/min; standard drift tube voltage) was used as drift gas.

Example 1: Detection and Quantification of the Chemical Marker $N^1,N^1,N^4,N^4$-tetramethyl benzene-1,4-diamine in a Petroleum Hydrocarbon The authenticity and adulteration of petroleum hydrocarbons marked with the chemical marker $N^1,N^1,N^4,N^4$-tetramethyl benzene-1,4-diamine (CAS no.: 100-22-1; provider: Sigma Aldrich) were tested.

For petroleum hydrocarbon marking, a concentrate of $N^1,N^1,N^4,N^4$-tetramethyl benzene-1,4-diamine in hexane was prepared to a concentration of 10 mmol/L and added to diesel (SOCAR diesel), gasoline (SP98 AVIA gasoline), mineral oil or hexane to yield marked diesel samples, marked gasoline samples and marked hexane samples.

Figure 1C:
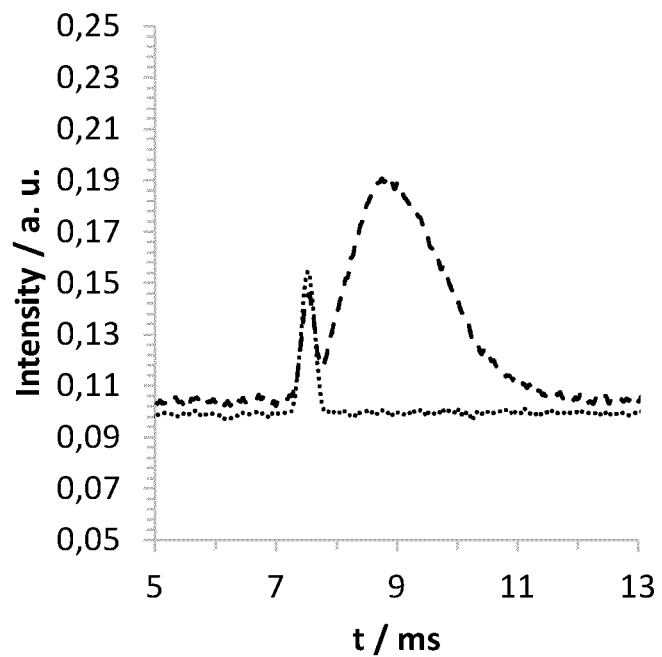
FIG. 1c illustrates the superimposed spectra of a marked diesel containing the chemical marker $N^1,N^1,N^4,N^4$-tetramethyl benzene-1,4-diamine (dashed line) and of a composition of hexane containing the chemical marker $N^1,N^1,N^4,N^4$-tetramethyl benzene-1,4-diamine (dotted line) obtained by laser ionization at 337 nm coupled with ion mobility spectrometry. The chemical marker $N^1,N^1,N^4,N^4$-tetramethyl benzene-1,4-diamine is characterized by a drift time of about 7.6 ms.
Figure 1D:
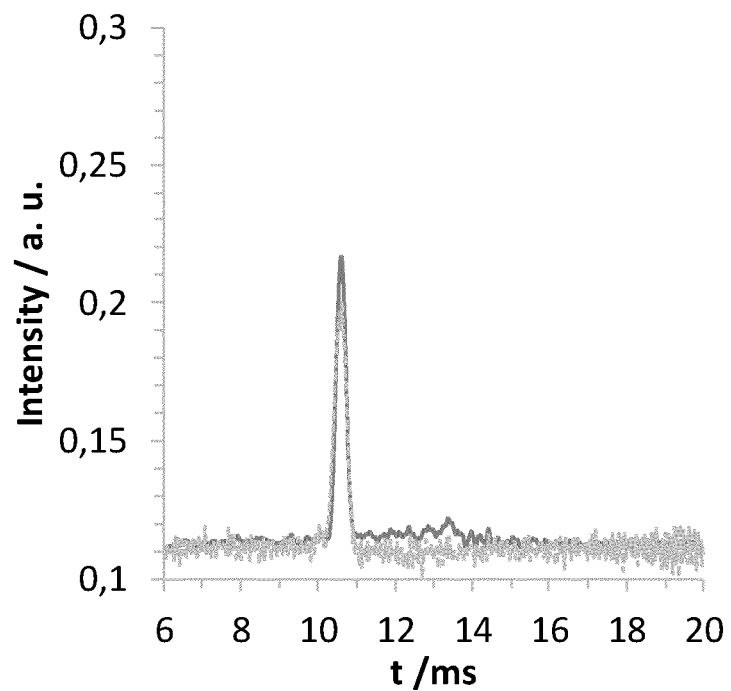
FIG. 1d illustrates the superimposed spectra of a marked diesel containing the chemical marker $N^1,N^1,N^4,N^4$-tetramethyl benzene-1,4-diamine (continuous black line) and of a composition of hexane containing the chemical marker $N^1,N^1,N^4,N^4$-tetramethyl benzene-1,4-diamine (continuous grey line) obtained by laser ionization at 355 nm coupled with ion mobility spectrometry. The chemical marker $N^1,N^1,N^4,N^4$-tetramethyl benzene-1,4-diamine is characterized by a drift time of about 10.6 ms.
Figure 1F:
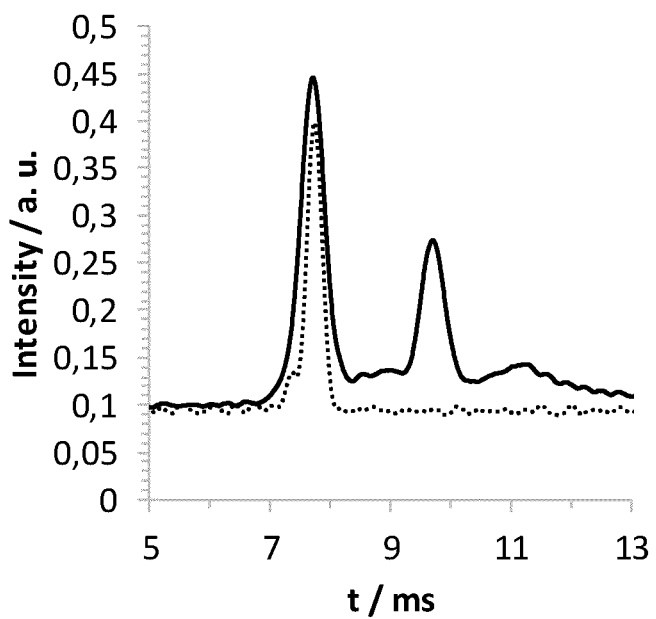
FIG. 1f illustrates the superimposed spectra of a marked gasoline containing the chemical marker $N^1,N^1,N^4,N^4$-tetramethyl benzene-1,4-diamine (continuous line) and of a composition of hexane containing the chemical marker $N^1,N^1,N^4,N^4$-tetramethyl benzene-1,4-diamine (dotted line) obtained by laser ionization at 355 nm coupled with ion mobility spectrometry. The chemical marker $N^1,N^1,N^4,N^4$-tetramethyl benzene-1,4-diamine is characterized by a drift time of about 7.6 ms.
Figure 1G:
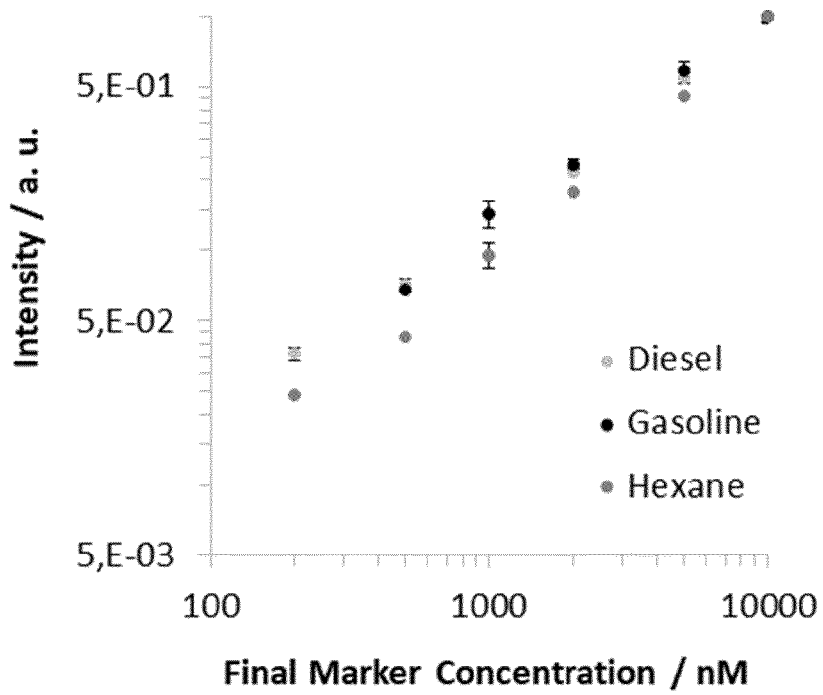
FIG. 1g illustrates the variation of the intensity of the drift time peak of the chemical marker $N^1,N^1,N^4,N^4$-tetramethyl benzene-1,4-diamine with the concentration of said marker in a marked diesel, a marked gasoline and a composition of hexane containing said chemical marker. The compositions containing the marker $N^1,N^1,N^4,N^4$-tetramethyl benzene-1, 4-diamine were analyzed by laser ionization at 355 nm coupled to ion mobility spectrometry. Each measurement was repeated 3 times.
Figure 1H:
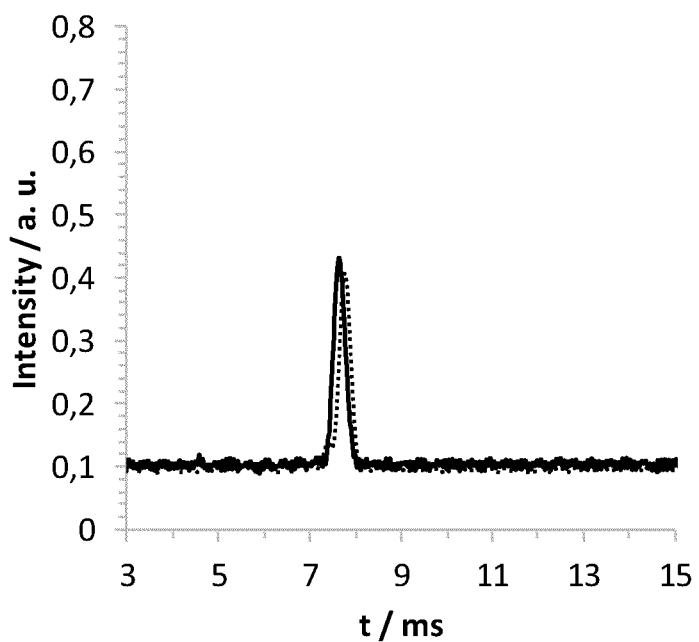
FIG. 1h illustrates the superimposed spectra of a marked mineral oil containing the chemical marker $N^1,N^1,N^4,N^4$-tetramethyl benzene-1,4-diamine (continuous line) and of a composition of hexane containing the chemical marker $N^1,N^1,N^4,N^4$-tetramethyl benzene-1,4-diamine (dotted line) obtained by laser ionization at 355 nm coupled with ion mobility spectrometry. The chemical marker $N^1,N^1,N^4,N^4$-tetramethyl benzene-1,4-diamine is characterized by a drift time of about 7.6 ms.
Figure 2A:
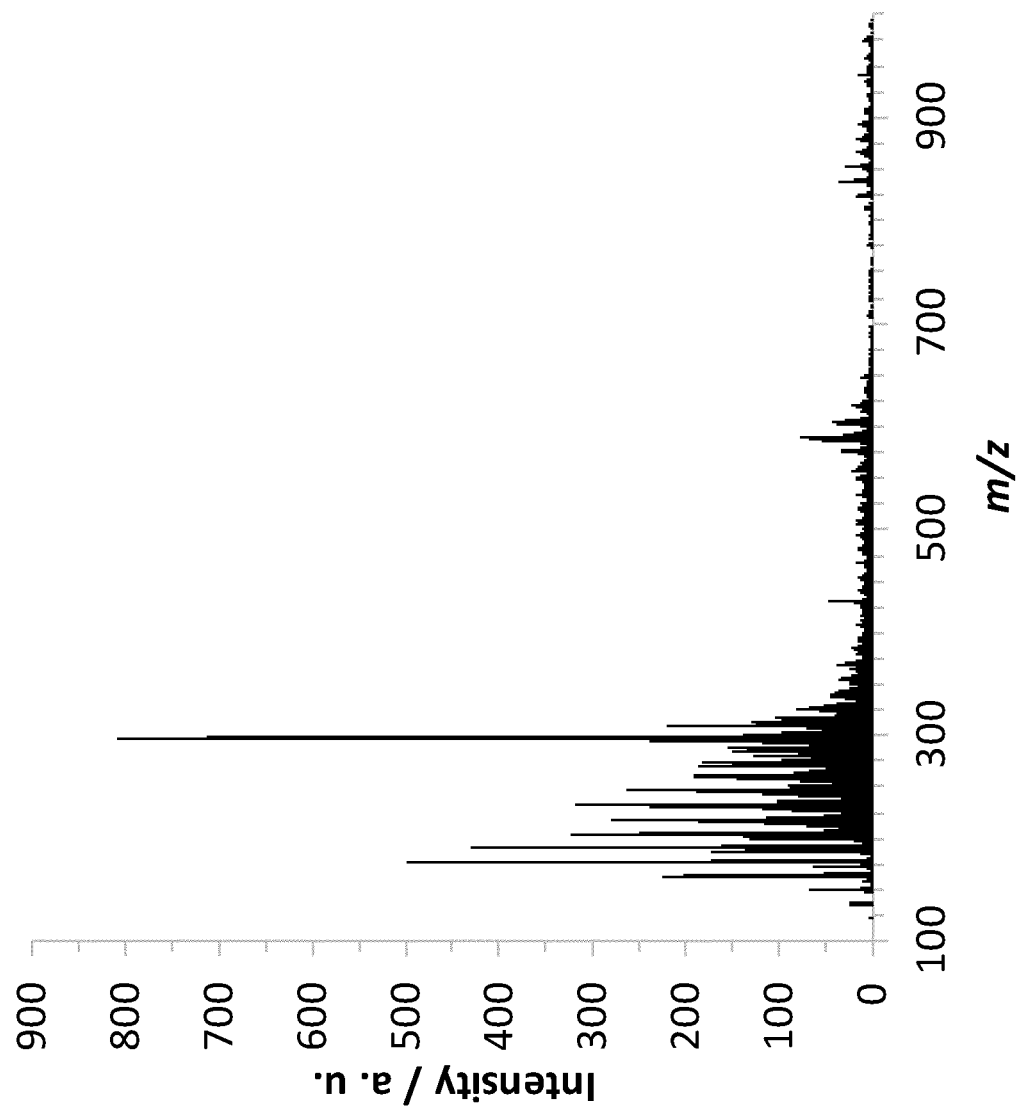
FIG. 2a illustrates for comparison purposes the mass spectrum of a marked diesel containing the marker $N^1,N^1,N^4,N^4$-tetramethyl benzene-1,4-diamine obtained by atmospheric pressure chemical ionization coupled with mass spectrometry.
Figure 2B:
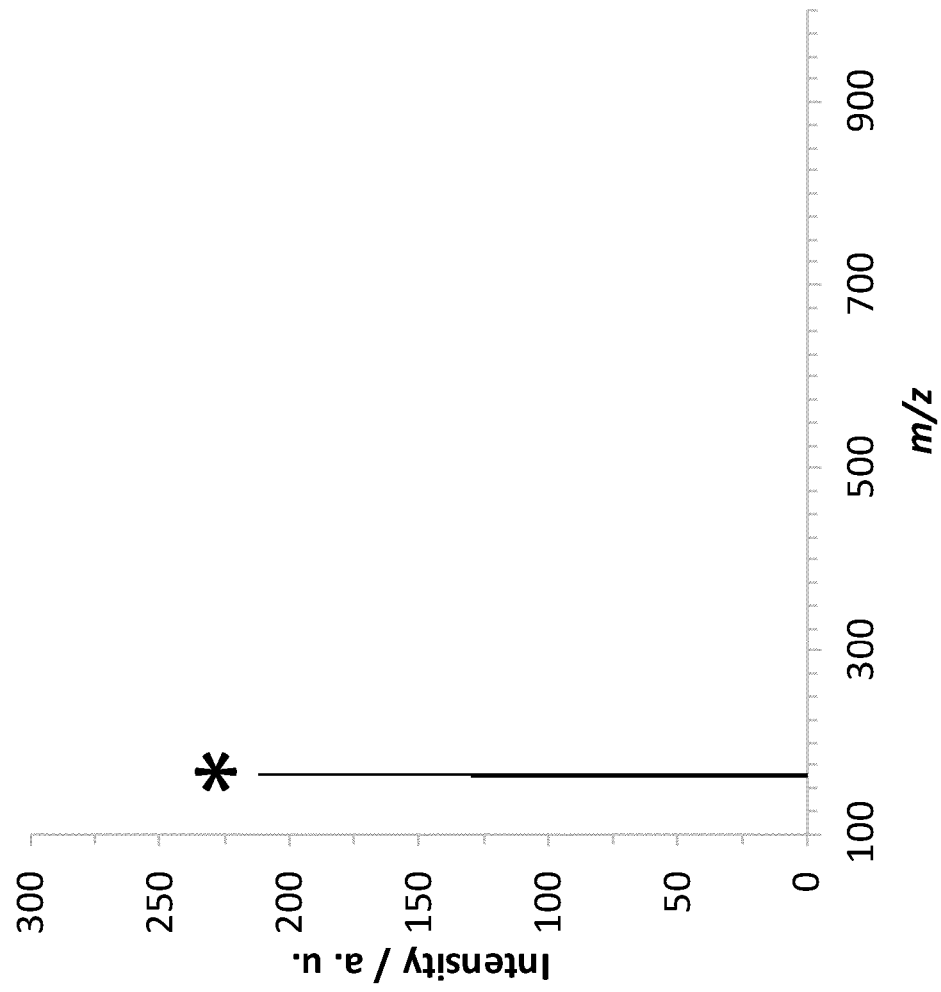
FIG. 2b illustrates the mass spectrum of a marked diesel containing the marker $N^1,N^1,N^4,N^4$-tetramethyl benzene-1, 4-diamine obtained by laser ionization at 355 nm coupled with mass spectrometry. The peak corresponding to the ion ($M^+$) of the marker $N^1,N^1,N^4,N^4$-tetramethyl benzene-1,4-diamine (m/z of 164) is indicated by a "*".
Figure 2C:
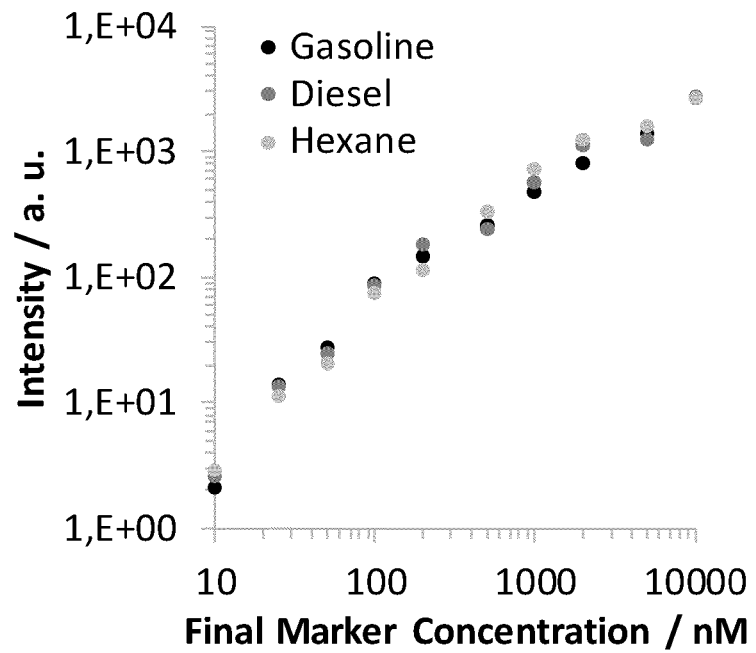
FIG. 2c illustrates the variation of the intensity of the peak corresponding to the ion ($M^+$) of the marker $N^1,N^1,N^4,N^4$-tetramethyl benzene-1,4-diamine with the concentration of the marker $N^1,N^1,N^4,N^4$-tetramethyl benzene-1,4-diamine in a marked diesel, a marked gasoline and a composition of hexane. The different compositions were analyzed by laser ionization at 355 nm coupled with mass spectrometry.

Samples of marked diesel, marked gasoline and marked hexane were analyzed by laser ionization at a wavelength of 355 nm (pulsed laser density: 0.63 mJ/mm$^2$) coupled with mass spectrometry using the protocol described at item I.a conducted on the instrument described at item I.a (see FIG. 2b and FIG. 2c). Samples of marked diesel, marked gasoline, marked hexane, and marked mineral oil were analyzed by laser ionization at a wavelength of 337 nm (pulsed laser density: 0.05 mJ/mm$^2$), or 355 nm (pulsed laser density: 0.63 mJ/mm$^2$) coupled with ion mobility spectrometry (drift gas: nitrogen; flow: 200 mL/min; drift tube voltage: 4.5 kV or 6.5 kV) using the protocol described at item I.b conducted on the instrument described at item I.b (see FIG. 1c, FIG. 1d, FIG. 1f-FIG. 1h).

Figure 1B:
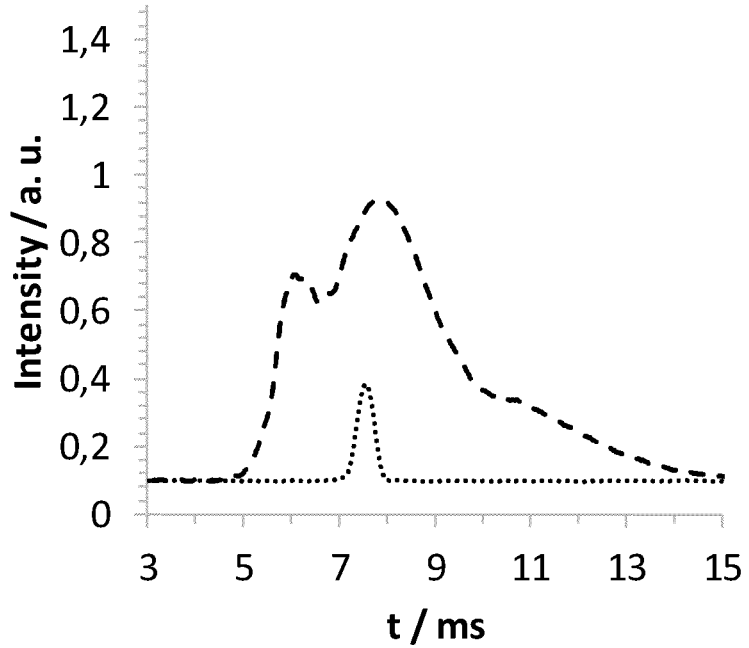
FIG. 1b illustrates for comparative purposes the superimposed ion mobility spectra of a marked diesel containing the chemical marker $N^1,N^1,N^4,N^4$-tetramethyl benzene-1,4-diamine (dashed line) and of a composition of hexane containing the chemical marker $N^1,N^1,N^4,N^4$-tetramethyl benzene-1,4-diamine (dotted line) obtained by laser ionization at 266 nm coupled with ion mobility spectrometry. The chemical marker $N^1,N^1,N^4,N^4$-tetramethyl benzene-1,4-diamine is characterized by a drift time of about 7.6 ms.
Figure 1E:
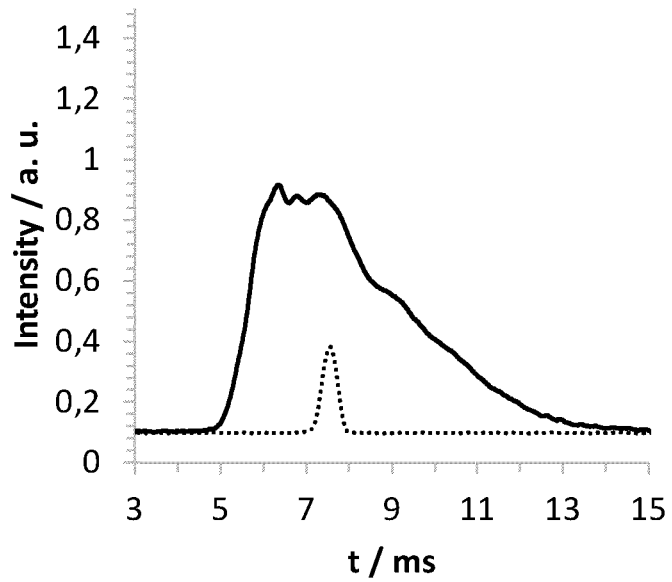
FIG. 1e illustrates for comparative purposes the superimposed ion mobility spectra of a marked gasoline containing the chemical marker $N^1,N^1,N^4,N^4$-tetramethyl benzene-1,4-diamine (continuous line) and of a composition of hexane containing the chemical marker $N^1,N^1,N^4,N^4$-tetramethyl benzene-1,4-diamine (dotted line) obtained by laser ionization at 266 nm coupled with ion mobility spectrometry. The chemical marker $N^1,N^1,N^4,N^4$-tetramethyl benzene-1,4-diamine is characterized by a drift time of about 7.6 ms.
Figure 1I:
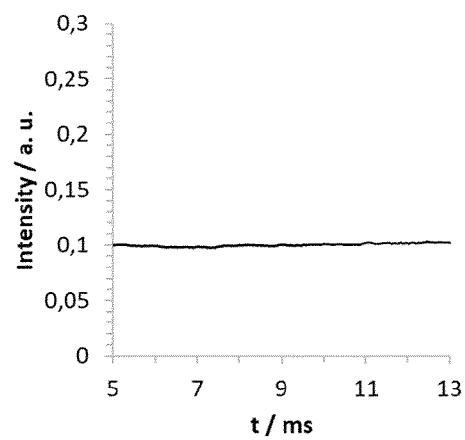
FIG. 1i illustrates for comparative purposes the ion mobility spectra of a marked gasoline containing the chemical marker $N^1,N^1,N^4,N^4$-tetramethyl benzene-1,4-diamine (FIG. 1i i)—continuous line, a marked diesel containing the chemical marker $N^1,N^1,N^4,N^4$-tetramethyl benzene-1,4-diamine (FIG. 1i ii)—dashed line) and of a composition of hexane containing the chemical marker $N^1,N^1,N^4,N^4$-tetramethyl benzene-1,4-diamine (FIG. 1i iii)—dotted line) obtained by sample illumination with pulsed laser light having a wavelength of 406 nm coupled with ion mobility spectrometry.
Figure 1I:
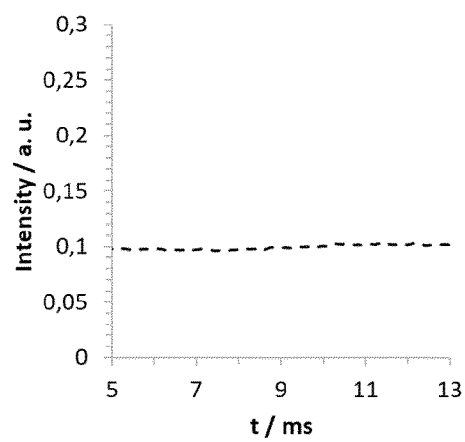
Figure 1I:
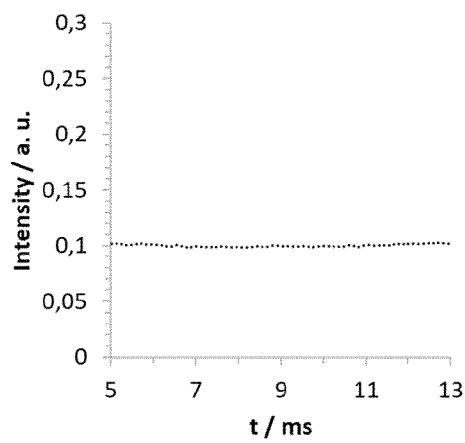

For comparative purposes,
a sample of marked diesel, a sample of marked gasoline and a sample of marked hexane were analyzed by laser ionization at a wavelength of 266 nm (pulsed laser density: 0.13 mJ/mm$^2$) and a wavelength of 406 nm (pulsed laser density: 0.04 mJ/mm$^2$) coupled with ion mobility spectrometry (drift gas: nitrogen; flow: 200 mL/min; drift tube voltage: 6.5 kV) using the protocol described at item I.b conducted on the instrument described at item I.b (see FIG. 1b, FIG. 1e and FIG. 1i);

a sample of marked diesel and a sample of marked hexane were analyzed by APCI-IMS (see FIG. 1a) using the instrument and the protocol described at item II.b above; and a sample of marked diesel was analyzed by APCI-MS (see FIG. 2a) using the instrument and the protocol described at item II.a above.

FIG. 1a illustrates for comparative purposes the superimposed ion mobility spectra of an unmarked SOCAR diesel (black continuous line), of the corresponding marked diesel containing the chemical marker $N^1,N^1,N^4,N^4$-tetramethyl benzene-1,4-diamine at a concentration of 1 µM (dashed black line) and of a composition of hexane containing the chemical marker $N^1,N^1,N^4,N^4$-tetramethyl benzene-1,4-diamine at a concentration of 1 µM (dotted black line) obtained by atmospheric pressure chemical ionization coupled with ion mobility spectrometry (drift gas: nitrogen; flow: 118 mL/min; standard drift tube voltage) abbreviated herein as APCI-IMS. The chemical marker $N^1,N^1,N^4,N^4$-tetramethyl benzene-1,4-diamine is characterized by a drift time of about 10.3 ms. As shown by FIG. 1a, the ion mobility spectrum of the diesel marked with the chemical marker $N^1,N^1,N^4,N^4$-tetramethyl benzene-1,4-diamine is substantially identical with the ion mobility spectrum of the unmarked diesel. Comparison of the ion mobility spectrum of the diesel marked with the chemical marker $N^1,N^1,N^4$,$N^4$-tetramethyl benzene-1,4-diamine and the ion mobility spectrum of the composition of hexane containing the same chemical marker shows that the peak of the chemical marker $N^1,N^1,N^4,N^4$-tetramethyl benzene-1,4-diamine is masked by the peaks originating from the diesel. These results demonstrate that unselective ionization methods coupled with ion mobility spectrometry do not allow the detection of the presence of the chemical marker $N^1,N^1,N^4,N^4$-tetramethyl benzene-1,4-diamine in a diesel matrix and therefore, are not suitable for authentication of a petroleum hydrocarbon allegedly marked with the chemical marker $N^1,N^1,N^4,N^4$-tetramethyl benzene-1,4-diamine and/or for determining adulteration of a marked petroleum hydrocarbon containing the chemical marker $N^1,N^1,N^4,N^4$-tetramethyl benzene-1,4-diamine.

FIG. 1b illustrates for comparative purposes the superimposed ion mobility spectra of a marked SOCAR diesel containing the chemical marker $N^1,N^1,N^4,N^4$-tetramethyl benzene-1,4-diamine at a concentration of 2 µM (dashed line) and of a composition of hexane containing the chemical marker $N^1,N^1,N^4,N^4$-tetramethyl benzene-1,4-diamine at a concentration of 2 µM (dotted line) obtained by laser ionization at 266 nm (pulse energy density: 0.13 mJ/mm$^2$) coupled with ion mobility spectrometry (LI-IMS; drift gas: nitrogen; flow: 200 mL/min; drift tube voltage: 6.5 kV). The chemical marker $N^1,N^1,N^4,N^4$-tetramethyl benzene-1,4-diamine is characterized by a drift time of about 7.6 ms. Comparison of the ion mobility spectrum of the diesel marked with the chemical marker $N^1,N^1,N^4,N^4$-tetramethyl benzene-1,4-diamine and the ion mobility spectrum of the composition of hexane containing the same chemical marker shows that the peak of the chemical marker $N^1,N^1,N^4,N^4$-tetramethyl benzene-1,4-diamine is masked by the peaks originating from the diesel. These results demonstrate that illumination of the marked diesel containing the chemical marker $N^1,N^1,N^4,N^4$-tetramethyl benzene-1,4-diamine with pulsed laser light of a wavelength of 266 nm (pulse energy density: 0.13 mJ/mm$^2$) results in unselective ionization of the sample and does not allow when coupled with ion mobility spectrometry the detection of the presence of the chemical marker $N^1,N^1,N^4,N^4$-tetramethyl benzene-1,4-diamine in a diesel matrix. Thus, such method is not suitable for authentication of a petroleum hydrocarbon allegedly marked with the chemical marker $N^1,N^1,N^4,N^4$-tetramethyl benzene-1,4-diamine and/or for determining adulteration of a marked petroleum hydrocarbon containing the chemical marker $N^1,N^1,N^4,N^4$-tetramethyl benzene-1,4-diamine.

FIG. 1c illustrates the superimposed spectra of a marked SOCAR diesel containing the chemical marker $N^1,N^1,N^4,N^4$-tetramethyl benzene-1,4-diamine at a concentration of 2 µM (dashed line) and of a composition of hexane containing the chemical marker $N^1,N^1,N^4,N^4$-tetramethyl benzene-1,4-diamine at a concentration of 2 µM (dotted line) obtained by laser ionization at 337 nm (pulse energy density: 0.05 mJ/mm$^2$) coupled with ion mobility spectrometry (LI-IMS; drift gas: nitrogen; flow: 200 mL/min; drift tube voltage: 6.5 kV). The chemical marker $N^1,N^1,N^4,N^4$-tetramethyl benzene-1,4-diamine is characterized by a drift time of about 7.6 ms. As demonstrated by FIG. 1c, illumination of the marked diesel containing the chemical marker $N^1,N^1,N^4,N^4$-tetramethyl benzene-1,4-diamine with pulsed laser light of a wavelength of 337 nm (pulse energy density: 0.05 mJ/mm$^2$) results in selective ionization of the chemical marker $N^1,N^1,N^4,N^4$-tetramethyl benzene-1,4-diamine, thereby enabling when coupled with ion mobility spectrometry the detection of the presence of the chemical marker $N^1,N^1,N^4,N^4$-tetramethyl benzene-1,4-diamine in the marked diesel and the authentication of the diesel marked with said chemical marker.

FIG. 1d illustrates the superimposed spectra of a marked SOCAR diesel containing the chemical marker $N^1,N^1,N^4,N^4$-tetramethyl benzene-1,4-diamine at a concentration of 1 µM (continuous black line) and of a composition of hexane containing the chemical marker $N^1,N^1,N^4,N^4$-tetramethyl benzene-1,4-diamine at a concentration of 1 µM (continuous grey line) obtained by laser ionization at 355 nm (pulse energy density: 0.63 mJ/mm$^2$) coupled with ion mobility spectrometry (LI-IMS; drift gas: nitrogen; flow: 200 mL/min; drift tube voltage: 4.5 kV). The chemical marker $N^1,N^1,N^4,N^4$-tetramethyl benzene-1,4-diamine is characterized by a drift time of about 10.6 ms. As demonstrated by FIG. 1d, illumination of the marked diesel containing the chemical marker $N^1,N^1,N^4,N^4$-tetramethyl benzene-1,4-diamine with pulsed laser light of a wavelength of 355 nm (pulse energy density: 0.63 mJ/mm$^2$) results in selective ionization of the chemical marker $N^1,N^1,N^4,N^4$-tetramethyl benzene-1,4-diamine, thereby enabling when coupled with ion mobility spectrometry the detection of the presence of the chemical marker $N^1,N^1,N^4,N^4$-tetramethyl benzene-1,4-diamine and the authentication of the diesel marked with said chemical marker.

FIG. 1e illustrates for comparative purposes the superimposed ion mobility spectra of a marked SP98 AVIA gasoline containing the chemical marker $N^1,N^1,N^4,N^4$-tetramethyl benzene-1,4-diamine at a concentration of 2 µM (continuous line) and of a composition of hexane containing the chemical marker $N^1,N^1,N^4,N^4$-tetramethyl benzene-1,4-diamine at a concentration of 2 µM (dotted line) obtained by laser ionization at 266 nm (pulse energy density: 0.13 mJ/mm$^2$) coupled with ion mobility spectrometry (LI-IMS; drift gas: nitrogen; flow: 200 mL/min; drift tube voltage: 6.5 kV). The chemical marker $N^1,N^1,N^4,N^4$-tetramethyl benzene-1,4-diamine is characterized by a drift time of about 7.6 ms. Comparison of the ion mobility spectrum of the gasoline marked with the chemical marker $N^1,N^1,N^4,N^4$-tetramethyl benzene-1,4-diamine and the ion mobility spectrum of the composition of hexane containing the same chemical marker shows that the peak of the chemical marker $N^1,N^1,N^4,N^4$-tetramethyl benzene-1,4-diamine is masked by the peaks originating from the gasoline. These results demonstrate that illumination of the marked gasoline containing the chemical marker $N^1,N^1,N^4,N^4$-tetramethyl benzene-1,4-diamine with pulsed laser light of a wavelength of 266 nm (pulse energy density: 0.13 mJ/mm$^2$) results in unselective ionization of the sample and does not allow when coupled with ion mobility spectrometry the detection of the presence of the chemical marker $N^1,N^1,N^4,N^4$-tetramethyl benzene-1,4-diamine in a gasoline matrix. Thus, such method is not suitable for authentication of a petroleum hydrocarbon allegedly marked with the chemical marker $N^1,N^1,N^4,N^4$-tetramethyl benzene-1,4-diamine and/or for determining adulteration of a marked petroleum hydrocarbon containing the chemical marker $N^1,N^1,N^4,N^4$-tetramethyl benzene-1,4-diamine.

FIG. 1f illustrates the superimposed spectra of a marked SP98 AVIA gasoline containing the chemical marker $N^1,N^1,N^4,N^4$-tetramethyl benzene-1,4-diamine at a concentration of 5 µM (continuous line) and of a composition of hexane containing the chemical marker $N^1,N^1,N^4,N^4$-tetramethyl benzene-1,4-diamine at a concentration of 5 µM (dotted line) obtained by laser ionization at 355 nm (pulse energy density: 0.63 mJ/mm$^2$) coupled with ion mobility spectrometry (LI-IMS; drift gas: nitrogen; flow: 200 mL/min; drift tube voltage: 6.5 kV). The chemical marker $N^1,N^1,N^4,N^4$-tetramethyl benzene-1,4-diamine is characterized by a drift time of about 7.6 ms. As demonstrated by FIG. 1f, illumination of the marked gasoline containing the chemical marker $N^1,N^1$, $N^4,N^4$-tetramethyl benzene-1,4-diamine with pulsed laser light of a wavelength of 355 nm (pulse energy density: 0.63 mJ/mm$^2$) results in selective ionization of the chemical marker $N^1,N^1,N^4,N^4$-tetramethyl benzene-1,4-diamine, thereby enabling when coupled with ion mobility spectrometry the detection of the presence of the chemical marker $N^1,N^1,N^4,N^4$-tetramethyl benzene-1,4-diamine and the authentication of the gasoline marked with said chemical marker.

FIG. 1g illustrates the variation of the intensity of the drift time peak of the chemical marker $N^1,N^1,N^4,N^4$-tetramethyl benzene-1,4-diamine with the concentration of said marker in a marked SOCAR diesel, a marked SP98 AVIA gasoline and a composition of hexane containing said chemical marker. The compositions containing the marker $N^1,N^1,N^4,N^4$-tetramethyl benzene-1,4-diamine were analyzed by laser ionization at 355 nm (pulse energy density: 0.63 mJ/mm$^2$) coupled to ion mobility spectrometry (drift gas: nitrogen; flow: 200 mL/min; drift tube voltage: 4.5 kV). Each measurement was repeated 3 times. The small error bars, which include manual injection error of the 5 repetitions, demonstrate the high precision of the method and its capacity to detect small variations of chemical marker concentration. The perfect linearity and the overlapping of the three calibration curves prove that the method described herein relying upon illumination of the marked petroleum hydrocarbon with pulsed laser light of a wavelength of 355 nm coupled with ion mobility spectrometry enables the detection and quantification of the marker $N^1,N^1,N^4,N^4$-tetramethyl benzene-1,4-diamine in a variety of petroleum hydrocarbons, including diesel and gasoline, in a broad concentration range from 200 nM to 10 μM, and consequently, the determination of the adulteration of a petroleum hydrocarbon marked with $N^1,N^1,N^4,N^4$-tetramethyl benzene-1,4-diamine.

FIG. 1h illustrates the superimposed spectra of a marked mineral oil containing the chemical marker $N^1,N^1,N^4,N^4$-tetramethyl benzene-1,4-diamine at a concentration of 100 μM (continuous line) and of a composition of hexane containing the chemical marker $N^1,N^1,N^4,N^4$-tetramethyl benzene-1,4-diamine at a concentration of 100 μM (dotted line) obtained by laser ionization at 355 nm coupled with ion mobility spectrometry (LI-IMS; drift gas: nitrogen; flow: 200 mL/min; drift tube voltage: 6.5 kV). To avoid contamination of the mass spectrometer, the marked diesel was diluted in hexane (1:10, v/v) prior to the analysis. The chemical marker $N^1,N^1,N^4,N^4$-tetramethyl benzene-1,4-diamine is characterized by a drift time of about 7.6 ms. As demonstrated by FIG. 1h, illumination of the marked mineral oil containing the chemical marker $N^1,N^1,N^4,N^4$-tetramethyl benzene-1,4-diamine with pulsed laser light of a wavelength of 355 nm (pulse energy density: 0.63 mJ/mm$^2$) results in selective ionization of the chemical marker $N^1,N^1,N^4,N^4$-tetramethyl benzene-1,4-diamine, thereby enabling when coupled with ion mobility spectrometry the detection of the presence of the chemical marker $N^1,N^1,N^4,N^4$-tetramethyl benzene-1,4-diamine and the authentication of the mineral oil marked with said chemical marker.

FIG. 1i illustrates for comparative purposes the ion mobility spectra of a marked SP98 AVIA gasoline containing the chemical marker $N^1,N^1,N^4,N^4$-tetramethyl benzene-1,4-diamine at a concentration of 2 μM (FIG. 1i i)—continuous line), a marked SOCAR diesel containing the chemical marker $N^1,N^1,N^4,N^4$-tetramethyl benzene-1,4-diamine at a concentration of 2 μM (FIG. 1iii)—dashed line) and of a composition of hexane containing the chemical marker $N^1,N^1,N^4,N^4$-tetramethyl benzene-1,4-diamine at a concentration of 2 μM (FIG. 1i iii)—dotted line) obtained by sample illumination with pulsed laser light having a wavelength of 406 nm (pulse energy density: 0.04 mJ/mm$^2$) coupled with ion mobility spectrometry (LI-IMS; drift gas: nitrogen; flow: 200 mL/min; drift tube voltage: 6.5 kV). As shown by FIG. 1i, illumination of the marked samples with pulsed laser light having a wavelength of 406 nm (pulse energy density: 0.04 mJ/mm$^2$) does not lead to sample ionization.

FIG. 2a illustrates for comparison purposes the mass spectrum of a marked SOCAR diesel containing the marker $N^1,N^1,N^4,N^4$-tetramethyl benzene-1,4-diamine obtained by atmospheric pressure chemical ionization coupled with mass spectrometry (APCI-MS). To avoid contamination of the mass spectrometer, the marked diesel was diluted in hexane (1:100, v/v) prior to the analysis. Following dilution, the concentration of the chemical marker was of 100 nM. The mass spectrum displayed by FIG. 2a demonstrates that unselective ionization methods coupled with mass spectrometry results in a complicated mass spectrum that does not allow the easy identification of the peak corresponding to the chemical marker $N^1,N^1,N^4,N^4$-tetramethyl benzene-1,4-diamine. Hence, such method is not suitable for authentication of a petroleum hydrocarbon allegedly marked with the chemical marker $N^1,N^1,N^4,N^4$-tetramethyl benzene-1,4-diamine and/or for determining adulteration of a marked petroleum hydrocarbon containing the chemical marker $N^1,N^1,N^4,N^4$-tetramethyl benzene-1,4-diamine.

FIG. 2b illustrates the mass spectrum of a marked SOCAR diesel containing the marker $N^1,N^1,N^4,N^4$-tetramethyl benzene-1,4-diamine obtained by laser ionization at 355 nm (pulse energy density: 0.63 mJ/mm$^2$) coupled with mass spectrometry. To avoid contamination of the mass spectrometer, the marked diesel was diluted in hexane (1:100, v/v) prior to the analysis. Following dilution, the concentration of the chemical marker was of 100 nM. The peak corresponding to the ion (M$^+$) of the marker $N^1,N^1,N^4,N^4$-tetramethyl benzene-1,4-diamine (m/z of 164) is indicated by a "*". Comparison of the mass spectrum displayed by FIG. 2a relying on the use of unselective ionization methods with the mass spectrum displayed by FIG. 2b demonstrates the difficulty of detecting the marker $N^1,N^1,N^4,N^4$-tetramethyl benzene-1,4-diamine in a marked diesel by atmospheric pressure chemical ionization coupled with mass spectrometry as compared to laser ionization at 355 nm coupled with mass spectrometry. As attested by the mass spectrum displayed by FIG. 2b, illumination of the marked diesel containing the marker $N^1,N^1,N^4,N^4$-tetramethyl benzene-1,4-diamine with pulsed laser light of a wavelength of 355 nm (pulse energy density: 0.63 mJ/mm$^2$) results in the exclusive ionization of the chemical marker $N^1,N^1,N^4,N^4$-tetramethyl benzene-1,4-diamine, thereby enabling the easy detection of the presence of the chemical marker $N^1,N^1,N^4,N^4$-tetramethyl benzene-1,4-diamine at low concentration in a marked diesel and the authentication of said diesel.

FIG. 2c illustrates the variation of the intensity of the peak corresponding to the ion (M$^+$) of the marker $N^1,N^1,N^4,N^4$-tetramethyl benzene-1,4-diamine with the concentration of the marker $N^1,N^1,N^4,N^4$-tetramethyl benzene-1,4-diamine in a marked SOCAR diesel, a marked SP98 AVIA gasoline and a composition of hexane. The different compositions were analyzed by laser ionization at 355 nm (pulse energy density: 0.63 mJ/mm$^2$) coupled with mass spectrometry. To avoid contamination of the mass spectrometer, the compositions were diluted in hexane (1:100, v/v) prior to the analysis. The excellent linearity and the overlapping of the three calibration curves prove that the methods according to the present invention relying on illumination of the marked petroleum hydrocarbon with pulse laser light of a wavelength of 355 nm coupled with mass spectrometry enable the detection and quantification of the marker $N^1,N^1,N^4,N^4$-tetramethyl benzene-1,4-diamine in a variety of petroleum hydrocarbons, including diesel and gasoline, and consequently, the determination of the adulteration of a petroleum hydrocarbon marked with $N^1,N^1,N^4,N^4$-tetramethyl benzene-1,4-diamine. It is to be noticed the low matrix effect on the signal obtained by ion mobility spectrometry and that similar levels of detection are obtained with a composition of laboratory grade hexane and with complex petroleum hydrocarbons, such as diesel and gasoline.

Example 2: Detection and Quantification of the Chemical Marker $N^1,N^1,N^5,N^5$-tetraethyl-naphthalene-1,5-diamine in a Petroleum Hydrocarbon The authenticity and adulteration of petroleum hydrocarbons marked with the chemical marker $N^1,N^1,N^5,N^5$-tetraethyl-naphthalene-1,5-diamine (CAS no.: 861347-34-4) were tested.

All chemicals were purchased from Sigma Aldrich and were used without further purification. The marker $N^1$, $N^1$, $N^5$, $N^5$-tetraethyl-naphthalene-1,5-diamine was prepared according to the description here below. Pre-cut Silica gel 60 F254 TLC plates from Merck KGaA were used for thin-layer chromatography (TLC). Silica gel 60 (0.04-0.063 mm) purchased from Carl Roth GmbH & CO.KG was used for flash chromatography. All NMR spectra were measured on a Bruker Avance 300 MHz Spectrometer. The resulting reported chemical shifts (δ: in ppm) are referred the chloroform (δ=7.26 ppm) for $^1$H NMR and (δ=77.23 ppm) for $^{13}$C NMR.

Synthesis Chemical Marker $N^1,N^1,N^5,N^5$-tetraethyl-naphthalene-1,5-diamine

In a three neck flask 1,5-diaminonaphtalene (1 equiv., 10 mmol, 1.59 g) (CAS no.: 2243-62-1, Sigma Aldrich, 97%) and ethyl bromide (8 equiv., 80 mmol, 8.72 g, 5.92 mL) (CAS no. 74-96-4, Sigma Aldrich, 98%) were dissolved in acetonitrile (75 mL) under argon atmosphere. N,N-diisopropylethylamine (8 equiv., 80 mmol, 10.32 g, 13.57 mL) (CAS no.: 7087-68-5, Sigma Aldrich, ≥99%) was added dropwise at room temperature. The obtained solution was stirred vigorously under reflux for 12 h. The reaction mixture was cooled to room temperature and extracted with toluene and water. After evaporation of the solvent, the mixture was purified by liquid chromatography yielding $N^1,N^1,N^5,N^5$-tetraethyl-naphthalene-1,5-diamine (0.73 g, 27%) ($R_f$=0.95 in hexanes/ethyl acetate=10:1) as a colorless solid.

$^1$H NMR (300 MHz, CDCl$_3$) δ=8.05 (d, J=7.33 Hz, 2H), 7.39 (dd, J=7.33, 8.1 Hz, 2H), 7.10 (d, J=8.10 Hz, 2H), 3.20 (q, J=7.10 Hz, 8H), 1.07 (t, J=7.1 Hz, 12H);

$^{13}$C NMR (300 MHz, CDCl$_3$) δ=148.33, 132.84, 124.67, 119.69, 117.84, 47.87, 12.54; MS (ESI) m/z=271.2174 (M+H)$^+$ (calcd. for $C_{18}H_{27}N_2$: 271.2174); IR (film): 3044 (m), 2968 (s), 1983 (w), 1858 (w), 1585 (S), 783 (s).

For petroleum hydrocarbon marking, a concentrate of $N^1,N^1,N^5,N^5$-tetraethyl-naphthalene-1,5-diamine in hexane was prepared to a concentration of 5 mmol/L and added to diesel, gasoline or hexane to yield marked diesel samples, marked gasoline samples and marked hexane samples.

Samples of marked diesel, marked gasoline and marked hexane were analyzed by laser ionization at a wavelength of 355 nm (pulsed laser density: 0.63 mJ/mm$^2$) coupled with mass spectrometry using the protocol described at item I.a conducted on the instrument described at item I.a (see FIG. 4a-FIG. 4c), as well as by laser ionization at 308 nm (pulsed laser density: 0.10 mJ/mm$^2$), 337 nm (pulsed laser density: 0.05 mJ/mm$^2$), or 355 nm (pulsed laser density: 0.63 mJ/mm$^2$) coupled with ion mobility spectrometry (drift gas: helium; flow: 200 mL/min; drift tube voltage: 2.5 kV; or drift gas: nitrogen; flow: 200 mL/min; drift tube voltage: 6.5 kV) using the protocol described at item I.b conducted on the instrument described at item I.b (see FIGS. 3c-3f, 3h and 3i).

Figure 3A:
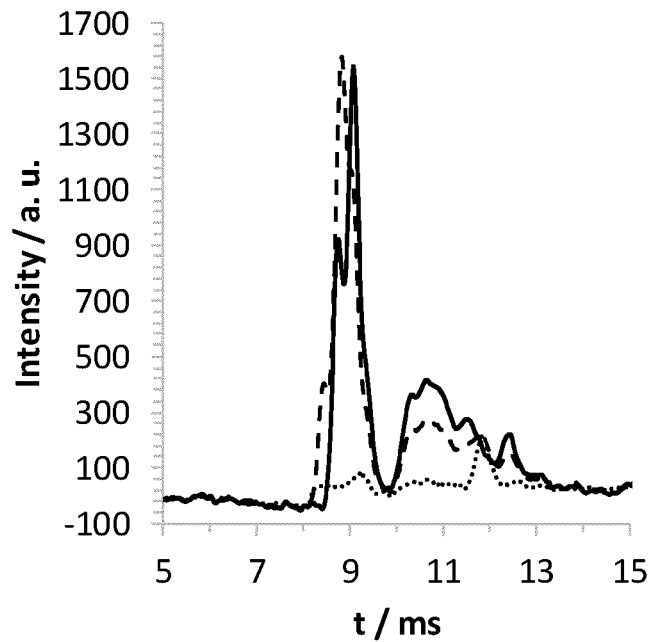
FIG. 3a illustrates for comparative purposes the superimposed ion mobility spectra of an unmarked diesel (black continuous line), the corresponding diesel marked with the chemical marker $N^1,N^1,N^5,N^5$-tetraethyl-naphthalene-1,5-diamine (dashed black line) and a composition of hexane containing the chemical marker $N^1,N^1,N^5,N^5$-tetraethyl-naphthalene-1,5-diamine (dotted black line) obtained by atmospheric pressure chemical ionization coupled with ion mobility spectrometry.
Figure 3B:
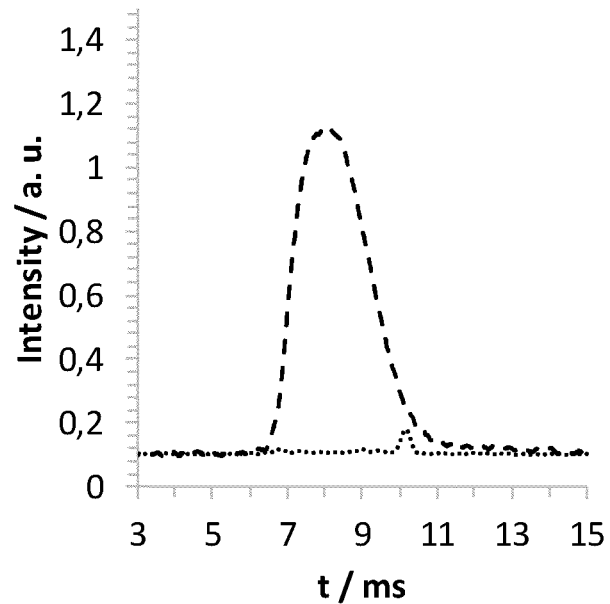
FIG. 3b illustrates for comparative purposes the superimposed ion mobility spectra of a marked diesel containing the chemical marker $N^1,N^1,N^5,N^5$-tetraethyl-naphthalene-1,5-diamine (dashed line) and of a composition of hexane containing the chemical marker $N^1,N^1,N^5,N^5$-tetraethyl-naphthalene-1,5-diamine (dotted line) obtained by laser ionization at 266 nm coupled with ion mobility spectrometry. The chemical marker $N^1,N^1,N^5,N^5$-tetraethyl-naphthalene-1,5-diamine is characterized by a drift time of about 10.2 ms.
Figure 3C:
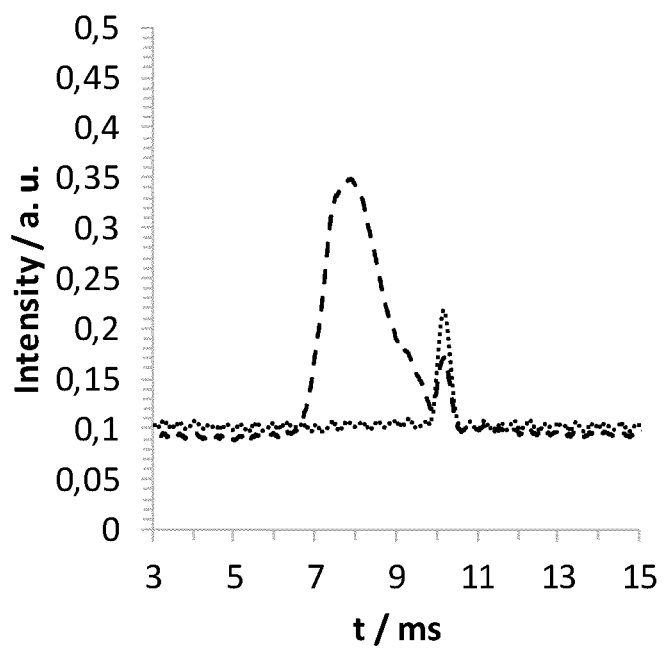
FIG. 3c illustrates the superimposed spectra of a marked diesel containing the chemical marker $N^1,N^1,N^5,N^5$-tetraethyl-naphthalene-1,5-diamine (dashed line) and of a composition of hexane containing the chemical marker $N^1,N^1,N^5,N^5$-tetraethyl-naphthalene-1,5-diamine (dotted line) obtained by laser ionization at 308 nm coupled with ion mobility spectrometry. The chemical marker $N^1,N^1,N^5,N^5$-tetraethyl-naphthalene-1,5-diamine is characterized by a drift time of about 10.2 ms.
Figure 3D:
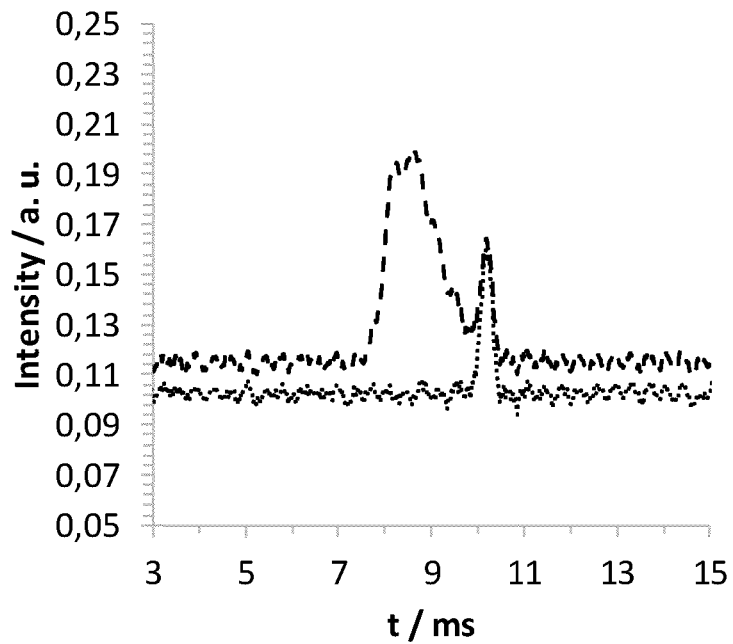
FIG. 3d illustrates the superimposed spectra of a marked diesel containing the chemical marker $N^1,N^1,N^5,N^5$-tetraethyl-naphthalene-1,5-diamine (dashed line) and of a composition of hexane containing the chemical marker $N^1,N^1,N^5,N^5$-tetraethyl-naphthalene-1,5-diamine (dotted line) obtained by laser ionization at 337 nm coupled with ion mobility spectrometry. The chemical marker $N^1,N^1,N^5,N^5$-tetraethyl-naphthalene-1,5-diamine is characterized by a drift time of about 10.2 ms.
Figure 3E:
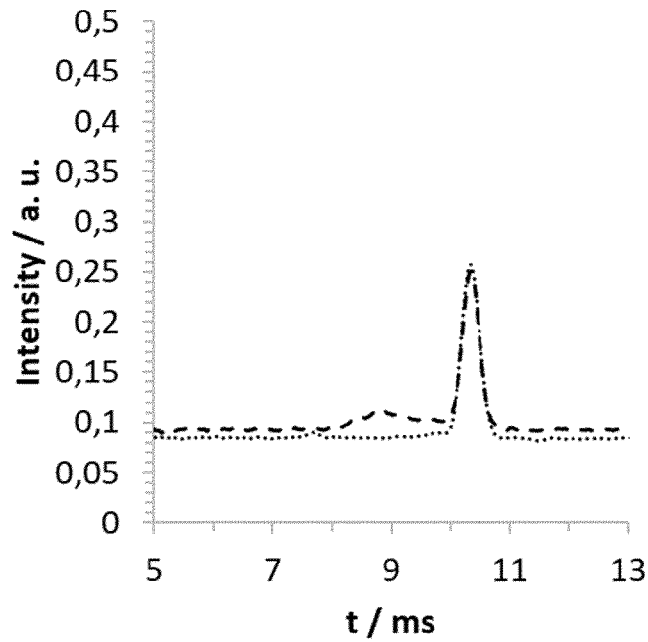
FIG. 3e illustrates the superimposed spectra of a marked diesel containing the chemical marker $N^1,N^1,N^5,N^5$-tetraethyl-naphthalene-1,5-diamine (dashed line) and of a composition of hexane containing the chemical marker $N^1,N^1,N^5,N^5$-tetraethyl-naphthalene-1,5-diamine (dotted line) obtained by laser ionization at 355 nm coupled with ion mobility spectrometry. The chemical marker $N^1,N^1,N^5,N^5$-tetraethyl-naphthalene-1,5-diamine is characterized by a drift time of about 10.2 ms.
Figure 3F:
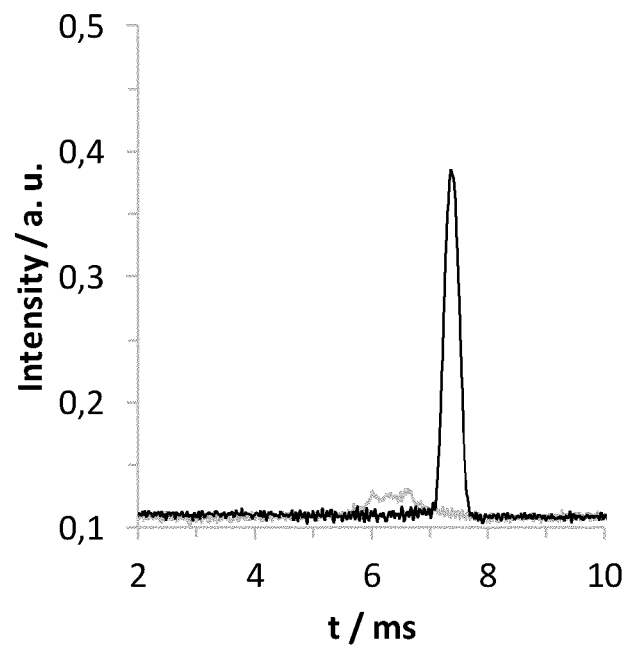
FIG. 3f illustrates the superimposed ion mobility spectra of an unmarked diesel (grey colored spectrum) and of a composition of hexane containing the chemical marker $N^1, N^1, N^5, N^5$-tetraethyl-naphthalene-1,5-diamine (black colored spectrum) obtained by laser ionization at 355 nm coupled with ion mobility spectrometry. The chemical marker $N^1, N^1, N^5, N^5$-tetraethyl-naphthalene-1,5-diamine is characterized by a drift time of about 7.4 ms.
Figure 3G:
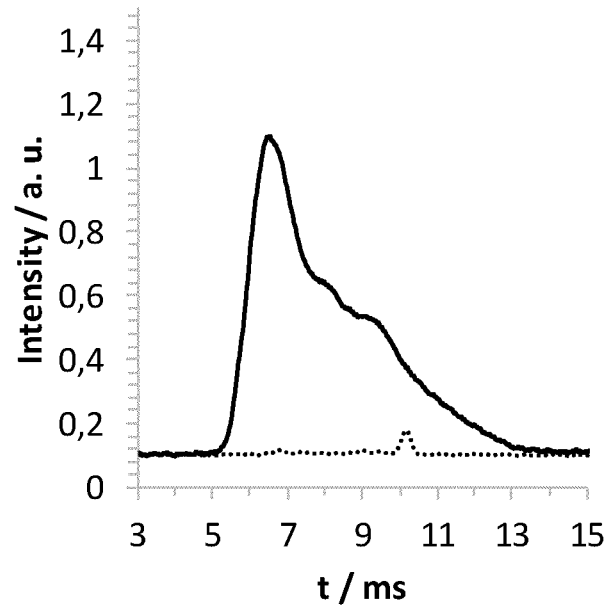
FIG. 3g illustrates for comparative purposes the superimposed ion mobility spectra of a marked gasoline containing the chemical marker $N^1,N^1,N^5,N^5$-tetraethyl-naphthalene-1, 5-diamine (continuous line) and of a composition of hexane containing the chemical marker $N^1,N^1,N^4,N^4$-tetramethyl benzene-1,4-diamine (dotted line) obtained by laser ionization at 266 nm coupled with ion mobility spectrometry. The chemical marker $N^1,N^1,N^5,N^5$-tetraethyl-naphthalene-1,5-diamine is characterized by a drift time of about 10.2 ms.
Figure 3H:
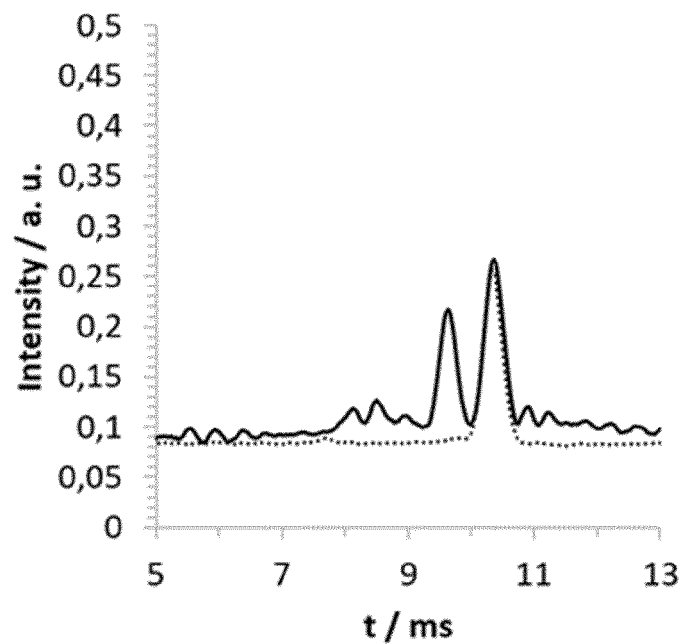
FIG. 3h illustrates the superimposed spectra of a marked gasoline containing the chemical marker $N^1,N^1,N^5,N^5$-tetraethyl-naphthalene-1,5-diamine (continuous line) and of a composition of hexane containing the chemical marker $N^1,N^1,N^5,N^5$-tetraethyl-naphthalene-1,5-diamine (dotted line) obtained by laser ionization at 355 nm coupled with ion mobility spectrometry. The chemical marker $N^1,N^1,N^5,N^5$-tetraethyl-naphthalene-1,5-diamine is characterized by a drift time of about 10.2 ms.
Figure 3I:
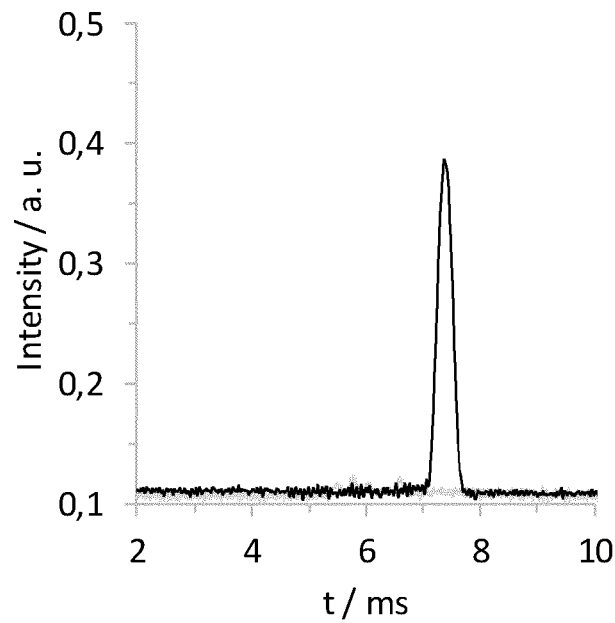
FIG. 3i illustrates the superimposed ion mobility spectra of an unmarked gasoline (grey colored spectrum) and of a composition of hexane containing the chemical marker $N^1$, $N^1$, $N^5$, $N^5$-tetraethyl-naphthalene-1,5-diamine (black colored spectrum) obtained by laser ionization at 355 nm coupled with ion mobility spectrometry. The chemical marker $N^1$, $N^1$, $N^5$, $N^5$-tetraethyl-naphthalene-1,5-diamine is characterized by a drift time of about 7.4 ms.
Figure 3J:
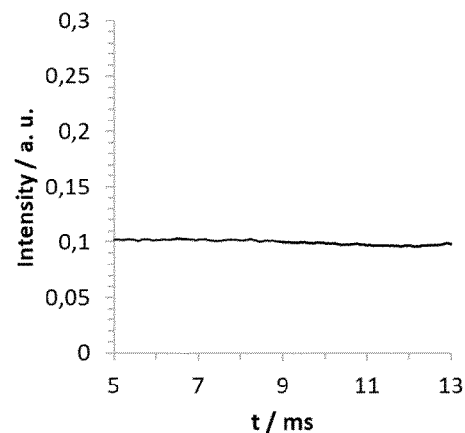
FIG. 3j illustrates for comparative purposes the ion mobility spectra of a marked gasoline containing the chemical marker $N^1$, $N^1$, $N^5$, $N^5$-tetraethyl-naphthalene-1,5-diamine (FIG. 3j i)—continuous line), a marked diesel containing the chemical marker $N^1$, $N^1$, $N^5$, $N^5$-tetraethyl-naphthalene-1,5-diamine (FIG. 3j ii)—dashed line) and of a composition of hexane containing the chemical marker $N^1$, $N^1$, $N^5$, $N^5$-tetraethyl-naphthalene-1,5-diamine (FIG. 3j iii)—dotted line) obtained by sample illumination with pulsed laser light having a wavelength of 406 nm coupled with ion mobility spectrometry.
Figure 3J:
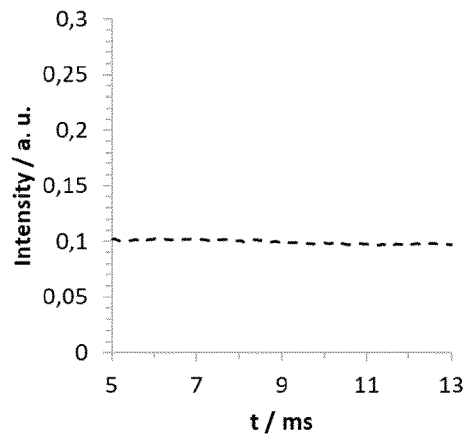
Figure 3J:
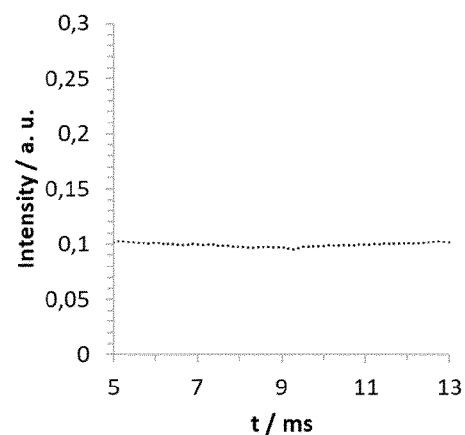

For comparative purposes,
a sample of marked diesel and a sample of marked hexane were analyzed by APCI-IMS (see FIG. 3a) using the instrument and the protocol described at item II.b above, and
a sample of marked diesel, a sample of marked gasoline and a sample of marked hexane were analyzed by laser ionization at a wavelength of 266 nm (pulsed laser density: 0.13 mJ/mm$^2$) and at a wavelength of 406 nm (pulsed laser density: 0.04 mJ/mm$^2$) coupled with ion mobility spectrometry (drift gas: nitrogen; flow: 200 mL/min; drift tube voltage: 6.5 kV) using the protocol described at item I.b conducted on the instrument described at item I.b (see FIG. 3b, FIG. 3g and FIG. 3j).

FIG. 3a illustrates for comparative purposes the superimposed ion mobility spectra of an unmarked SOCAR diesel (black continuous line), the corresponding diesel marked with the chemical marker $N^1,N^1,N^5,N^5$-tetraethyl-naphthalene-1,5-diamine at a concentration of 2 μM (dashed black line) and a composition of hexane containing the chemical marker $N^1,N^1,N^5,N^5$-tetraethyl-naphthalene-1,5-diamine at a concentration of 2 μM (dotted black line) obtained by atmospheric pressure chemical ionization coupled with ion mobility spectrometry (drift gas: nitrogen; flow: 200 mL/min; standard drift tube voltage) abbreviated herein as APCI-IMS. To minimize the contamination of the spectrometer, the unmarked diesel was diluted in hexane (1:100, v/v) prior to the analysis. As shown by FIG. 3a, the ion mobility spectrum of the diesel marked with the chemical marker $N^1,N^1,N^5,N^5$-tetraethyl-naphthalene-1,5-diamine is substantially identical with the ion mobility spectrum of the unmarked diesel. Comparison of the ion mobility spectrum of the diesel marked with the chemical marker $N^1,N^1,N^5$, $N^5$-tetraethyl-naphthalene-1,5-diamine and the ion mobility spectrum of the composition of hexane containing the same chemical marker shows that the peak of the chemical $N^1,N^1,N^5,N^5$-tetraethyl-naphthalene-1,5-diamine is masked by the peaks originating from the diesel. These results demonstrate that unselective ionization methods coupled with ion mobility spectrometry do not allow detecting the presence of the chemical marker $N^1,N^1,N^5,N^5$-tetraethyl-naphthalene-1,5-diamine in a diesel matrix and therefore, are not suitable for authentication of a petroleum hydrocarbon allegedly marked with the chemical marker $N^1,N^1,N^5$, $N^5$-tetraethyl-naphthalene-1,5-diamine and/or for determining adulteration of a marked petroleum hydrocarbon containing the chemical marker $N^1,N^1,N^5,N^5$-tetraethyl-naphthalene-1,5-diamine.

FIG. 3b illustrates for comparative purposes the superimposed ion mobility spectra of a marked SOCAR diesel containing the chemical marker $N^1,N^1,N^5,N^5$-tetraethyl-naphthalene-1,5-diamine at a concentration of 2 μM (dashed line) and of a composition of hexane containing the chemical marker $N^1,N^1,N^5,N^5$-tetramethyl benzene-1,4-diamine at a concentration of 2 μM (dotted line) obtained by laser ionization at 266 nm (pulse energy density: 0.13 mJ/mm$^2$) coupled with ion mobility spectrometry (LI-IMS; drift gas:

nitrogen; flow: 200 mL/min; drift tube voltage: 6.5 kV). The chemical marker $N^1,N^1,N^5,N^5$-tetraethyl-naphthalene-1,5-diamine is characterized by a drift time of about 10.2 ms. Comparison of the ion mobility spectrum of the diesel marked with the chemical marker $N^1,N^1,N^5,N^5$-tetraethyl-naphthalene-1,5-diamine and the ion mobility spectrum of the composition of hexane containing the same chemical marker shows that the peak of the chemical marker $N^1,N^1,N^5,N^5$-tetraethyl-naphthalene-1,5-diamine is masked by the peaks originating from the diesel. These results demonstrate that illumination of the marked diesel containing the chemical marker $N^1,N^1,N^5,N^5$-tetraethyl-naphthalene-1,5-diamine with pulsed laser light of a wavelength of 266 nm (pulse energy density: 0.13 mJ/mm$^2$) results in unselective ionization of the sample and does not allow when coupled with ion mobility spectrometry the detection of the presence of the chemical marker $N^1,N^1,N^5,N^5$-tetraethyl-naphthalene-1,5-diamine in a diesel matrix. Thus, such method is not suitable for authenticating a petroleum hydrocarbon allegedly marked with the chemical marker $N^1,N^1,N^5,N^5$-tetraethyl-naphthalene-1,5-diamine and/or for determining adulteration of a marked petroleum hydrocarbon containing the chemical marker $N^1,N^1,N^5,N^5$-tetraethyl-naphthalene-1,5-diamine.

FIG. 3c illustrates the superimposed spectra of a marked SOCAR diesel containing the chemical marker $N^1,N^1,N^5,N^5$-tetraethyl-naphthalene-1,5-diamine at a concentration of 2 μM (dashed line) and of a composition of hexane containing the chemical marker $N^1,N^1,N^5,N^5$-tetraethyl-naphthalene-1,5-diamine at a concentration of 2 μM (dotted line) obtained by laser ionization at 308 nm (pulse energy density: 0.10 mJ/mm$^2$) coupled with ion mobility spectrometry (LI-IMS; drift gas: nitrogen; flow: 200 mL/min; drift tube voltage: 6.5 kV). The chemical marker $N^1,N^1,N^5,N^5$-tetraethyl-naphthalene-1,5-diamine is characterized by a drift time of about 10.2 ms. As demonstrated by FIG. 3c, illumination of the marked diesel containing the chemical marker $N^1,N^1,N^5,N^5$-tetraethyl-naphthalene-1,5-diamine with pulsed laser light of a wavelength of 308 nm (pulse energy density: 0.10 mJ/mm$^2$) results in selective ionization of the chemical marker $N^1,N^1,N^5,N^5$-tetraethyl-naphthalene-1,5-diamine, thereby enabling when coupled with ion mobility spectrometry the detection of the presence of the chemical marker $N^1,N^1,N^5,N^5$-tetraethyl-naphthalene-1,5-diamine in the marked diesel and the authentication of the diesel marked with said chemical marker.

FIG. 3d illustrates the superimposed spectra of a marked SOCAR diesel containing the chemical marker $N^1,N^1,N^5,N^5$-tetraethyl-naphthalene-1,5-diamine at a concentration of 2 μM (dashed line) and of a composition of hexane containing the chemical marker $N^1,N^1,N^5,N^5$-tetraethyl-naphthalene-1,5-diamine at a concentration of 2 μM (dotted line) obtained by laser ionization at 337 nm (pulse energy density: 0.05 mJ/mm$^2$) coupled with ion mobility spectrometry (LI-IMS; drift gas: nitrogen; flow: 200 mL/min; drift tube voltage: 6.5 kV). The chemical marker $N^1,N^1,N^5,N^5$-tetraethyl-naphthalene-1,5-diamine is characterized by a drift time of about 10.2 ms. As demonstrated by FIG. 3d, illumination of the marked diesel containing the chemical marker $N^1,N^1,N^5,N^5$-tetraethyl-naphthalene-1,5-diamine with pulsed laser light of a wavelength of 337 nm (pulse energy density: 0.05 mJ/mm$^2$) results in selective ionization of the chemical marker $N^1,N^1,N^5,N^5$-tetraethyl-naphthalene-1,5-diamine, thereby enabling when coupled with ion mobility spectrometry the detection of the presence of the chemical marker $N^1,N^1,N^5,N^5$-tetraethyl-naphthalene-1,5-diamine in the marked diesel and the authentication of the diesel marked with said chemical marker.

FIG. 3e illustrates the superimposed spectra of a marked SOCAR diesel containing the chemical marker $N^1,N^1,N^5,N^5$-tetraethyl-naphthalene-1,5-diamine at a concentration of 5 μM (dashed line) and of a composition of hexane containing the chemical marker $N^1,N^1,N^5,N^5$-tetraethyl-naphthalene-1,5-diamine at a concentration of 5 μM (dotted line) obtained by laser ionization at 355 nm (pulse energy density: 0.63 mJ/mm$^2$) coupled with ion mobility spectrometry (LI-IMS; drift gas: nitrogen; flow: 200 mL/min; drift tube voltage: 6.5 kV). The chemical marker $N^1,N^1,N^5,N^5$-tetraethyl-naphthalene-1,5-diamine is characterized by a drift time of about 10.2 ms. As demonstrated by FIG. 3e, illumination of the marked diesel containing the chemical marker $N^1,N^1,N^5,N^5$-tetraethyl-naphthalene-1,5-diamine with pulsed laser light of a wavelength of 355 nm (pulse energy density: 0.63 mJ/mm$^2$) results in selective ionization of the chemical marker $N^1,N^1,N^5,N^5$-tetraethyl-naphthalene-1,5-diamine, thereby enabling when coupled with ion mobility spectrometry the detection of the presence of the chemical marker $N^1,N^1,N^5,N^5$-tetraethyl-naphthalene-1,5-diamine in the marked diesel and the authentication of the diesel marked with said chemical marker.

FIG. 3f illustrates the superimposed ion mobility spectra of an unmarked SOCAR diesel (grey colored spectrum) and of a composition of hexane containing the chemical marker $N^1, N^1, N^5, N^5$-tetraethyl-naphthalene-1,5-diamine at a concentration of 2 μM (black colored spectrum) obtained by laser ionization at 355 nm (pulse energy density: 0.63 mJ/mm$^2$) coupled with ion mobility spectrometry (drift gas: helium; flow: 200 mL/min; drift tube voltage: 2.5 kV). To minimize the contamination of the spectrometer, the unmarked diesel was diluted in hexane (1:100, v/v) prior to the analysis. The chemical marker $N^1, N^1, N^5, N^5$-tetraethyl-naphthalene-1,5-diamine is characterized by a drift time of about 7.4 ms. As attested by FIG. 3f, as diesel generates a negligible noise when subjected to laser ionization at 355 nm (pulse energy density: 0.63 mJ/mm$^2$) coupled with ion mobility spectrometry that does not mask the peak corresponding to the chemical marker $N^1, N^1, N^5, N^5$-tetraethyl-naphthalene-1,5-diamine, the presence of said chemical marker can be easily detected in a marked diesel thereof. Thus, illumination of a diesel containing the marker $N^1,N^1,N^5,N^5$-tetraethyl-naphthalene-1,5-diamine with pulsed laser light of a wavelength of 355 nm (pulse energy density: 0.63 mJ/mm$^2$) coupled with ion mobility spectrometry (drift gas: helium; flow: 200 mL/min; drift tube voltage: 2.5 kV) is suitable for determining the authenticity of said marked diesel.

FIG. 3g illustrates for comparative purposes the superimposed ion mobility spectra of a marked SP98 AVIA gasoline containing the chemical marker $N^1,N^1,N^6,N^6$-tetraethyl-naphthalene-1,5-diamine at a concentration of 2 μM (continuous line) and of a composition of hexane containing the chemical marker $N^1,N^1,N^5,N^5$-tetramethyl benzene-1,4-diamine at a concentration of 2 μM (dotted line) obtained by laser ionization at 266 nm (pulse energy density: 0.13 mJ/mm$^2$) coupled with ion mobility spectrometry (LI-IMS; drift gas: nitrogen; flow: 200 mL/min; drift tube voltage: 6.5 kV). The chemical marker $N^1,N^1,N^5,N^5$-tetraethyl-naphthalene-1,5-diamine is characterized by a drift time of about 10.2 ms. Comparison of the ion mobility spectrum of the gasoline marked with the chemical marker $N^1,N^1,N^5,N^5$-tetraethyl-naphthalene-1,5-diamine and the ion mobility spectrum of the composition of hexane containing the same chemical marker shows that the peak of the chemical marker $N^1,N^1,N^5,N^5$-tetraethyl-naphthalene-1,5-diamine is masked by the peaks originating from the gasoline. These results demonstrate that illumination of the marked gasoline containing the chemical marker $N^1,N^1,N^6,N^6$-tetraethyl-naphthalene-1,5-diamine with pulsed laser light of a wavelength of 266 nm (pulse energy density: 0.13 mJ/mm$^2$) results in unselective ionization of the sample and does not allow when coupled with ion mobility spectrometry detecting the presence of the chemical marker $N^1,N^1,N^5,N^5$-tetraethyl-naphthalene-1,5-diamine in a gasoline matrix. Thus, such method is not suitable for authentication of a petroleum hydrocarbon allegedly marked with the chemical marker $N^1,N^1,N^5,N^5$-tetraethyl-naphthalene-1,5-diamine and/or for determining adulteration of a marked petroleum hydrocarbon containing the chemical marker $N^1,N^1,N^5,N^5$-tetraethyl-naphthalene-1,5-diamine.

FIG. 3h illustrates the superimposed spectra of a marked SP98 AVIA gasoline containing the chemical marker $N^1,N^1,N^5,N^5$-tetraethyl-naphthalene-1,5-diamine at a concentration of 5 µM (continuous line) and of a composition of hexane containing the chemical marker $N^1,N^1,N^5,N^5$-tetraethyl-naphthalene-1,5-diamine at a concentration of 5 µM (dotted line) obtained by laser ionization at 355 nm (pulse energy density: 0.63 mJ/mm$^2$) coupled with ion mobility spectrometry (LI-IMS; drift gas: nitrogen; flow: 200 mL/min; drift tube voltage: 6.5 kV). The chemical marker $N^1,N^1,N^5,N^5$-tetraethyl-naphthalene-1,5-diamine is characterized by a drift time of about 10.2 ms. As demonstrated by FIG. 3h, illumination of the marked gasoline containing the chemical marker $N^1,N^1,N^5,N^5$-tetraethyl-naphthalene-1,5-diamine with pulsed laser light of a wavelength of 355 nm (pulse energy density: 0.63 mJ/mm$^2$) results in selective ionization of the chemical marker $N^1,N^1,N^5,N^5$-tetraethyl-naphthalene-1,5-diamine, thereby enabling when coupled with ion mobility spectrometry the detection of the presence of the chemical marker $N^1,N^1,N^5,N^5$-tetraethyl-naphthalene-1,5-diamine in the marked gasoline and the authentication of the gasoline marked with said chemical marker.

FIG. 3i illustrates the superimposed ion mobility spectra of an unmarked SP98 AVIA gasoline (grey colored spectrum) and of a composition of hexane containing the chemical marker $N^1, N^1, N^5, N^5$-tetraethyl-naphthalene-1,5-diamine at a concentration of 2 µM (black colored spectrum) obtained by laser ionization at 355 nm (pulse energy density: 0.63 mJ/mm$^2$) coupled with ion mobility spectrometry (drift gas: helium; flow: 200 mL/min; drift tube voltage: 2.5 kV). To minimize the contamination of the spectrometer, the unmarked gasoline was diluted in hexane (1:100, v/v) prior to the analysis. The chemical marker $N^1, N^1, N^5, N^5$-tetraethyl-naphthalene-1,5-diamine is characterized by a drift time of about 7.4 ms. As attested by FIG. 3i, as gasoline generates a negligible noise when subjected to laser ionization at 355 nm (pulse energy density: 0.63 mJ/mm$^2$) coupled with ion mobility spectrometry that does not mask the peak corresponding to the chemical marker $N^1, N^1, N^5, N^5$-tetraethyl-naphthalene-1,5-diamine, the presence of said chemical marker can be easily detected in a marked gasoline thereof. Thus, illumination of a gasoline containing the marker $N^1,N^1,N^5,N^5$-tetraethyl-naphthalene-1,5-diamine with pulsed laser light of a wavelength of 355 nm (pulse energy density: 0.63 mJ/mm$^2$) coupled with ion mobility spectrometry (drift gas: helium; flow: 200 mL/min; drift tube voltage: 2.5 kV) is suitable for determining the authenticity of said gasoline.

FIG. 3j illustrates for comparative purposes the ion mobility spectra of a marked SP98 AVIA gasoline containing the chemical marker $N^1, N^1, N^5, N^5$-tetraethyl-naphthalene-1,5-diamine at a concentration of 2 µM (FIG. 3j i)—continuous line), a marked SOCAR diesel containing the chemical marker $N^1, N^1, N^5, N^5$-tetraethyl-naphthalene-1,5-diamine at a concentration of 2 µM (FIG. 3j ii)—dashed line) and of a composition of hexane containing the chemical marker $N^1, N^1, N^5, N^5$-tetraethyl-naphthalene-1,5-diamine at a concentration of 2 µM (FIG. 3j iii)—dotted line) obtained by sample illumination with pulsed laser light having a wavelength of 406 nm (pulse energy density: 0.04 mJ/mm$^2$) coupled with ion mobility spectrometry (LI-IMS; drift gas: nitrogen; flow: 200 mL/min; drift tube voltage: 6.5 kV). As shown by FIG. 3j, illumination of the marked samples with pulsed laser light having a wavelength of 406 nm (pulse energy density: 0.04 mJ/mm$^2$) does not lead to sample ionization.

Figure 3K:
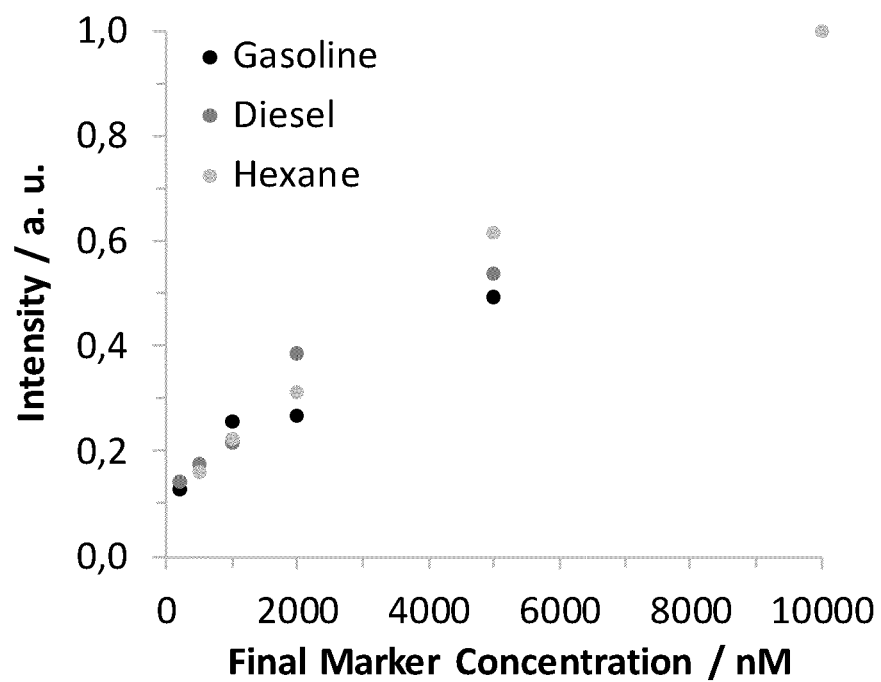
FIG. 3k illustrates the variation of the intensity of the drift time peak of the chemical marker $N^1,N^1,N^5,N^5$-tetraethyl-naphthalene-1,5-diamine with the concentration of said marker in a marked diesel, a marked gasoline and a composition of hexane containing said chemical marker. The compositions containing the chemical marker $N^1,N^1,N^5,N^5$-tetraethyl-naphthalene-1,5-diamine were analyzed by laser ionization at 355 nm coupled to ion mobility spectrometry.

FIG. 3k illustrates the variation of the intensity of the drift time peak of the chemical marker $N^1,N^1,N^5,N^5$-tetraethyl-naphthalene-1,5-diamine with the concentration of said marker in a marked SOCAR diesel, a marked SP98 AVIA gasoline and a composition of hexane containing said chemical marker. The compositions containing the chemical marker $N^1,N^1,N^5,N^5$-tetraethyl-naphthalene-1,5-diamine were analyzed by laser ionization at 355 nm (pulse energy density: 0.63 mJ/mm$^2$) coupled to ion mobility spectrometry (drift gas: helium; flow: 200 mL/min; drift tube voltage: 2.5 kV). Prior to the analysis, the compositions were diluted in hexane to 1:100. The excellent linearity and the overlapping of the three calibration curves prove that the method described herein relying upon illumination of the marked petroleum hydrocarbon with pulsed laser light of a wavelength of 355 nm coupled with ion mobility spectrometry enables the detection and quantification of the marker $N^1,N^1,N^5,N^5$-tetraethyl-naphthalene-1,5-diamine in a variety of petroleum hydrocarbons, including diesel and gasoline, in a broad concentration range from 20 µM to 1 mM, and consequently, the determination of the adulteration of a petroleum hydrocarbon marked with $N^1,N^1,N^5,N^5$-tetraethyl-naphthalene-1,5-diamine.

Figure 4A:
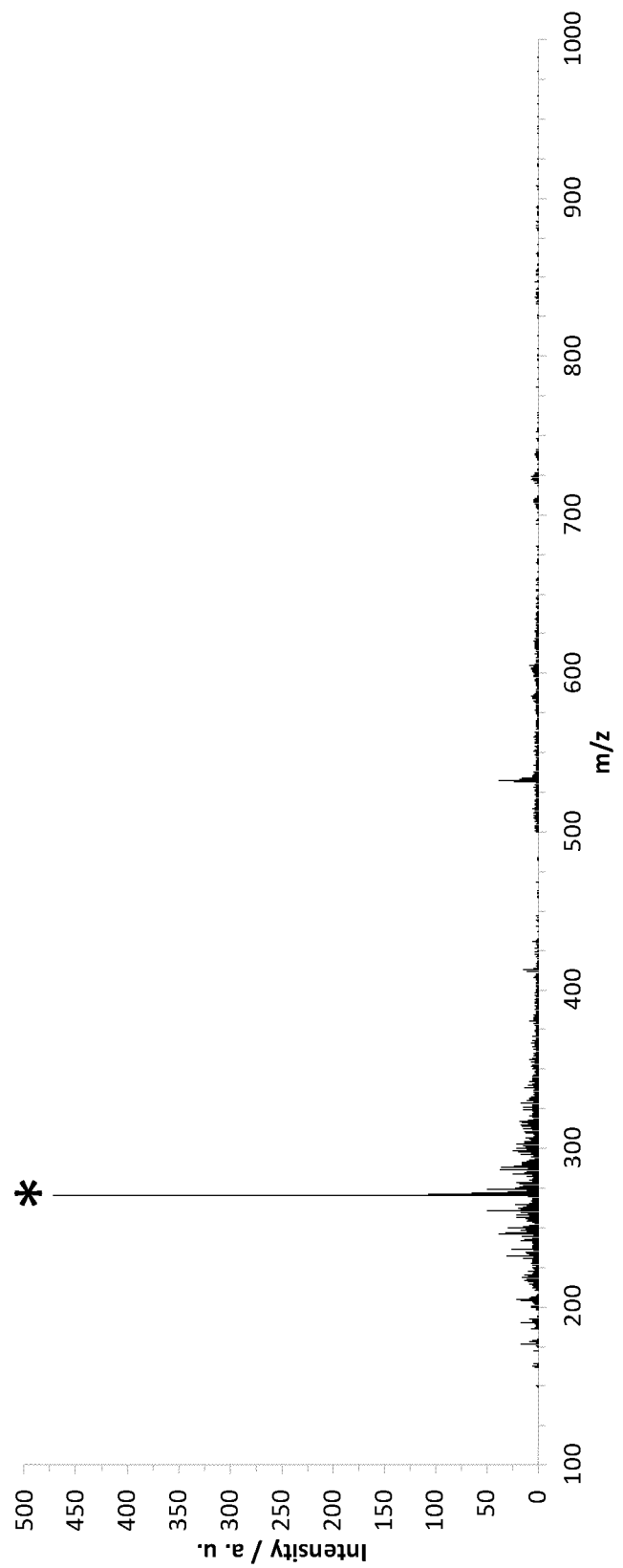
FIG. 4a illustrates the mass spectrum of a marked diesel containing the chemical marker $N^1,N^1,N^5,N^5$-tetraethyl-naphthalene-1,5-diamine obtained by laser ionization at 355 nm coupled with mass spectrometry. The peak corresponding to the ion (M$^+$) of the chemical marker (m/z of 270) is indicated by a "*".

FIG. 4a illustrates the mass spectrum of a marked SOCAR diesel containing the chemical marker $N^1,N^1,N^5,N^5$-tetraethyl-naphthalene-1,5-diamine obtained by laser ionization at 355 nm (pulse laser density: 0.63 mJ/mm$^2$) coupled with mass spectrometry. To minimize the contamination of the mass spectrometer, the marked diesel was diluted in hexane (1:100, v/v) prior to the analysis. Following dilution, the concentration of the chemical marker in the sample was of 50 nM. The peak corresponding to the ion (M$^+$) of the chemical marker (m/z of 270) is indicated by a "*". As attested by FIG. 4a, illumination of the marked diesel containing the marker $N^1,N^1,N^5,N^5$-tetraethyl-naphthalene-1,5-diamine with pulsed laser light of a wavelength of 355 nm (pulse energy density: 0.63 mJ/mm$^2$) results in the selective ionization of the chemical marker $N^1,N^1,N^5,N^5$-tetraethyl-naphthalene-1,5-diamine, thereby enabling the easy detection of the presence of the chemical marker $N^1,N^1,N^5,N^5$-tetraethyl-naphthalene-1,5-diamine at low concentration in a marked diesel and the authentication of the diesel containing said chemical marker. The poor ionization of the diesel matrix upon illumination with pulsed laser light of a wavelength of 355 nm (pulse energy density: 0.63 mJ/mm$^2$) leads to a negligible noise in the mass spectrum that does not interfere with the detection of the chemical marker $N^1,N^1,N^5,N^5$-tetraethyl-naphthalene-1,5-diamine.

FIG. 4b illustrates the mass spectrum of a marked SP98 AVIA gasoline containing the chemical marker $N^1,N^1,N^5,N^5$-tetraethyl-naphthalene-1,5-diamine obtained by laser ionization at 355 nm (pulse laser density: 0.63 mJ/mm$^2$) coupled with mass spectrometry. To minimize the contamination of the mass spectrometer, the marked gasoline was diluted in hexane (1:100, v/v) prior to the analysis. Following dilution, the concentration of the chemical marker in the sample was of 50 nM. The peak corresponding to the ion (M$^+$) of the chemical marker (m/z of 270) is indicated by a "*". As attested by FIG. 4b, illumination of the marked gasoline containing the marker $N^1,N^1,N^5,N^5$-tetraethyl-naphthalene-1,5-diamine with pulsed laser light of a wavelength of 355 nm (pulse energy density: 0.63 mJ/mm$^2$) results in the selective ionization of the chemical marker $N^1,N^1,N^5,N^5$-tetraethyl-naphthalene-1,5-diamine, thereby enabling the easy detection of the presence of the chemical marker $N^1,N^1,N^5,N^5$-tetraethyl-naphthalene-1,5-diamine at low concentration in a marked gasoline and the authentication of the gasoline containing said chemical marker. The poor ionization of the gasoline matrix upon illumination with pulsed laser light of a wavelength of 355 nm (pulse energy density: 0.63 mJ/mm$^2$) leads to a negligible noise in the mass spectrum that does not interfere with the detection of the chemical marker $N^1,N^1,N^5,N^5$-tetraethyl-naphthalene-1,5-diamine.

Figure 4C:
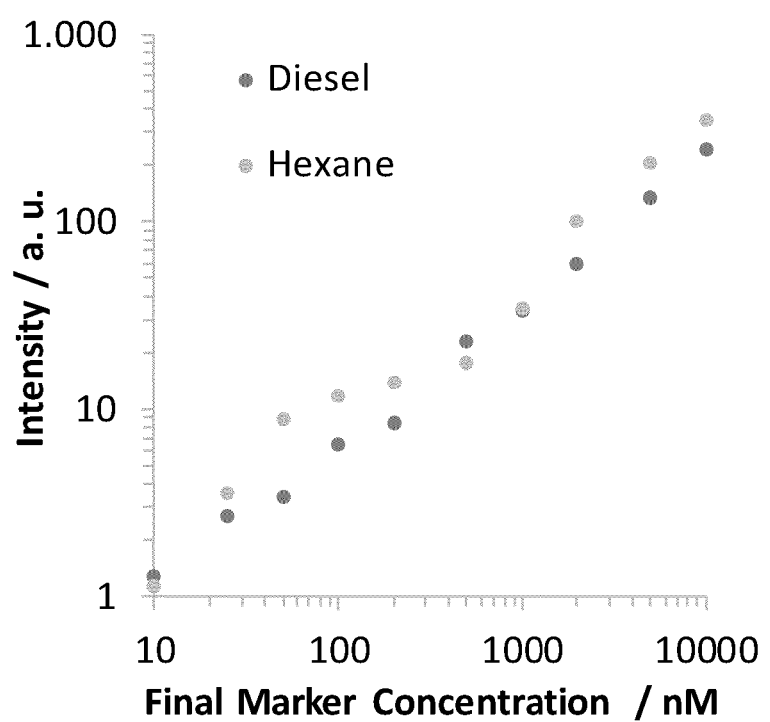
FIG. 4c illustrates the variation of the intensity of the peak corresponding to the ion (M$^+$) of the marker $N^1,N^1,N^5,N^5$-tetraethyl-naphthalene-1,5-diamine with the concentration of the marker $N^1,N^1,N^5,N^5$-tetraethyl-naphthalene-1,5-diamine in a marked diesel and a composition of hexane.

FIG. 4c illustrates the variation of the intensity of the peak corresponding to the ion (M$^+$) of the marker $N^1,N^1,N^5,N^5$-tetraethyl-naphthalene-1,5-diamine with the concentration of the marker $N^1,N^1,N^5,N^5$-tetraethyl-naphthalene-1,5-diamine in a marked SOCAR diesel and a composition of hexane. The different compositions were analyzed by laser ionization at 355 nm coupled with mass spectrometry. To avoid contamination of the mass spectrometer, the compositions were diluted in hexane (1:100, v/v) prior to the analysis. The excellent linearity of each of the calibration curves proves that the methods according to the present invention relying on illumination of the marked petroleum hydrocarbon with pulse laser light of a wavelength of 355 nm coupled with mass spectrometry enable the detection of the presence and quantification of the chemical marker $N^1,N^1,N^5,N^5$-tetraethyl-naphthalene-1,5-diamine in a diesel marked with said chemical marker, and consequently, the determination of the adulteration of a diesel marked with $N^1,N^1,N^5,N^5$-tetraethyl-naphthalene-1,5-diamine. It is to be noticed that similar levels of detection are obtained with a composition of laboratory grade hexane and with a complex petroleum hydrocarbon, such as diesel.

Example 3: Detection of the Chemical Marker N,N-dimethylnaphthalen-1-amine in a Petroleum Hydrocarbon The authenticity of petroleum hydrocarbons marked with the chemical marker N,N-dimethylnaphthalen-1-amine (CAS no.: 86-56-6, >98%; Sigma Aldrich) was tested.

For petroleum hydrocarbon marking, a concentrate of N,N-dimethylnaphthalen-1-amine in hexane was prepared to a concentration of 10 mmol/L and added to SP98 AVIA gasoline or SOCAR diesel to yield a marked gasoline sample (chemical marker concentration: 10 μM) and a marked diesel sample (chemical marker concentration: 10 μM).

Figure 5A:
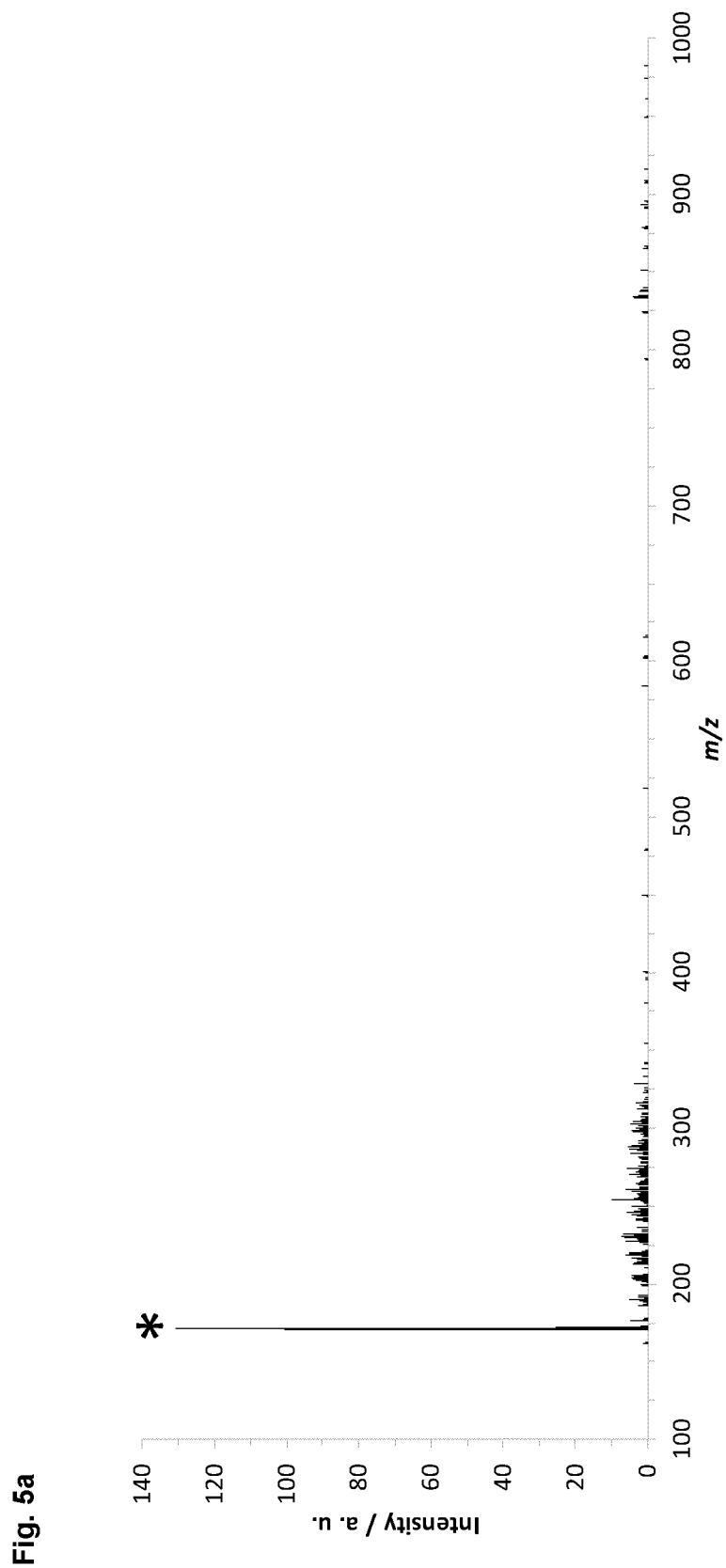
FIG. 5a illustrates the mass spectrum of a marked diesel containing the chemical marker N,N-dimethylnaphthalen-1-amine obtained by laser ionization at 308 nm coupled with mass spectrometry. The peak corresponding to the ion (M$^+$) of the chemical marker (m/z of 171) is indicated by a "*".
Figure 5B:
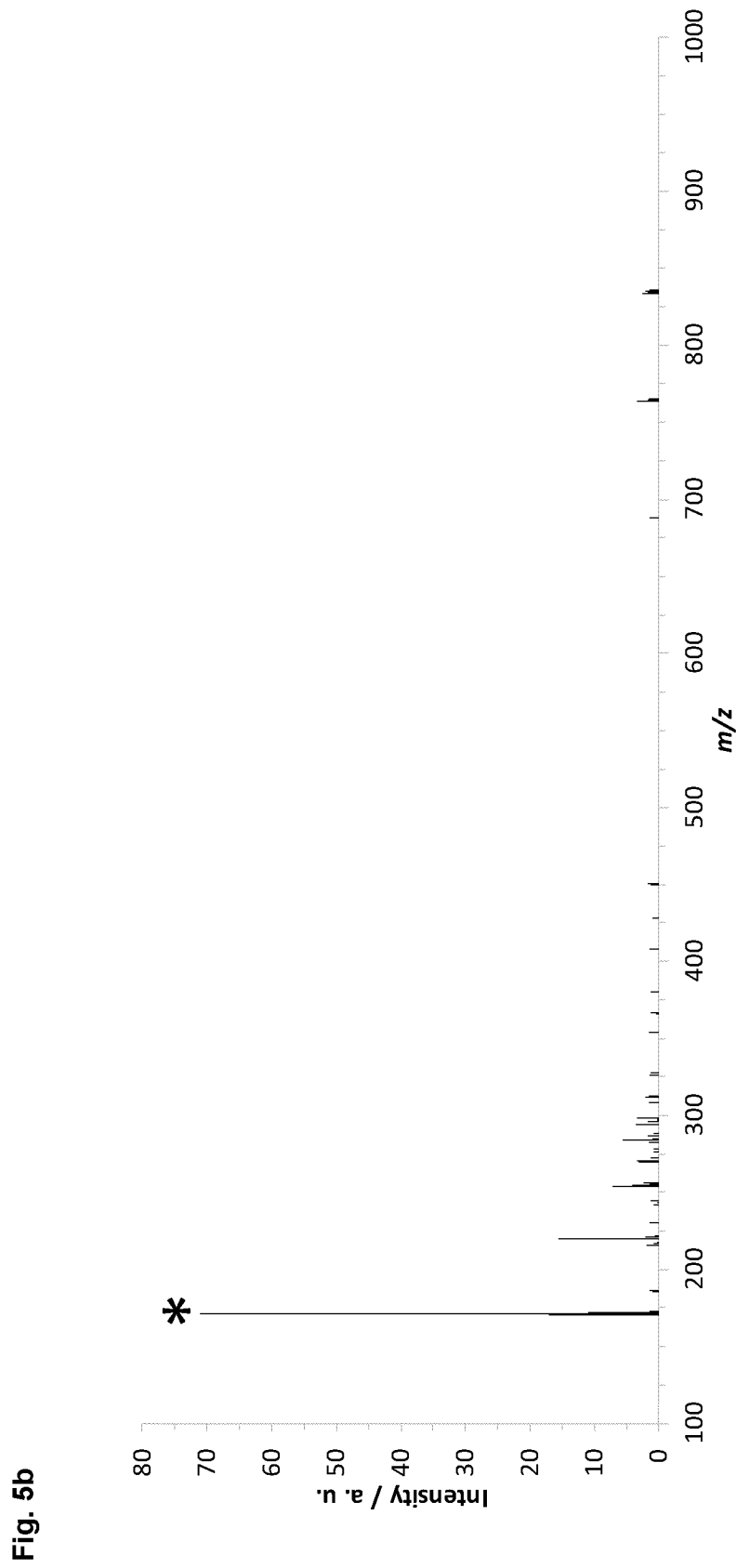
FIG. 5b illustrates the mass spectrum of a marked gasoline containing the chemical marker N,N-dimethylnaphthalen-1-amine obtained by laser ionization at 308 nm coupled with mass spectrometry. The peak corresponding to the ion (M$^+$) of the chemical marker (m/z of 171) is indicated by a "*".

The two samples were analyzed by laser ionization at a wavelength of 308 nm (pulsed laser density: 0.10 mJ/mm$^2$) coupled with mass spectrometry using the protocol described at item I.a conducted on the instrument described at item I.a (see FIG. 5a and FIG. 5b).

FIG. 5a illustrates the mass spectrum of a marked SOCAR diesel containing the chemical marker N,N-dimethylnaphthalen-1-amine obtained by laser ionization at 308 nm (pulse energy density: 0.10 mJ/mm$^2$) coupled with mass spectrometry. To minimize the contamination of the mass spectrometer, the marked diesel was diluted in hexane (1:100, v/v) prior to the analysis. Following dilution, the concentration of the chemical marker was of 10 μM. The peak corresponding to the ion (M$^+$) of the chemical marker (m/z of 171) is indicated by a "*". As attested by FIG. 5a, illumination of the marked diesel containing the chemical marker N,N-dimethylnaphthalen-1-amine with pulsed laser light of a wavelength of 308 nm (pulse energy density: 0.10 mJ/mm$^2$) results in the selective ionization of the chemical marker N,N-dimethylnaphthalen-1-amine, thereby enabling the easy detection of the presence of said chemical marker at low concentration in a marked diesel and the authentication of said marked diesel. The poor ionization of the diesel matrix upon illumination with pulsed laser light of a wavelength of 308 nm (pulse energy density: 0.10 mJ/mm$^2$) leads to a negligible noise in the mass spectrum that does not interfere with the detection of the chemical marker N,N-dimethylnaphthalen-1-amine.

FIG. 5b illustrates the mass spectrum of a marked SP98 AVIA gasoline containing the chemical marker N,N-dimethylnaphthalen-1-amine obtained by laser ionization at 308 nm (pulse energy density: 0.10 mJ/mm$^2$) coupled with mass spectrometry. To minimize the contamination of the mass spectrometer, the marked gasoline was diluted in hexane (1:100, v/v) prior to the analysis. Following dilution, the concentration of the chemical marker was of 10 μM. The peak corresponding to the ion (M$^+$) of the chemical marker (m/z of 171) is indicated by a "*". As attested by FIG. 5b, illumination of the marked gasoline containing the chemical marker N,N-dimethylnaphthalen-1-amine with pulsed laser light of a wavelength of 308 nm (pulse energy density: 0.10 mJ/mm$^2$) results in the selective ionization of the chemical marker N,N-dimethylnaphthalen-1-amine, thereby enabling the easy detection of the presence of said chemical marker N,N-dimethylnaphthalen-1-amine at low concentration in a marked gasoline and the authentication of the gasoline containing said chemical marker. The poor ionization of the gasoline matrix upon illumination with pulsed laser light of a wavelength of 308 nm (pulse energy density: 0.10 mJ/mm$^2$) leads to a negligible noise in the mass spectrum that does not interfere with the detection of the chemical marker N,N-dimethylnaphthalen-1-amine.

Example 4: Detection and Quantification of the Chemical Marker 2-ethyl-9,10-dimethoxyanthracene in a Petroleum Hydrocarbon The authenticity and adulteration of petroleum hydrocarbons marked with the chemical marker 2-ethyl-9,10-dimethoxyanthracene (CAS no. 26708-04-3; Sigma Aldrich, 97%) were tested.

For petroleum hydrocarbon marking, a concentrate of 2-ethyl-9,10-dimethoxyanthracene in hexane was prepared to a concentration of 5 mmol/L and added to diesel (SOCAR diesel), gasoline (SP98 AVIA gasoline) or hexane to yield marked diesel samples, marked gasoline samples and marked hexane samples.

Samples of marked diesel, marked gasoline and marked hexane were analyzed by laser ionization at a wavelength of 355 nm (pulsed laser density: 0.63 mJ/mm$^2$) coupled with mass spectrometry using the protocol described at item I.a conducted on the instrument described at item I.a (see FIG. 7d), as well as by laser ionization at 337 nm (pulsed laser density: 0.05 mJ/mm$^2$) or 355 nm (pulsed laser density: 0.63 mJ/mm$^2$) coupled with ion mobility spectrometry (drift gas: helium; flow: 200 mL/min; drift tube voltage: 2.5 kV, or drift gas: nitrogen; flow: 200 mL/min; drift tube voltage: 6.5 kV) using the protocol described at item I.b conducted on the instrument described at item I.b (see FIG. 6b, FIG. 6c, FIG. 6e, FIG. 6f, and FIG. 6h). Further, a sample of marked diesel was analyzed by laser ionization at different wavelengths (308 nm—pulsed energy density: 0.10 mJ/mm$^2$; 337 nm—pulsed energy density: 0.05 mJ/mm$^2$; 355 nm—pulsed energy density: 0.63 mJ/mm$^2$) coupled with mass spectrometry using the protocol described at item I.a conducted on the instrument described at item I.a (see FIG. 7a-FIG. 7c).

For comparative purposes,
a sample of marked diesel, and a sample of marked hexane were analyzed by laser ionization at 266 nm (pulsed laser density: 0.13 mJ/mm$^2$) coupled with ion mobility spectrometry (drift gas: nitrogen; flow: 200 mL/min; drift tube voltage: 6.5 kV) using the protocol described at item I.b conducted on the instrument described at item I.b (see FIG. 6d);
a sample of marked gasoline, a sample of marked diesel, and a sample of marked hexane were analyzed by laser ionization at 406 nm (pulsed laser density: 0.04 mJ/mm$^2$) coupled with ion mobility spectrometry (drift gas: nitrogen; flow: 200 mL/min; drift tube voltage: 6.5 kV) using the protocol described at item I.b conducted on the instrument described at item I.b (see FIG. 6g), and
a sample of marked gasoline and a sample of marked hexane were analyzed by APCI-IMS (see FIG. 6a) using the instrument and the protocol described at item II.b above.

Figure 6A:
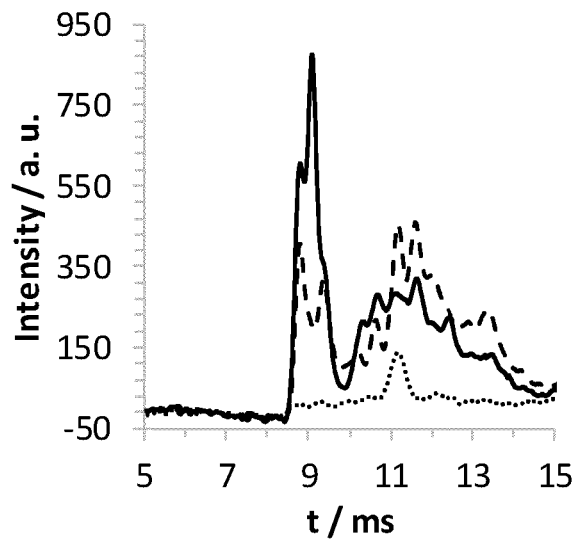
FIG. 6a illustrates for comparative purposes the superimposed ion mobility spectra of an unmarked gasoline (black continuous line), the corresponding gasoline marked with the chemical marker 2-ethyl-9,10-dimethoxyanthracene (dashed black line) and a composition of hexane containing the chemical marker 2-ethyl-9,10-dimethoxyanthracene (dotted black line) obtained by atmospheric pressure chemical ionization coupled with ion mobility spectrometry.

FIG. 6a illustrates for comparative purposes the superimposed ion mobility spectra of an unmarked SP98 AVIA gasoline (black continuous line), the corresponding gasoline marked with the chemical marker 2-ethyl-9,10-dimethoxy-anthracene at a concentration of 10 μM (dashed black line) and a composition of hexane containing the chemical marker 2-ethyl-9,10-dimethoxyanthracene at a concentration of 10 μM (dotted black line) obtained by atmospheric pressure chemical ionization coupled with ion mobility spectrometry (APCI-IMS; drift gas: nitrogen; flow: 200 mL/min; standard drift tube voltage). Both the marked and the unmarked gasoline were diluted in hexane (1:100, v/v) prior to analysis to minimize the contamination of the spectrometer. As shown by FIG. 6a, the ion mobility spectrum of the gasoline marked with the chemical marker 2-ethyl-9,10-dimethoxy-anthracene is substantially identical with the ion mobility spectrum of the unmarked gasoline. Comparison of the ion mobility spectrum of the gasoline marked with the chemical marker 2-ethyl-9,10-dimethoxyanthracene and the ion mobility spectrum of the composition of hexane containing the same chemical marker shows that the peak of the chemical 2-ethyl-9,10-dimethoxyanthracene is masked by the peaks originating from the gasoline. These results demonstrate that unselective ionization methods coupled with ion mobility spectrometry do not allow the detection of the chemical marker 2-ethyl-9,10-dimethoxyanthracene in a gasoline matrix and therefore, are not suitable for authentication of a petroleum hydrocarbon allegedly marked with the chemical marker 2-ethyl-9,10-dimethoxyanthracene and/or for determining adulteration of a marked petroleum hydrocarbon containing the chemical marker 2-ethyl-9,10-dimethoxyanthracene.

Figure 6B:
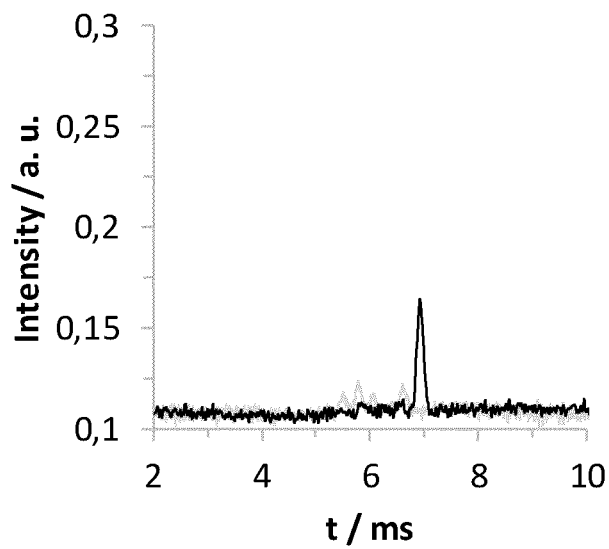
FIG. 6b illustrates the superimposed ion mobility spectra of an unmarked gasoline (grey colored spectrum) and of the corresponding marked gasoline containing the chemical marker 2-ethyl-9,10-dimethoxy-anthracene (black colored spectrum) obtained by laser ionization at 355 nm coupled with ion mobility spectrometry. The chemical marker 2-ethyl-9,10-dimethoxy-anthracene is characterized by a drift time of about 7.0 ms.

FIG. 6b illustrates the superimposed ion mobility spectra of an unmarked SP98 AVIA gasoline (grey colored spectrum) and of the corresponding marked gasoline containing the chemical marker 2-ethyl-9,10-dimethoxy-anthracene (black colored spectrum) obtained by laser ionization at 355 nm (pulse energy density: 0.63 mJ/mm$^2$) coupled with ion mobility spectrometry (drift gas: helium; flow: 200 mL/min; drift tube voltage: 2.5 kV). Both the marked and the unmarked gasoline were diluted in hexane (1:100, v/v) prior to analysis to minimize the contamination of the spectrometer. Following dilution, the concentration of the chemical marker in the sample was of 10 μM. The chemical marker 2-ethyl-9,10-dimethoxy-anthracene is characterized by a drift time of about 7.0 ms. As illustrated by FIG. 6b, illumination of the marked gasoline containing the marker 2-ethyl-9,10-dimethoxy-anthracene with pulsed laser light of a wavelength of 355 nm (pulse energy density: 0.63 mJ/mm$^2$) results in selective ionization of the marker 2-ethyl-9,10-dimethoxy-anthracene, thereby enabling when coupled with ion mobility spectrometry the detection of the presence of the marker 2-ethyl-9,10-dimethoxy-anthracene in the marked gasoline and the authentication of the gasoline containing said marker.

Figure 6C:
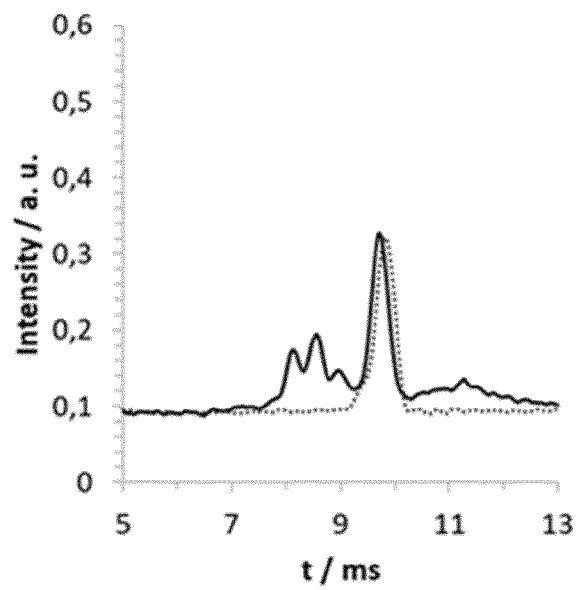
FIG. 6c illustrates the superimposed spectra of a marked gasoline containing the chemical marker 2-ethyl-9,10-dimethoxyanthracene (continuous line) and of a composition of hexane containing the chemical marker 2-ethyl-9,10-dimethoxyanthracene (dotted line) obtained by laser ionization at 355 nm coupled with ion mobility spectrometry. The chemical marker 2-ethyl-9,10-dimethoxyanthracene is characterized by a drift time of about 9.6 ms.

FIG. 6c illustrates the superimposed spectra of a marked SP98 AVIA gasoline containing the chemical marker 2-ethyl-9,10-dimethoxyanthracene at a concentration of 100 μM (continuous line) and of a composition of hexane containing the chemical marker 2-ethyl-9,10-dimethoxyanthracene at a concentration of 100 μM (dotted line) obtained by laser ionization at 355 nm (pulse energy density: 0.63 mJ/mm$^2$) coupled with ion mobility spectrometry (LI-IMS; drift gas: nitrogen; flow: 200 mL/min; drift tube voltage: 6.5 kV). The chemical marker 2-ethyl-9,10-dimethoxyanthracene is characterized by a drift time of about 9.6 ms. As demonstrated by FIG. 6c, illumination of the marked gasoline containing the chemical marker 2-ethyl-9,10-dimethoxyanthracene with pulsed laser light of a wavelength of 355 nm (pulse energy density: 0.63 mJ/mm$^2$) results in selective ionization of the chemical marker 2-ethyl-9,10-dimethoxyanthracene, thereby enabling when coupled with ion mobility spectrometry the detection of the presence of the chemical marker $N^1,N^1,N^5,N^5$-tetraethyl-naphthalene-1,5-diamine in the marked gasoline and the authentication of the gasoline marked with said chemical marker.

Figure 6D:
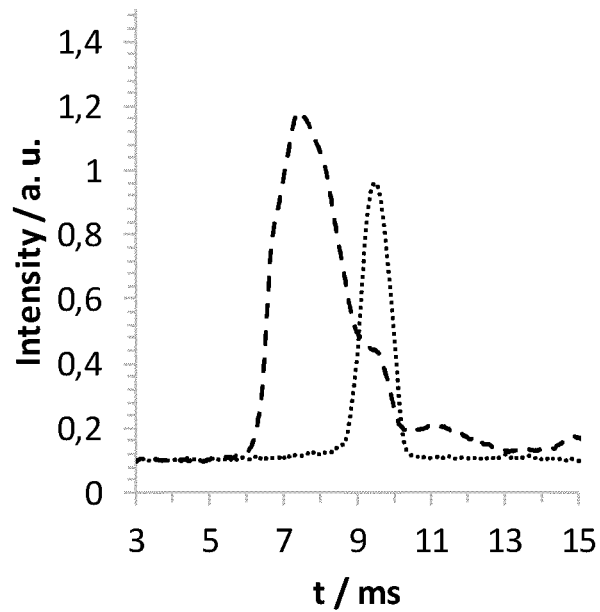
FIG. 6d illustrates for comparative purposes the superimposed ion mobility spectra of a marked diesel containing the chemical marker 2-ethyl-9,10-dimethoxyanthracene (dashed line) and of a composition of hexane containing the chemical marker 2-ethyl-9,10-dimethoxyanthracene (dotted line) obtained by laser ionization at 266 nm coupled with ion mobility spectrometry. The chemical marker 2-ethyl-9,10-dimethoxyanthracene is characterized by a drift time of about 9.6 ms.

FIG. 6d illustrates for comparative purposes the superimposed ion mobility spectra of a marked SOCAR diesel containing the chemical marker 2-ethyl-9,10-dimethoxyanthracene at a concentration of 100 μM (dashed line) and of a composition of hexane containing the chemical marker 2-ethyl-9,10-dimethoxyanthracene at a concentration of 100 μM (dotted line) obtained by laser ionization at 266 nm (pulse energy density: 0.13 mJ/mm$^2$) coupled with ion mobility spectrometry (LI-IMS; drift gas: nitrogen; flow: 200 mL/min; drift tube voltage: 6.5 kV). The chemical marker 2-ethyl-9,10-dimethoxyanthracene is characterized by a drift time of about 9.6 ms. Comparison of the ion mobility spectrum of the diesel marked with the chemical marker 2-ethyl-9,10-dimethoxyanthracene and the ion mobility spectrum of the composition of hexane containing the same chemical marker shows that the peak of the chemical marker 2-ethyl-9,10-dimethoxyanthracene is masked by the peaks originating from the diesel. These results demonstrate that illumination of the marked diesel containing the chemical marker 2-ethyl-9,10-dimethoxyanthracene with pulsed laser light of a wavelength of 266 nm (pulse energy density: 0.13 mJ/mm$^2$) results in unselective ionization of the sample and does not allow when coupled with ion mobility spectrometry the detection of the presence of the chemical marker 2-ethyl-9,10-dimethoxyanthracene in a diesel matrix. Thus, such method is not suitable for authenticating a petroleum hydrocarbon allegedly marked with the chemical marker 2-ethyl-9,10-dimethoxyanthracene and/or for determining adulteration of a marked petroleum hydrocarbon containing the chemical marker 2-ethyl-9,10-dimethoxyanthracene.

Figure 6E:
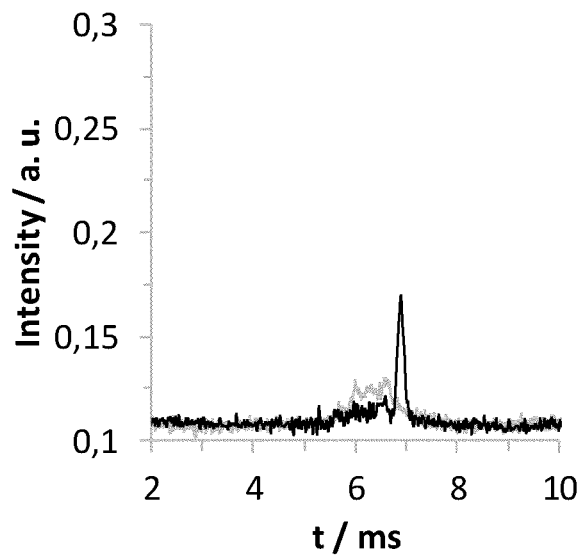
FIG. 6e illustrates the superimposed ion mobility spectra of an unmarked diesel (grey colored spectrum) and of the corresponding marked diesel containing the chemical marker 2-ethyl-9,10-dimethoxy-anthracene (black colored spectrum) obtained by laser ionization at 355 nm coupled with ion mobility spectrometry. The chemical marker 2-ethyl-9,10-dimethoxy-anthracene is characterized by a drift time of about 7.0 ms.

FIG. 6e illustrates the superimposed ion mobility spectra of an unmarked SOCAR diesel (grey colored spectrum) and of the corresponding marked diesel containing the chemical marker 2-ethyl-9,10-dimethoxy-anthracene (black colored spectrum) obtained by laser ionization at 355 nm (pulse energy density: 0.63 mJ/mm$^2$) coupled with ion mobility spectrometry (drift gas: helium; flow: 200 mL/min; drift tube voltage: 2.5 kV). Both the marked and the unmarked diesel were diluted in hexane (1:100, v/v) prior to analysis to minimize the contamination of the spectrometer. Following dilution, the concentration of the chemical marker in the sample was of 10 μM. The chemical marker 2-ethyl-9,10-dimethoxy-anthracene is characterized by a drift time of about 7.0 ms. As illustrated by FIG. 6e, illumination of the marked diesel containing the marker 2-ethyl-9,10-dimethoxy-anthracene with pulsed laser light of a wavelength of 355 nm (pulse energy density: 0.63 mJ/mm$^2$) results in selective ionization of the chemical marker 2-ethyl-9,10-dimethoxy-anthracene, thereby enabling when coupled with ion mobility spectrometry the detection of the presence of the marker 2-ethyl-9,10-dimethoxy-anthracene in a diesel matrix and the authentication of the said diesel.

Figure 6F:
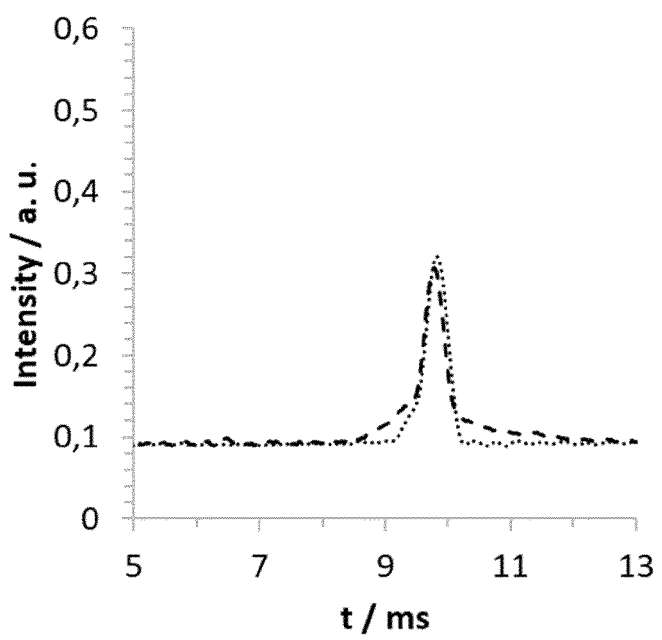
FIG. 6f illustrates the superimposed spectra of a marked diesel containing the chemical marker 2-ethyl-9,10-dimethoxyanthracene (dashed line) and of a composition of hexane containing the chemical marker 2-ethyl-9,10-dimethoxyanthracene (dotted line) obtained by laser ionization at 355 nm coupled with ion mobility spectrometry. The chemical marker 2-ethyl-9,10-dimethoxyanthracene is characterized by a drift time of about 9.6 ms.

FIG. 6f illustrates the superimposed spectra of a marked SOCAR diesel containing the chemical marker 2-ethyl-9,10-dimethoxyanthracene at a concentration of 100 μM (dashed line) and of a composition of hexane containing the chemical marker 2-ethyl-9,10-dimethoxyanthracene at a concentration of 100 μM (dotted line) obtained by laser ionization at 355 nm (pulse energy density: 0.63 mJ/mm$^2$) coupled with ion mobility spectrometry (LI-IMS; drift gas: nitrogen; flow: 200 mL/min; drift tube voltage: 6.5 kV). The chemical marker 2-ethyl-9,10-dimethoxyanthracene is characterized by a drift time of about 9.6 ms. As demonstrated by FIG. 6f, illumination of the marked diesel containing the chemical marker 2-ethyl-9,10-dimethoxyanthracene with pulsed laser light of a wavelength of 355 nm (pulse energy density: 0.63 mJ/mm$^2$) results in selective ionization of the chemical marker 2-ethyl-9,10-dimethoxyanthracene, thereby enabling when coupled with ion mobility spectrometry the detection of the presence of the chemical marker 2-ethyl-9,10-dimethoxyanthracene in the marked diesel and the authentication of the diesel marked with said chemical marker.

Figure 6G:
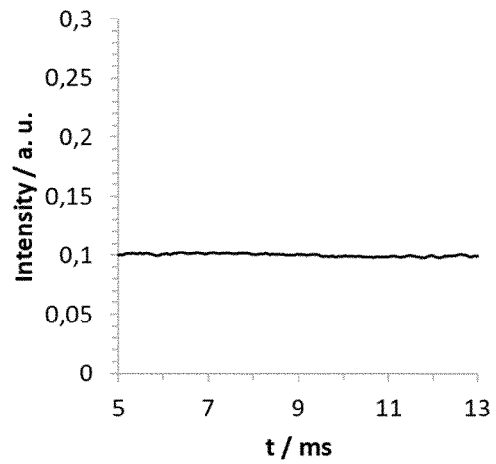
FIG. 6g illustrates for comparative purposes the ion mobility spectra of a marked gasoline containing the chemical marker 2-ethyl-9,10-dimethoxyanthracene (FIG. 6g i)—continuous line), a marked diesel containing the chemical marker 2-ethyl-9,10-dimethoxyanthracene (FIG. 6g ii)—dashed line) and of a composition of hexane containing the chemical marker 2-ethyl-9,10-dimethoxyanthracene (FIG. 6g iii)—dotted line) obtained by sample illumination with pulsed laser light having a wavelength of 406 nm coupled with ion mobility spectrometry.
Figure 6G:
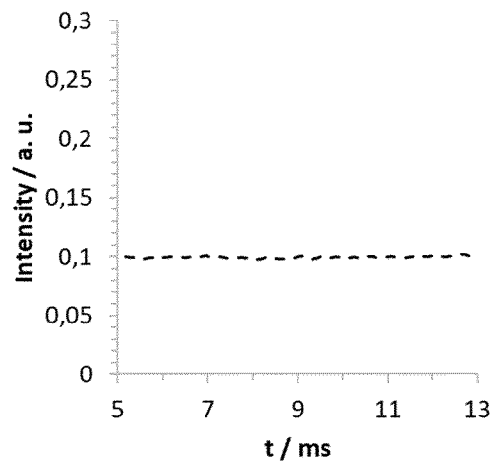
Figure 6G:
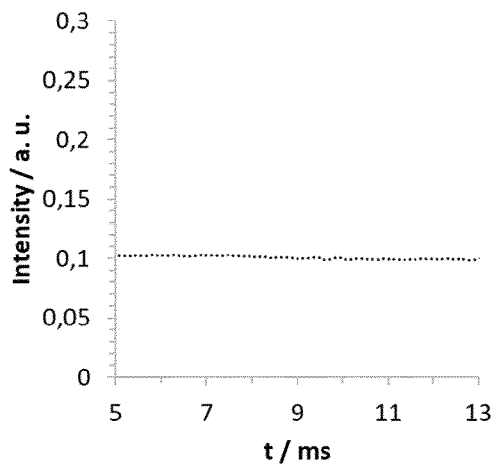

FIG. 6g illustrates for comparative purposes the ion mobility spectra of a marked SP98 AVIA gasoline containing the chemical marker 2-ethyl-9,10-dimethoxyanthracene at a concentration of 100 μM (FIG. 6g i)—continuous line), a marked SOCAR diesel containing the chemical marker 2-ethyl-9,10-dimethoxyanthracene at a concentration of 100 μM (FIG. 6g ii)—dashed line) and of a composition of hexane containing the chemical marker 2-ethyl-9,10-dimethoxyanthracene at a concentration of 100 μM (FIG. 6g iii)—dotted line) obtained by sample illumination with pulsed laser light having a wavelength of 406 nm (pulse energy density: 0.04 mJ/mm$^2$) coupled with ion mobility spectrometry (LI-IMS; drift gas: nitrogen; flow: 200 mL/min; drift tube voltage: 6.5 kV). As shown by FIG. 6g, illumination of the marked samples with pulsed laser light having a wavelength of 406 nm (pulse energy density: 0.04 mJ/mm$^2$) does not lead to sample ionization.

Figure 6H:
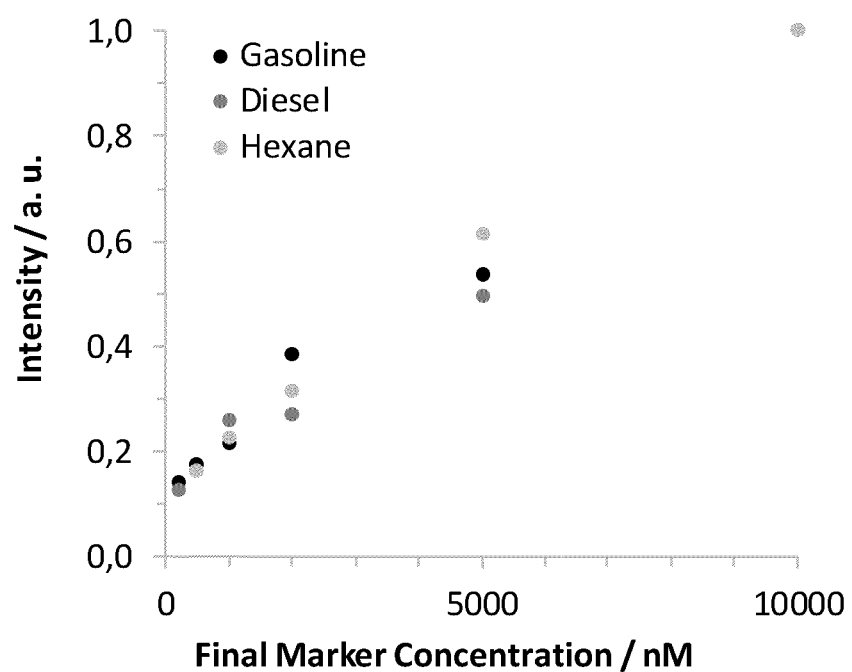
FIG. 6h illustrates the variation of the intensity of the drift time peak corresponding to the chemical marker 2-ethyl-9,10-dimethoxy-anthracene with the concentration of said marker in a marked diesel, a marked gasoline and a composition of hexane containing said chemical marker. The compositions containing the marker 2-ethyl-9,10-dimethoxy-anthracene were analyzed by laser ionization at 355 nm coupled to ion mobility spectrometry.

FIG. 6h illustrates the variation of the intensity of the drift time peak corresponding to the chemical marker 2-ethyl-9,10-dimethoxy-anthracene with the concentration of said marker in a marked SOCAR diesel, a marked SP98 AVIA gasoline and a composition of hexane containing said chemical marker. The compositions containing the marker 2-ethyl-9,10-dimethoxy-anthracene were analyzed by laser ionization at 355 nm (pulse energy density: 0.63 mJ/mm$^2$) coupled to ion mobility spectrometry (drift gas: helium; flow: 200 mL/min; drift tube voltage: 2.5 kV). The excellent linearity and the overlapping of the three calibration curves prove that the method described herein relying upon illumination of the marked petroleum hydrocarbon with pulsed laser light of a wavelength of 355 nm coupled with ion mobility spectrometry enables the detection and quantification of the chemical marker 2-ethyl-9,10-dimethoxy-anthracene in a variety of petroleum hydrocarbons, including diesel and gasoline, in a broad concentration range from 20 μM to 1 mM, and consequently, the determination of the adulteration of a petroleum hydrocarbon marked with 2-ethyl-9,10-dimethoxy-anthracene. It is to be noticed the low matrix effect on the signal obtained by ion mobility spectrometry and that similar levels of detection are obtained with a composition of laboratory grade hexane and with complex petroleum hydrocarbons, such as diesel and gasoline.

Figure 7A:
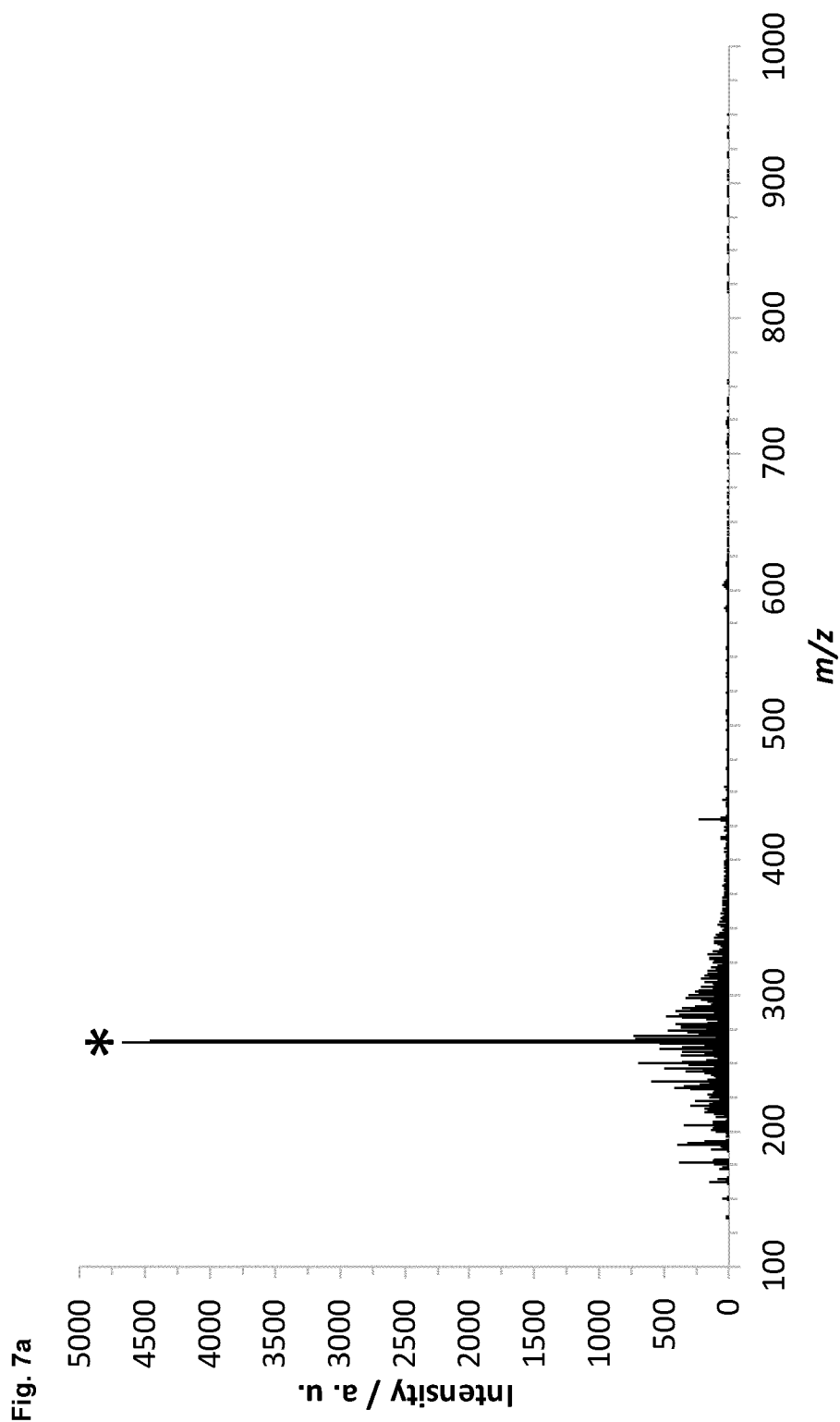
FIG. 7a illustrates the mass spectrum of a marked diesel containing the chemical marker 2-ethyl-9,10-dimethoxy-anthracene obtained by laser ionization at 308 nm coupled with mass spectrometry. The peak corresponding to the ion ($M^+$) of the chemical marker 2-ethyl-9,10-dimethoxy-anthracene (m/z of 266) is indicated by a "*".

FIG. 7a illustrates the mass spectrum of a marked SOCAR diesel containing the chemical marker 2-ethyl-9,10-dimethoxy-anthracene obtained by laser ionization at 308 nm (pulse energy density of 0.10 mJ/mm$^2$) coupled with mass spectrometry. To minimize the contamination of the mass spectrometer, the marked diesel was diluted in hexane (1:100, v/v) prior to the analysis. Following dilution, the concentration of the chemical marker in the sample was of 250 nM. The peak corresponding to the ion (M$^+$) of the chemical marker 2-ethyl-9,10-dimethoxy-anthracene (m/z of 266) is indicated by a "*". As attested by FIG. 7a, illumination of the marked diesel containing the chemical marker with pulsed laser light of a wavelength of 308 nm (pulse energy density: 0.10 mJ/mm$^2$) results in the selective ionization of the chemical marker 2-ethyl-9,10-dimethoxy-anthracene, thereby enabling the easy detection of the presence of said chemical marker 2-ethyl-9,10-dimethoxy-anthracene at low concentration in a marked diesel and the authentication of the diesel containing said chemical marker. The poor ionization of the diesel matrix upon illumination with pulsed laser light of a wavelength of 308 nm (pulse energy density: 0.10 mJ/mm$^2$) leads to a negligible noise in the mass spectrum that does not interfere with the detection of the presence of the chemical marker 2-ethyl-9,10-dimethoxy-anthracene.

Figure 7B:
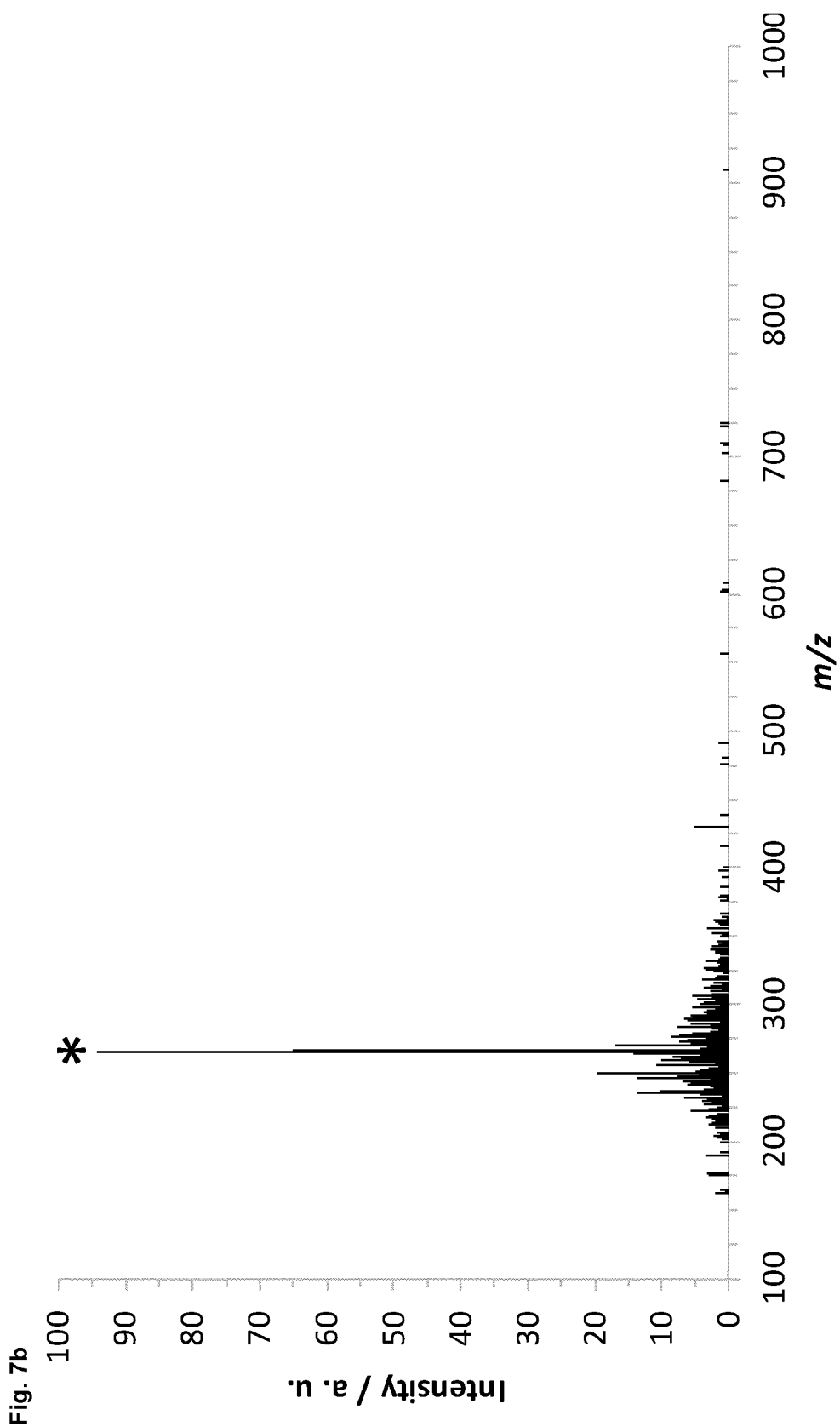
FIG. 7b illustrates the mass spectrum of a marked diesel containing the chemical marker 2-ethyl-9,10-dimethoxy-anthracene obtained by laser ionization at 337 nm coupled with mass spectrometry. The peak corresponding to the ion ($M^+$) of the chemical marker 2-ethyl-9,10-dimethoxy-anthracene (m/z of 266) is indicated by a "*".

FIG. 7b illustrates the mass spectrum of a marked SOCAR diesel containing the chemical marker 2-ethyl-9,10-dimethoxy-anthracene obtained by laser ionization at 337 nm (pulse energy density: 0.05 mJ/mm$^2$) coupled with mass spectrometry. To minimize the contamination of the mass spectrometer, the marked diesel was diluted in hexane (1:100, v/v) prior to the analysis. Following dilution, the concentration of the chemical marker in the sample was of 250 nM. The peak corresponding to the ion (M$^+$) of the chemical marker 2-ethyl-9,10-dimethoxy-anthracene (m/z of 266) is indicated by a "*". As attested by FIG. 7b, illumination of the marked diesel containing the chemical marker with pulsed laser light of a wavelength of 337 nm (pulse energy density: 0.05 mJ/mm$^2$) results in the selective ionization of the chemical marker 2-ethyl-9,10-dimethoxy-anthracene, thereby enabling the easy detection of the presence of said chemical marker at low concentration in a marked diesel and the authentication of said marked diesel.

The poor ionization of the diesel matrix upon illumination with pulsed laser light of a wavelength of 337 nm (pulse energy density: 0.05 mJ/mm$^2$) leads to a negligible noise in the mass spectrum that does not interfere with the detection of the chemical marker 2-ethyl-9,10-dimethoxy-anthracene.

Figure 7C:
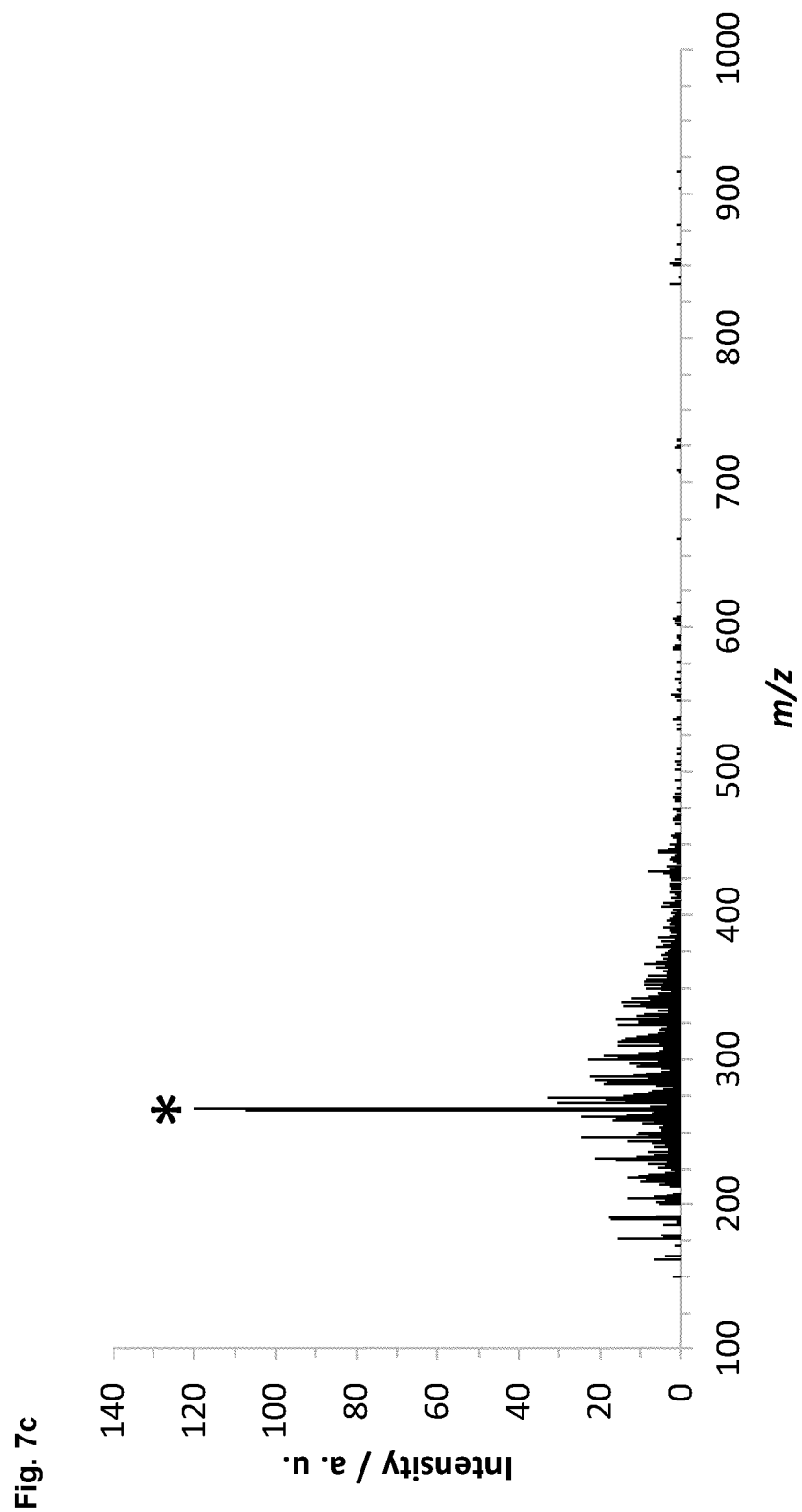
FIG. 7c illustrates the mass spectrum of a marked diesel containing the chemical marker 2-ethyl-9,10-dimethoxy-anthracene obtained by laser ionization at 355 nm coupled with mass spectrometry. The peak corresponding to the ion ($M^+$) of the chemical marker 2-ethyl-9,10-dimethoxy-anthracene (m/z of 266) is indicated by a "*".

FIG. 7c illustrates the mass spectrum of a marked SOCAR diesel containing the chemical marker 2-ethyl-9,10-dimethoxy-anthracene obtained by laser ionization at 355 nm (pulse energy density: 0.63 mJ/mm$^2$) coupled with mass spectrometry. To minimize the contamination of the mass spectrometer, the marked diesel was diluted in hexane (1:100, v/v) prior to the analysis. Following dilution, the concentration of the chemical marker in the sample was of 250 nM. The peak corresponding to the ion (M$^+$) of the chemical marker 2-ethyl-9,10-dimethoxy-anthracene (m/z of 266) is indicated by a "*". As attested by FIG. 7c, illumination of the marked diesel containing the chemical marker with pulsed laser light of a wavelength of 355 nm (pulse energy density: 0.63 mJ/mm$^2$) results in the selective ionization of the chemical marker 2-ethyl-9,10-dimethoxy-anthracene, thereby enabling the easy detection of the presence of said chemical marker at low concentration in a marked diesel and the authentication of the diesel containing said chemical marker. The poor ionization of the diesel matrix upon illumination with pulsed laser light of a wavelength of 355 nm (pulse energy density: 0.63 mJ/mm$^2$) leads to a negligible noise in the mass spectrum that does not interfere with the detection of the chemical marker 2-ethyl-9,10-dimethoxy-anthracene.

Figure 7D:
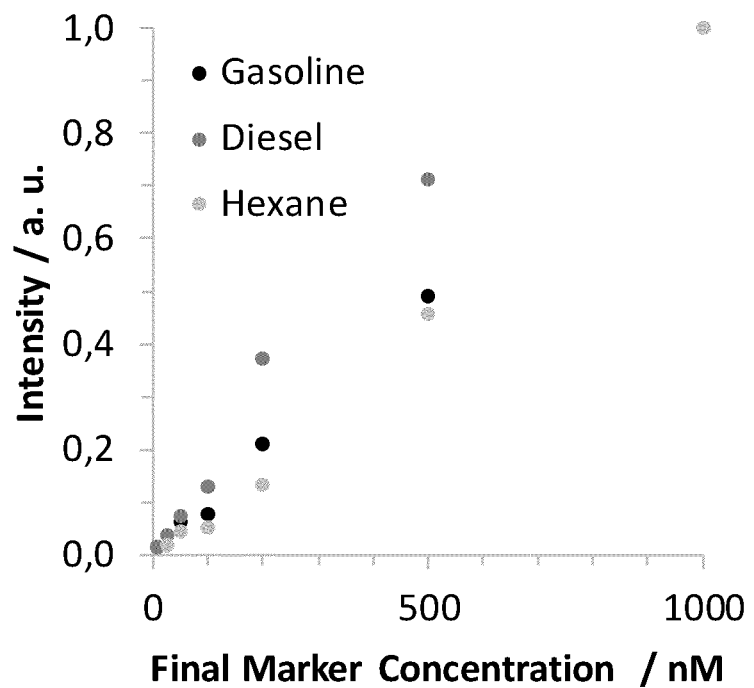
FIG. 7d illustrates the variation of the intensity of the peak corresponding to the ion ($M^+$) of the chemical marker 2-ethyl-9,10-dimethoxy-anthracene with the concentration of the chemical marker 2-ethyl-9,10-dimethoxy-anthracene in a marked diesel, a marked gasoline and a composition of hexane. The different compositions were analyzed by laser ionization at 355 nm coupled with mass spectrometry.

FIG. 7d illustrates the variation of the intensity of the peak corresponding to the ion (M$^+$) of the chemical marker 2-ethyl-9,10-dimethoxy-anthracene with the concentration of the chemical marker 2-ethyl-9,10-dimethoxy-anthracene in a marked SOCAR diesel, a marked SP98 AVIA gasoline and a composition of hexane. The different compositions were analyzed by laser ionization at 355 nm (pulse energy density: 0.63 mJ/mm$^2$) coupled with mass spectrometry. To avoid contamination of the mass spectrometer, the compositions were diluted in hexane (1:100, v/v) prior to the analysis. The linearity of the three calibration curves proves that the method according to the present invention relying on illumination of the marked petroleum hydrocarbon with pulse laser light of a wavelength of 355 nm coupled with mass spectrometry enable the detection of the presence and quantification of the marker 2-ethyl-9,10-dimethoxy-anthracene in a variety of petroleum hydrocarbons, including diesel and gasoline, and consequently, the determination of the adulteration of a petroleum hydrocarbon marked with 2-ethyl-9,10-dimethoxy-anthracene.

Example 5: Detection of the Chemical Marker 1,6-diphenyl-1,3,5-hexatriene in a Petroleum Hydrocarbon The authenticity of a petroleum hydrocarbon marked with the chemical marker 1,6-diphenyl-1,3,5-hexatriene (CAS. no.: 1720-32-7; Sigma Aldrich, 99%) was tested.

For petroleum hydrocarbon marking, a concentrate of 1,6-diphenyl-1,3,5-hexatriene in tetrahydrofuran was prepared to a concentration of 10 mmol/L and added to SP98 AVIA gasoline or hexane to yield a marked gasoline sample (concentration 1,6-diphenyl-1,3,5-hexatriene: 50 µM) and a marked hexane sample (concentration 1,6-diphenyl-1,3,5-hexatriene: 10 µM).

Figure 8B:
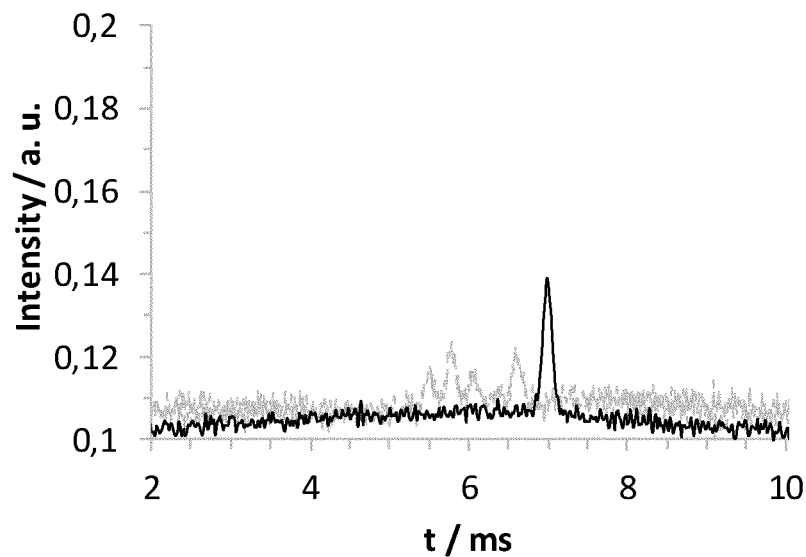
FIG. 8b illustrates the superimposed ion mobility spectra of an unmarked gasoline (grey colored spectrum) and of a composition of hexane containing the chemical marker 1,6-diphenyl-1,3,5-hexatriene (black colored spectrum) obtained by laser ionization at 355 nm coupled with ion mobility spectrometry. The chemical marker 1,6-diphenyl-1,3,5-hexatriene is characterized by a drift time of about 7.0 ms.
Figure 8C:
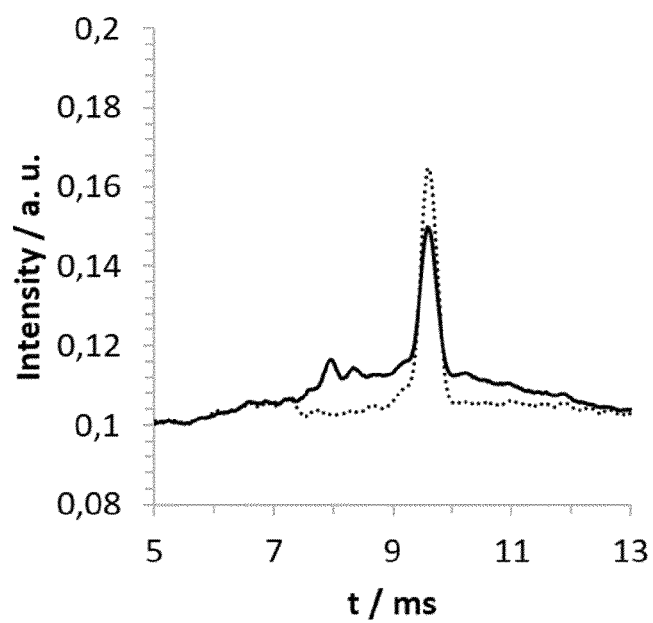
FIG. 8c illustrates the superimposed spectra of a marked gasoline containing the chemical marker 1,6-diphenyl-1,3,5-hexatriene (continuous line) and of a composition of hexane containing the chemical marker 1,6-diphenyl-1,3,5-hexatriene (dotted line) obtained by laser ionization at 355 nm coupled with ion mobility spectrometry. The chemical marker 1,6-diphenyl-1,3,5-hexatriene is characterized by a drift time of about 9.5 ms.
Figure 8D:
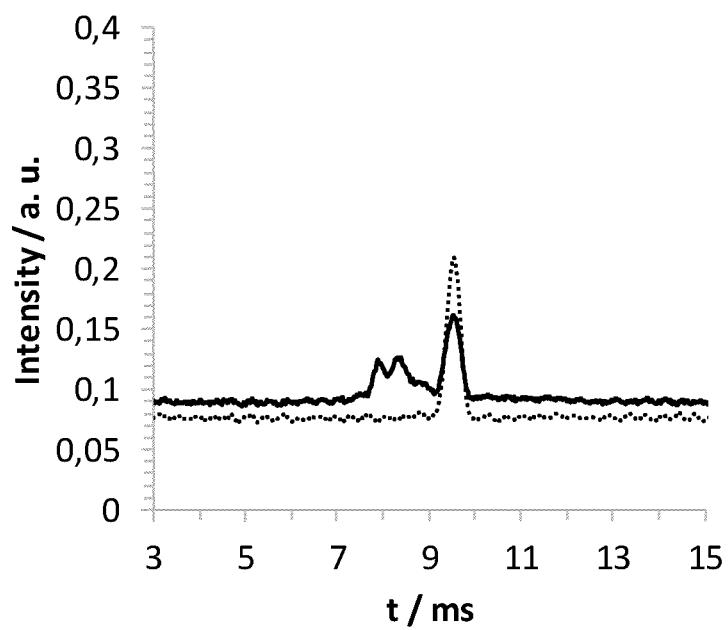
FIG. 8d illustrates the superimposed spectra of a marked gasoline containing the chemical marker 1,6-diphenyl-1,3,5-hexatriene (continuous line) and of a composition of hexane containing the chemical marker 1,6-diphenyl-1,3,5-hexatriene (dotted line) obtained by laser ionization at 337 nm coupled with ion mobility spectrometry. The chemical marker 1,6-diphenyl-1,3,5-hexatriene is characterized by a drift time of about 9.5 ms.
Figure 8F:
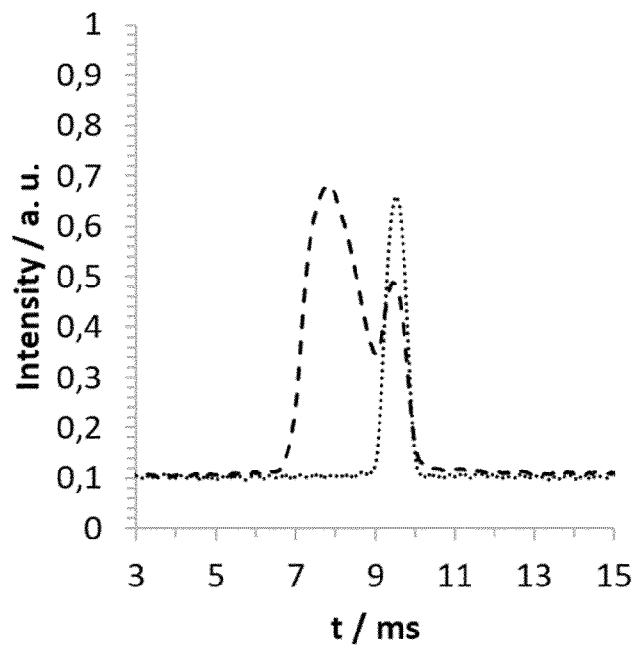
FIG. 8f illustrates the superimposed spectra of a marked diesel containing the chemical marker 1,6-diphenyl-1,3,5-hexatriene (dashed line) and of a composition of hexane containing the chemical marker 1,6-diphenyl-1,3,5-hexatriene (dotted line) obtained by laser ionization at 308 nm coupled with ion mobility spectrometry. The chemical marker 1,6-diphenyl-1,3,5-hexatriene is characterized by a drift time of about 9.5 ms.
Figure 8G:
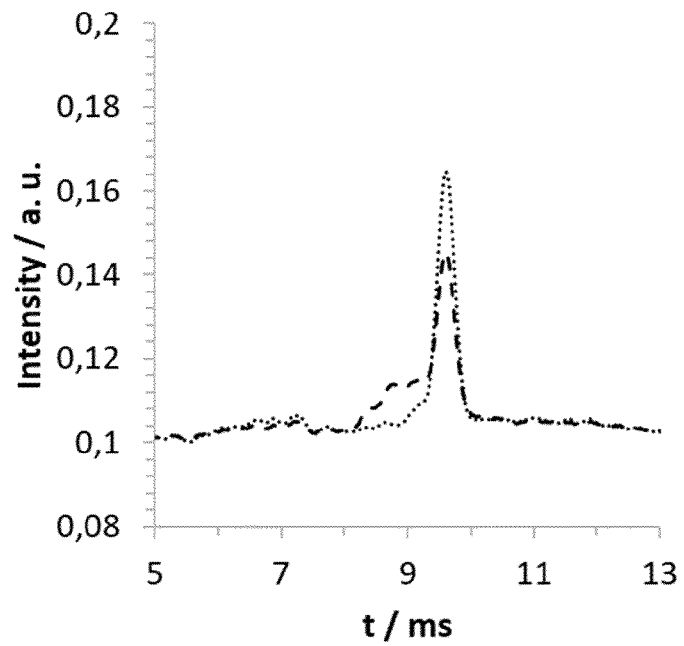
FIG. 8g illustrates the superimposed spectra of a marked diesel containing the chemical marker 1,6-diphenyl-1,3,5-hexatriene (dashed line) and of a composition of hexane containing the chemical marker 1,6-diphenyl-1,3,5-hexatriene (dotted line) obtained by laser ionization at 355 nm coupled with ion mobility spectrometry. The chemical marker 1,6-diphenyl-1,3,5-hexatriene is characterized by a drift time of about 9.5 ms.
Figure 8H:
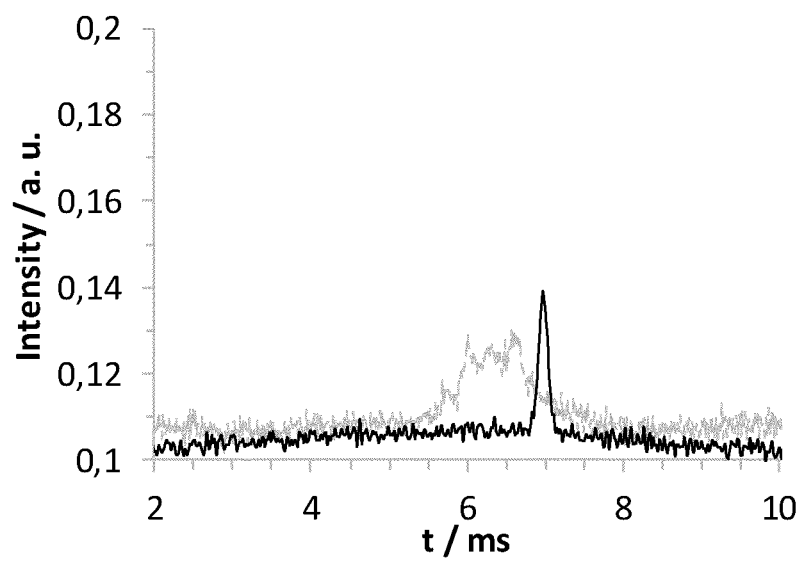
FIG. 8h illustrates the superimposed ion mobility spectra of an unmarked diesel (grey colored spectrum) and of a composition of hexane containing the chemical marker 1,6-diphenyl-1,3,5-hexatriene (black colored spectrum) obtained by laser ionization at 355 nm coupled with ion mobility spectrometry. The chemical marker 1,6-diphenyl-1,3,5-hexatriene is characterized by a drift time of about 7.0 ms.
Figure 9A:
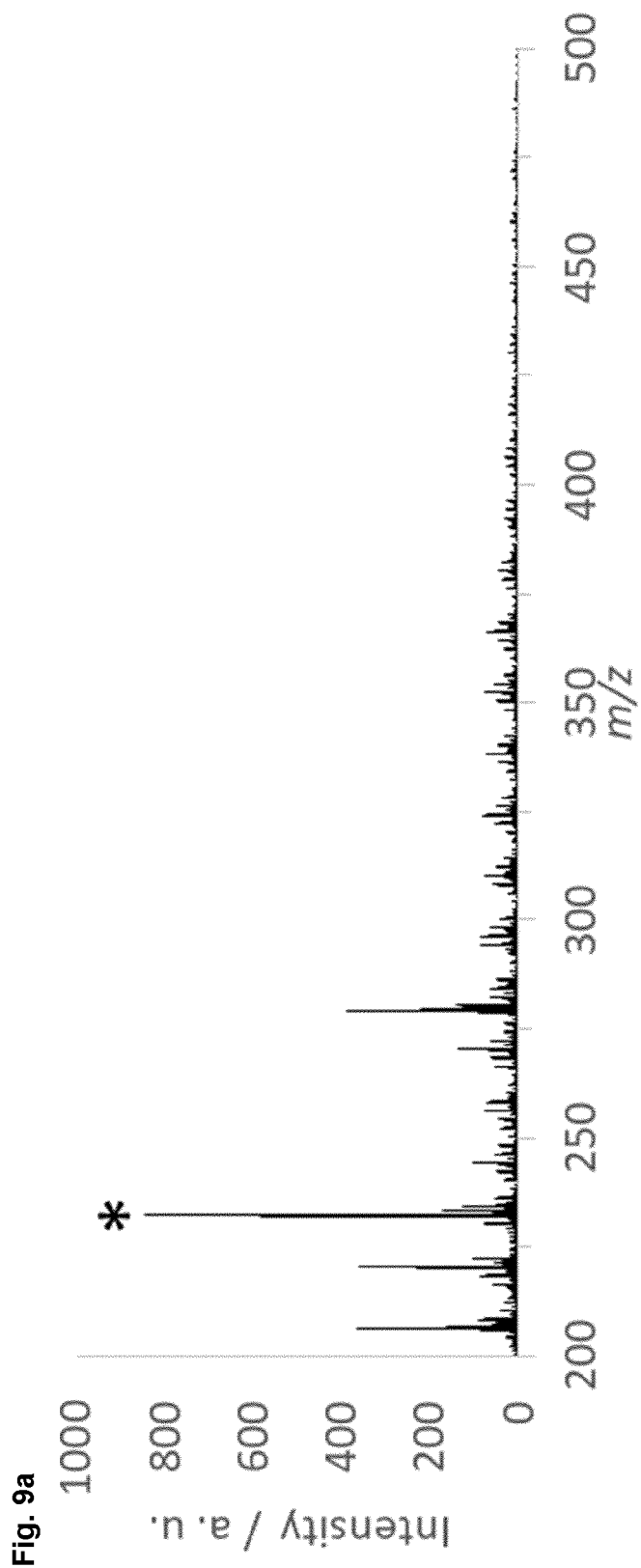
FIG. 9a illustrates the mass spectrum of a marked gasoline containing the chemical marker 1,6-diphenyl-1,3,5-hexatriene obtained by laser ionization at 308 nm coupled with mass spectrometry. The peak corresponding to the ion ($M^+$) of the chemical marker (m/z of 232) is indicated by a "*".
Figure 9B:
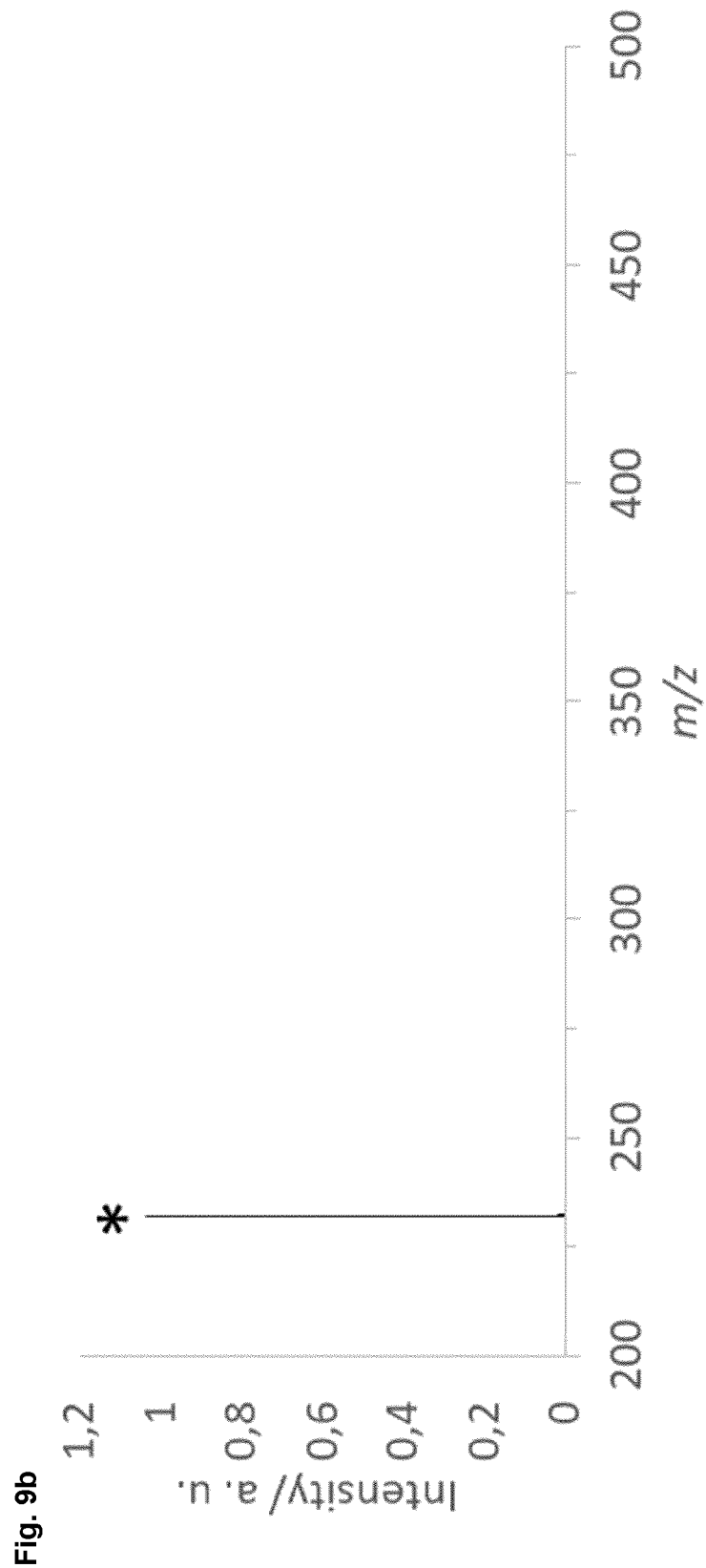
FIG. 9b illustrates the mass spectrum of a marked gasoline containing the chemical marker 1,6-diphenyl-1,3,5-hexatriene obtained by laser ionization at 337 nm coupled with mass spectrometry. The peak corresponding to the ion ($M^+$) of the chemical marker (m/z of 232) is indicated by a "*".

The marked gasoline sample was analysed by laser ionization at different wavelengths (308 nm—pulsed energy density: 0.10 mJ/mm$^2$; 337 nm—pulsed energy density: 0.05 mJ/mm$^2$) coupled with mass spectrometry using the protocol described at item I.a conducted on the instrument described at item I.a (see FIG. 9a and FIG. 9b). The marked hexane was analyzed by laser ionization at 355 nm (pulsed laser density: 0.63 mJ/mm$^2$) coupled with ion mobility spectrometry (drift gas: helium; flow: 200 mL/min; drift tube voltage: 2.5 kV) using the protocol described at item I.b conducted on the instrument described at item I.b (see FIGS. 8b and 8h). The marked gasoline sample was analyzed by laser ionization at a wavelength of 337 nm (pulsed energy density: 0.05 mJ/mm$^2$) or 355 nm (pulsed laser density: 0.63 mJ/mm$^2$) coupled with ion mobility spectrometry (drift gas: nitrogen; flow: 200 mL/min; drift tube voltage: 6.5 kV) using the protocol described at item I.b conducted on the instrument described at item I.b (see FIG. 8d and FIG. 8c). The marked diesel sample was analyzed by laser ionization at 308 nm (pulsed laser density: 0.10 mJ/mm$^2$), or 355 nm (pulsed laser density: 0.63 mJ/mm$^2$) coupled with ion mobility spectrometry (drift gas: nitrogen; flow: 200 mL/min; drift tube voltage: 6.5 kV) using the protocol described at item I.b conducted on the instrument described at item I.b (see FIG. 8f and FIG. 8g).

For comparative purposes,
a sample of marked diesel, and a sample of marked hexane were analyzed by laser ionization at 266 nm (pulsed laser density: 0.13 mJ/mm$^2$) coupled with ion mobility spectrometry (drift gas: nitrogen; flow: 200 mL/min; drift tube voltage: 6.5 kV) using the protocol described at item I.b conducted on the instrument described at item I.b (see FIG. 8e), a sample of marked diesel, a sample of marked gasoline and a sample of marked hexane were analyzed by laser ionization at 406 nm (pulsed laser density: 0.04 mJ/mm$^2$) coupled with ion mobility spectrometry (drift gas: nitrogen; flow: 200 mL/min; drift tube voltage: 6.5 kV) using the protocol described at item I.b conducted on the instrument described at item I.b (see FIG. 8i), and a sample of marked gasoline and a sample of marked hexane were analyzed by APCI-IMS (see FIG. 8a) using the instrument and the protocol described at item II.b above.

Figure 8A:
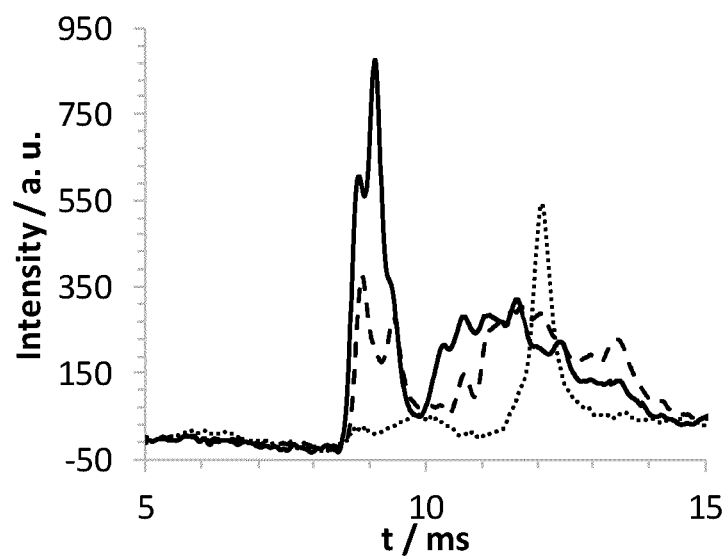
FIG. 8a illustrates for comparative purposes the superimposed ion mobility spectra of an unmarked gasoline (black continuous line), of the corresponding gasoline marked with the chemical marker 1,6-diphenyl-1,3,5-hexatriene (dashed black line) and of a composition of hexane containing the chemical marker 1,6-diphenyl-1,3,5-hexatriene at (dotted black line) obtained by atmospheric pressure chemical ionization coupled with ion mobility spectrometry.

FIG. 8a illustrates for comparative purposes the superimposed ion mobility spectra of an unmarked SP98 AVIA gasoline (black continuous line), of the corresponding gasoline marked with the chemical marker 1,6-diphenyl-1,3,5-hexatriene at a concentration of 10 µM (dashed black line) and of a composition of hexane containing the chemical marker 1,6-diphenyl-1,3,5-hexatriene at a concentration of 10 µM (dotted black line) obtained by atmospheric pressure chemical ionization coupled with ion mobility spectrometry (APCI-IMS; drift gas: nitrogen; flow: 200 mL/min; standard drift tube voltage). To minimize the contamination of the spectrometer, the unmarked gasoline was diluted in hexane (1:100, v/v) prior to the analysis. As shown by FIG. 8a, the ion mobility spectrum of the gasoline marked with the chemical marker 1,6-diphenyl-1,3,5-hexatriene is substantially identical with the ion mobility spectrum of the unmarked gasoline. Comparison of the ion mobility spectrum of the gasoline marked with the chemical marker 1,6-diphenyl-1,3,5-hexatriene and the ion mobility spectrum of the composition of hexane containing the same chemical marker shows that the peak of the chemical 1,6-diphenyl-1,3,5-hexatriene is masked by the peaks originating from the gasoline. These results demonstrate that unselective ionization methods coupled with ion mobility spectrometry do not allow the detection of the presence of the chemical marker 1,6-diphenyl-1,3,5-hexatriene in a gasoline matrix and therefore, are not suitable for authentication of a petroleum hydrocarbon allegedly marked with the chemical marker 1,6-diphenyl-1,3,5-hexatriene and/or for determining adulteration of a marked petroleum hydrocarbon containing the chemical marker 1,6-diphenyl-1,3,5-hexatriene.

FIG. 8b illustrates the superimposed ion mobility spectra of an unmarked SP98 AVIA gasoline (grey colored spectrum) and of a composition of hexane containing the chemical marker 1,6-diphenyl-1,3,5-hexatriene at a concentration of 10 µM (black colored spectrum) obtained by laser ionization at 355 nm (pulse energy density: 0.63 mJ/mm$^2$) coupled with ion mobility spectrometry (drift gas: helium; flow: 200 mL/min; drift tube voltage: 2.5 kV). To minimize the contamination of the spectrometer, the unmarked gasoline was diluted in hexane (1:100, v/v) prior to the analysis. The chemical marker 1,6-diphenyl-1,3,5-hexatriene is characterized by a drift time of about 7.0 ms. As attested by FIG. 8b, as gasoline generates a negligible noise when subjected to laser ionization at 355 nm (pulse energy density of 0.63 mJ/mm$^2$) coupled with ion mobility spectrometry that does not mask the peak corresponding to the chemical marker 1,6-diphenyl-1,3,5-hexatriene, the presence of said chemical marker can be easily detected in a marked gasoline thereof. Thus, illumination of a gasoline containing the marker 1,6-diphenyl-1,3,5-hexatriene with pulsed laser light of a wavelength of 355 nm (pulse energy density: 0.63 mJ/mm$^2$) coupled with ion mobility spectrometry is suitable for determining the authenticity of said gasoline.

FIG. 8c illustrates the superimposed spectra of a marked SP98 AVIA gasoline containing the chemical marker 1,6-diphenyl-1,3,5-hexatriene at a concentration of 100 µM (continuous line) and of a composition of hexane containing the chemical marker 1,6-diphenyl-1,3,5-hexatriene at a concentration of 100 µM (dotted line) obtained by laser ionization at 355 nm (pulse energy density: 0.63 mJ/mm$^2$) coupled with ion mobility spectrometry (LI-IMS; drift gas: nitrogen; flow: 200 mL/min; drift tube voltage: 6.5 kV). The chemical marker 1,6-diphenyl-1,3,5-hexatriene is characterized by a drift time of about 9.5 ms. As demonstrated by FIG. 8c, illumination of the marked gasoline containing the chemical marker 1,6-diphenyl-1,3,5-hexatriene with pulsed laser light of a wavelength of 355 nm (pulse energy density: 0.63 mJ/mm$^2$) results in selective ionization of the chemical marker 1,6-diphenyl-1,3,5-hexatriene, thereby enabling when coupled with ion mobility spectrometry the detection of the presence of the chemical marker 1,6-diphenyl-1,3,5-hexatriene in the marked gasoline and the authentication of the gasoline marked with said chemical marker.

Figure 8E:
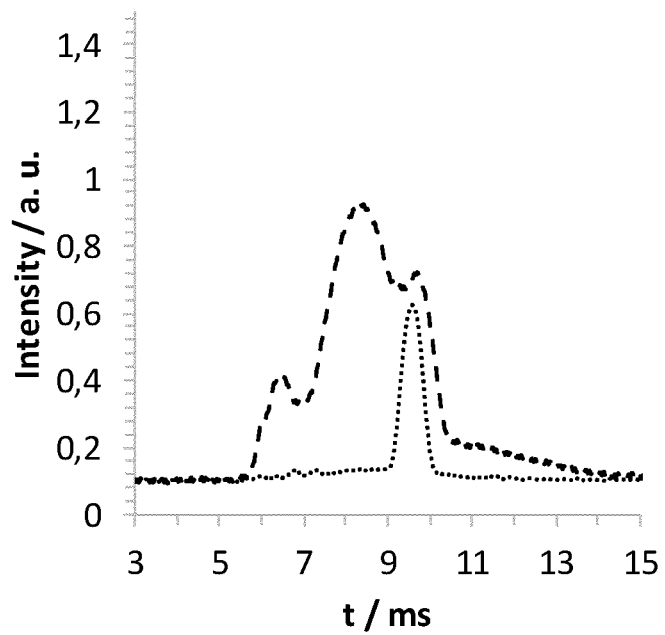
FIG. 8e illustrates for comparative purposes the superimposed ion mobility spectra of a marked diesel containing the chemical marker 1,6-diphenyl-1,3,5-hexatriene (dashed line) and of a composition of hexane containing the chemical marker 1,6-diphenyl-1,3,5-hexatriene (dotted line) obtained by laser ionization at 266 nm coupled with ion mobility spectrometry. The chemical marker 1,6-diphenyl-1,3,5-hexatriene is characterized by a drift time of about 9.5 ms.

FIG. 8d illustrates the superimposed spectra of a marked SP98 AVIA gasoline containing the chemical marker 1,6-diphenyl-1,3,5-hexatriene at a concentration of 100 µM (continuous line) and of a composition of hexane containing the chemical marker 1,6-diphenyl-1,3,5-hexatriene at a concentration of 100 µM (dotted line) obtained by laser ionization at 337 nm (pulse energy density: 0.05 mJ/mm$^2$) coupled with ion mobility spectrometry (LI-IMS; drift gas: nitrogen; flow: 200 mL/min; drift tube voltage: 6.5 kV). The chemical marker 1,6-diphenyl-1,3,5-hexatriene is characterized by a drift time of about 9.5 ms. As demonstrated by FIG. 8d, illumination of the marked gasoline containing the chemical marker 1,6-diphenyl-1,3,5-hexatriene with pulsed laser light of a wavelength of 337 nm (pulse energy density: 0.05 mJ/mm$^2$) results in selective ionization of the chemical marker 1,6-diphenyl-1,3,5-hexatriene, thereby enabling when coupled with ion mobility spectrometry the detection of the presence of the chemical marker 1,6-diphenyl-1,3,5-hexatriene in the marked gasoline and the authentication of the gasoline marked with said chemical marker FIG. 8e illustrates for comparative purposes the superimposed ion mobility spectra of a marked SOCAR diesel containing the chemical marker 1,6-diphenyl-1,3,5-hexatriene at a concentration of 100 µM (dashed line) and of a composition of hexane containing the chemical marker 1,6-diphenyl-1,3,5-hexatriene at a concentration of 100 µM (dotted line) obtained by laser ionization at 266 nm (pulse energy density: 0.13 mJ/mm$^2$) coupled with ion mobility spectrometry (LI-IMS; drift gas: nitrogen; flow: 200 mL/min; drift tube voltage: 6.5 kV). The chemical marker 1,6-diphenyl-1,3,5-hexatriene is characterized by a drift time of about 9.5 ms. Comparison of the ion mobility spectrum of the diesel marked with the chemical marker 1,6-diphenyl-1,3,5-hexatriene and the ion mobility spectrum of the composition of hexane containing the same chemical marker shows that the peak of the chemical marker 1,6-diphenyl-1,3,5-hexatriene is masked by the peaks originating from the diesel. These results demonstrate that illumination of the marked diesel containing the chemical marker 1,6-diphenyl-1,3,5-hexatriene with pulsed laser light of a wavelength of 266 nm (pulse energy density: 0.13 mJ/mm$^2$) results in unselective ionization of the sample and does not allow when coupled with ion mobility spectrometry the detection of the presence of the chemical marker 1,6-diphenyl-1,3,5-hexatriene in a diesel matrix. Thus, such method is not suitable for authenticating a petroleum hydrocarbon allegedly marked with the chemical marker 1,6-diphenyl-1,3,5-hexatriene and/or for determining adulteration of a marked petroleum hydrocarbon containing the chemical marker 1,6-diphenyl-1,3,5-hexatriene.

FIG. 8f illustrates the superimposed spectra of a marked SOCAR diesel containing the chemical marker 1,6-diphenyl-1,3,5-hexatriene at a concentration of 100 µM (dashed line) and of a composition of hexane containing the chemical marker 1,6-diphenyl-1,3,5-hexatriene at a concentration of 100 µM (dotted line) obtained by laser ionization at 308 nm (pulse energy density: 0.10 mJ/mm$^2$) coupled with ion mobility spectrometry (LI-IMS; drift gas: nitrogen; flow: 200 mL/min; drift tube voltage: 6.5 kV). The chemical marker 1,6-diphenyl-1,3,5-hexatriene is characterized by a drift time of about 9.5 ms. As demonstrated by FIG. 8f, illumination of the marked diesel containing the chemical marker 1,6-diphenyl-1,3,5-hexatriene with pulsed laser light of a wavelength of 308 nm (pulse energy density: 0.10 mJ/mm$^2$) results in selective ionization of the chemical marker 1,6-diphenyl-1,3,5-hexatriene, thereby enabling when coupled with ion mobility spectrometry the detection of the presence of the chemical marker 1,6-diphenyl-1,3,5-hexatriene in the marked diesel and the authentication of the diesel marked with said chemical marker.

FIG. 8g illustrates the superimposed spectra of a marked SOCAR diesel containing the chemical marker 1,6-diphenyl-1,3,5-hexatriene at a concentration of 100 µM (dashed line) and of a composition of hexane containing the chemical marker 1,6-diphenyl-1,3,5-hexatriene at a concentration of 100 µM (dotted line) obtained by laser ionization at 355 nm (pulse energy density: 0.63 mJ/mm$^2$) coupled with ion mobility spectrometry (LI-IMS; drift gas: nitrogen; flow: 200 mL/min; drift tube voltage: 6.5 kV). The chemical marker 1,6-diphenyl-1,3,5-hexatriene is characterized by a drift time of about 9.5 ms. As demonstrated by FIG. 8g, illumination of the marked diesel containing the chemical marker 1,6-diphenyl-1,3,5-hexatriene with pulsed laser light of a wavelength of 355 nm (pulse energy density: 0.63 mJ/mm$^2$) results in selective ionization of the chemical marker 1,6-diphenyl-1,3,5-hexatriene, thereby enabling when coupled with ion mobility spectrometry the detection of the presence of the chemical marker 1,6-diphenyl-1,3,5-hexatriene in the marked diesel and the authentication of the diesel marked with said chemical marker.

FIG. 8h illustrates the superimposed ion mobility spectra of an unmarked SOCAR diesel (grey colored spectrum) and of a composition of hexane containing the chemical marker 1,6-diphenyl-1,3,5-hexatriene at a concentration of 10 µM (black colored spectrum) obtained by laser ionization at 355 nm (pulse energy density: 0.63 mJ/mm$^2$) coupled with ion mobility spectrometry (drift gas: helium; flow: 200 mL/min; drift tube voltage: 2.5 kV). To minimize the contamination of the spectrometer, the unmarked diesel was diluted in hexane (1:100, v/v) prior to the analysis. The chemical marker 1,6-diphenyl-1,3,5-hexatriene is characterized by a drift time of about 7.0 ms. As attested by FIG. 8h, as diesel generates a negligible noise when subjected to laser ionization at 355 nm (pulse energy density: 0.63 mJ/mm$^2$) coupled with ion mobility spectrometry that does not mask the peak corresponding to the chemical marker 1,6-diphenyl-1,3,5-hexatriene, the presence of said chemical marker can be easily detected in a marked diesel thereof. Thus, illumination of a diesel containing the marker 1,6-diphenyl-1,3,5-hexatriene with pulsed laser light of a wavelength of 355 nm (pulse energy density: 0.63 mJ/mm$^2$) coupled with ion mobility spectrometry is suitable for determining the authenticity of said diesel.

Figure 8I:
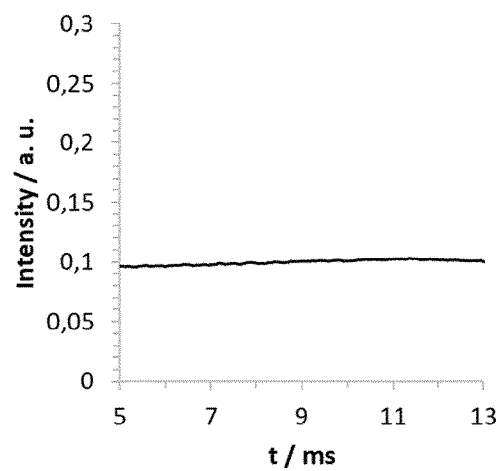
FIG. 8i illustrates for comparative purposes the ion mobility spectra of a marked gasoline containing the chemical marker 1,6-diphenyl-1,3,5-hexatriene (FIG. 8i i)—continuous line), a marked diesel containing the chemical marker 1,6-diphenyl-1,3,5-hexatriene (FIG. 8i ii)—dashed line) and of a composition of hexane containing the chemical marker 1,6-diphenyl-1,3,5-hexatriene (FIG. 6i iii)—dotted line) obtained by sample illumination with pulsed laser light having a wavelength of 406 nm coupled with ion mobility spectrometry.
Figure 8I:
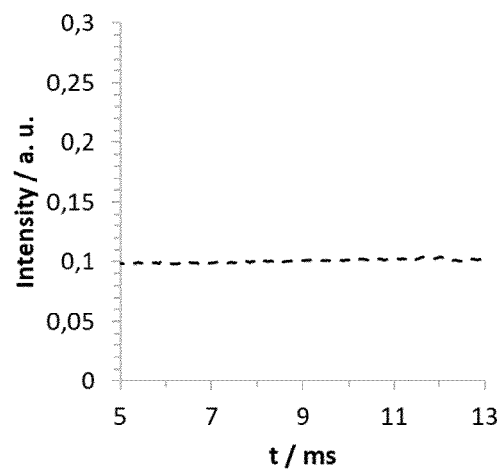
Figure 8I:
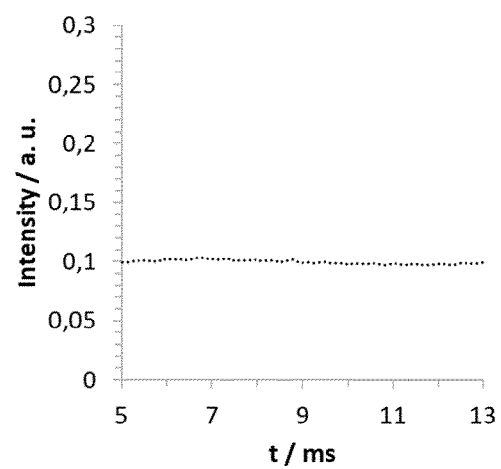

FIG. 8i illustrates for comparative purposes the ion mobility spectra of a marked SP98 AVIA gasoline containing the chemical marker 1,6-diphenyl-1,3,5-hexatriene at a concentration of 100 µM (FIG. 8i i)—continuous line), a marked SOCAR diesel containing the chemical marker 1,6-diphenyl-1,3,5-hexatriene at a concentration of 100 µM (FIG. 8i ii)—dashed line) and of a composition of hexane containing the chemical marker 1,6-diphenyl-1,3,5-hexatriene at a concentration of 100 µM (FIG. 6i iii)—dotted line) obtained by sample illumination with pulsed laser light having a wavelength of 406 nm (pulse energy density: 0.04 mJ/mm$^2$) coupled with ion mobility spectrometry (LI-IMS; drift gas: nitrogen; flow: 200 mL/min; drift tube voltage: 6.5 kV). As shown by FIG. 8i, illumination of the marked samples with pulsed laser light having a wavelength of 406 nm (pulse energy density: 0.04 mJ/mm$^2$) does not lead to sample ionization.

FIG. 9a illustrates the mass spectrum of a marked SP98 AVIA gasoline containing the chemical marker 1,6-diphenyl-1,3,5-hexatriene obtained by laser ionization at 308 nm (pulse energy density: 0.10 mJ/mm$^2$) coupled with mass spectrometry. To minimize the contamination of the mass spectrometer, the marked gasoline was diluted in hexane (1:100, v/v) prior to the analysis. Following dilution, the concentration of the chemical marker was of 500 nM. The peak corresponding to the ion (M$^+$) of the chemical marker (m/z of 232) is indicated by a "*". As attested by FIG. 9a, illumination of the marked gasoline containing the chemical marker 1,6-diphenyl-1,3,5-hexatriene with pulsed laser light of a wavelength of 308 nm (pulse energy density: 0.10 mJ/mm$^2$) results in the selective ionization of the chemical marker 1,6-diphenyl-1,3,5-hexatriene, thereby enabling the easy detection of the presence of said chemical marker at low concentration in a marked gasoline and the authentication of the gasoline containing said chemical marker. The poor ionization of the gasoline matrix upon illumination with pulsed laser light of a wavelength of 308 nm (pulse energy density: 0.10 mJ/mm$^2$) leads to a negligible noise in the mass spectrum that does not interfere with the detection of the chemical marker 1,6-diphenyl-1,3,5-hexatriene.

FIG. 9b illustrates the mass spectrum of a marked SP98 AVIA gasoline containing the chemical marker 1,6-diphenyl-1,3,5-hexatriene obtained by laser ionization at 337 nm (pulse energy density: 0.05 mJ/mm$^2$) coupled with mass spectrometry. To minimize the contamination of the mass spectrometer, the marked gasoline was diluted in hexane (1:100, v/v) prior to the analysis. Following dilution, the concentration of the chemical marker was of 500 nM. The peak corresponding to the ion (M$^+$) of the chemical marker (m/z of 232) is indicated by a "*". As attested by FIG. 9b, illumination of the marked gasoline containing the chemical marker 1,6-diphenyl-1,3,5-hexatriene with pulsed laser light of a wavelength of 337 nm (pulse energy density: 0.05 mJ/mm$^2$) results in the selective ionization of the chemical marker 1,6-diphenyl-1,3,5-hexatriene, thereby enabling the easy detection of the presence of said chemical marker at low concentration in a marked gasoline and the authentication of the gasoline containing said chemical marker. The poor ionization of the gasoline matrix upon illumination with pulsed laser light of a wavelength of 337 nm (pulse energy density: 0.05 mJ/mm$^2$) leads to a negligible noise in the mass spectrum that does not interfere with the detection of the chemical marker 1,6-diphenyl-1,3,5-hexatriene.

Example 6: Detection and Quantification of the Chemical Marker 5,6,11,12-tetraphenylnaphthacene in a Petroleum Hydrocarbon The authenticity and adulteration of petroleum hydrocarbons marked with the chemical marker 5,6,11,12-tetraphenylnaphthacene (rubrene) (CAS no.: 517-51-1; Sigma Aldrich, 98%) were tested.

For petroleum hydrocarbon marking, a concentrate of 5,6,11,12-tetraphenylnaphthacene (rubrene) in toluene was prepared to a concentration of 1 mmol/L and added to diesel to yield a marked diesel sample and to gasoline to yield a marked gasoline sample.

Figure 10A:
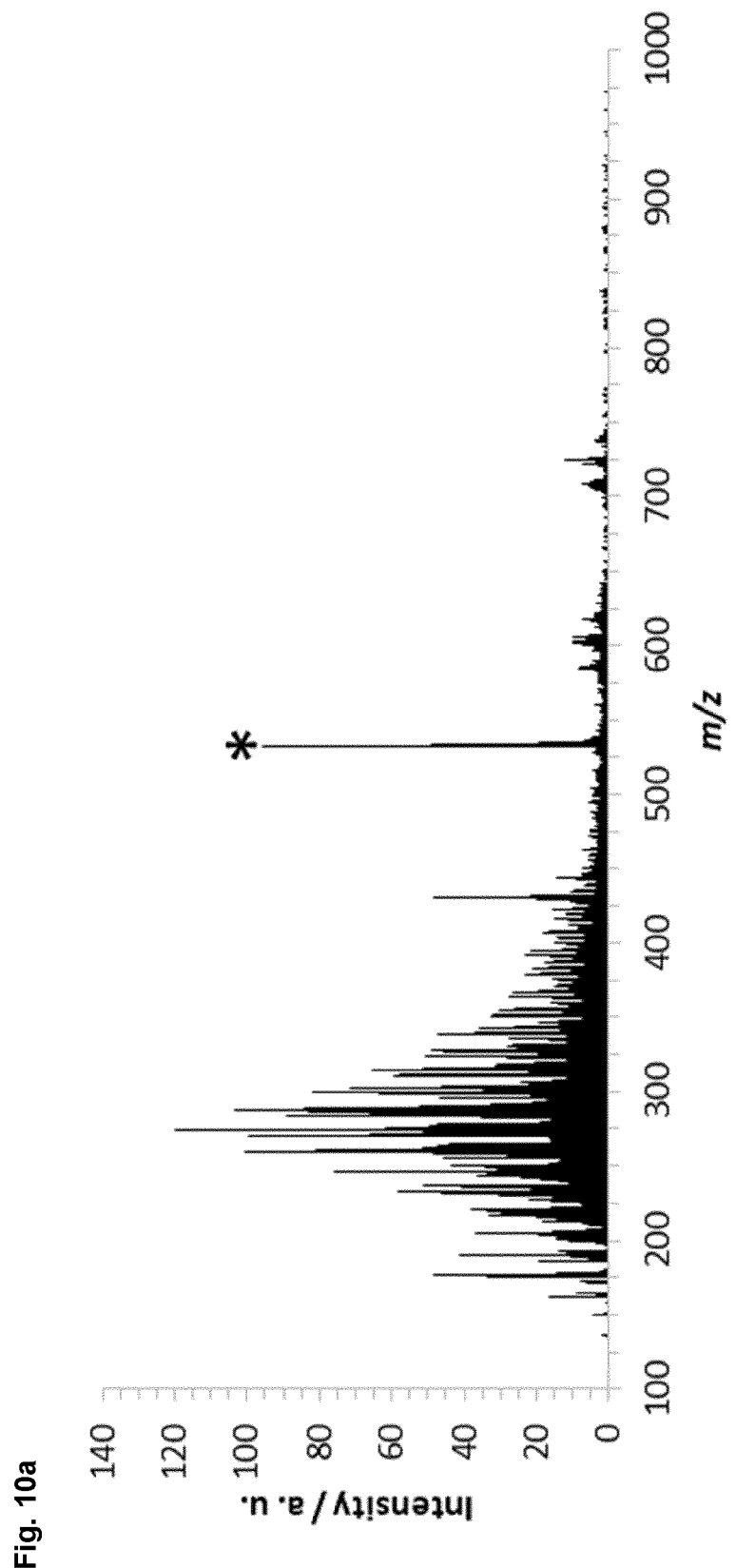
FIG. 10a illustrates the mass spectrum of a marked diesel containing the chemical marker 5,6,11,12-tetraphenylnaphthacene obtained by laser ionization at 355 nm coupled with mass spectrometry. The peak corresponding to the ion ($M^+$) of the chemical marker 5,6,11,12-tetraphenylnaphthacene (m/z of 532) is indicated by a "*".
Figure 10B:
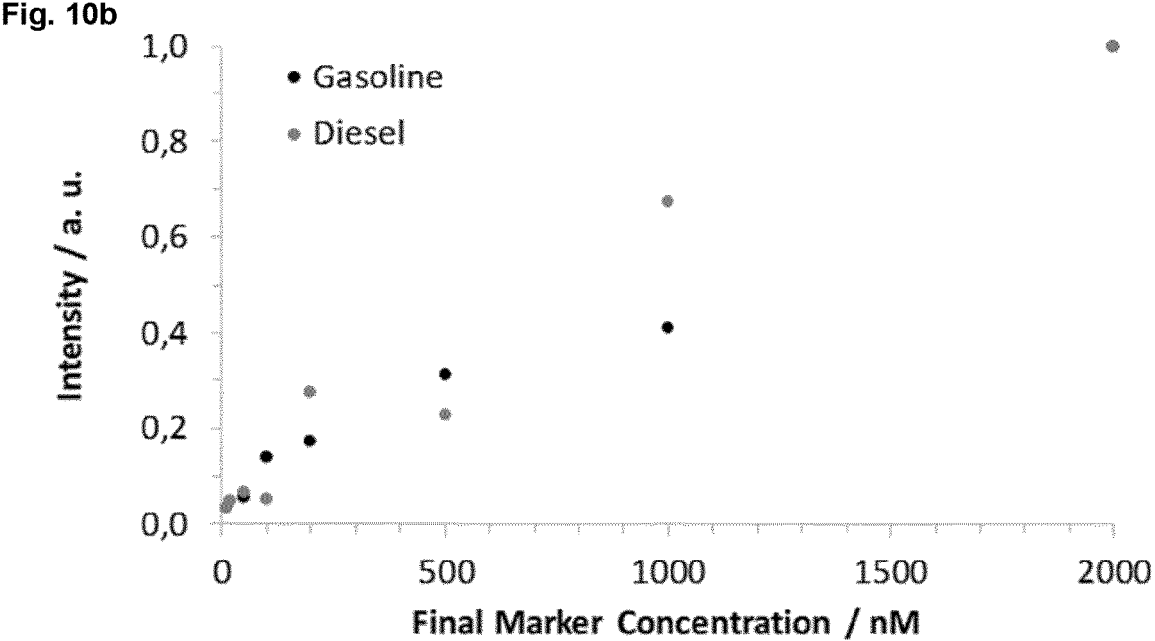
FIG. 10b illustrates the variation of the intensity of the peak corresponding to the ion ($M^+$) of the chemical marker 5,6,11,12-tetraphenylnaphthacene with the concentration of the chemical marker 5,6,11,12-tetraphenylnaphthacene in a marked diesel and a marked gasoline. The different compositions were analyzed by laser ionization at 355 nm coupled with mass spectrometry.

Samples of marked diesel and marked gasoline were analyzed by laser ionization at a wavelength of 355 nm (pulsed laser density: 0.63 mJ/mm$^2$) coupled with mass spectrometry using the protocol described at item I.a conducted on the instrument described at item I.a (see FIGS. 10a and 10b).

FIG. 10a illustrates the mass spectrum of a marked SOCAR diesel containing the chemical marker 5,6,11,12-tetraphenylnaphthacene obtained by laser ionization at 355 nm (pulse energy density: 0.63 mJ/mm$^2$) coupled with mass spectrometry. To minimize the contamination of the mass spectrometer, the marked diesel was diluted in hexane (1:100, v/v) prior to the analysis. Following dilution, the concentration of the chemical marker in the sample was of 50 nM. The peak corresponding to the ion (M$^+$) of the chemical marker 5,6,11,12-tetraphenylnaphthacene (m/z of 532) is indicated by a "*". As attested by FIG. 10a, illumination of the marked diesel containing the chemical marker 5,6,11,12-tetraphenylnaphthacene with pulsed laser light of a wavelength of 355 nm (pulse energy density: 0.63 mJ/mm$^2$) results in the selective ionization of said chemical marker, thereby enabling the easy detection of the presence of said chemical marker at low concentration in a marked diesel and the authentication of the diesel containing said chemical marker. The poor ionization of the diesel matrix upon illumination with pulsed laser light of a wavelength of 355 nm (pulse energy density: 0.63 mJ/mm$^2$) leads to a noise in the mass spectrum that does not interfere with the detection of the chemical marker 5,6,11,12-tetraphenylnaphthacene.

FIG. 10b illustrates the variation of the intensity of the peak corresponding to the ion (M⁺) of the chemical marker 5,6,11,12-tetraphenylnaphthacene with the concentration of the chemical marker 5,6,11,12-tetraphenylnaphthacene in a marked SOCAR diesel and a marked SP98 AVIA gasoline. The different compositions were analyzed by laser ionization at 355 nm (pulse energy density: 0.63 mJ/mm²) coupled with mass spectrometry. To avoid contamination of the mass spectrometer, the compositions were diluted in hexane (1:100, v/v) prior to the analysis. The linearity of the two calibration curves proves that the methods according to the present invention relying on illumination of the marked petroleum hydrocarbon with pulse laser light of a wavelength of 355 nm coupled with mass spectrometry enable the detection of the presence and quantification of the 5,6,11,12-tetraphenylnaphthacene in a variety of petroleum hydrocarbons, including diesel and gasoline, and consequently, the determination of the adulteration of a petroleum hydrocarbon marked with 5,6,11,12-tetraphenylnaphthacene.

Example 7: Study of the Influence of the Petroleum Hydrocarbon Matrix on Ionization Selectivity A concentrate of $N^1,N^1,N^4,N^4$-tetramethyl benzene-1,4-diamine in hexane was prepared to a concentration of 10 mmol/L and added to different diesel brands (Diesel Socar, AGIP Diesel Tech, SHELL V-power Diesel, BP Diesel and Diesel AVIA) and different gasoline brands (SP98 AVIA, SP95 BP technology active, SP95 AVIA, SP98 Socar, SP95 Socar, SP95 AGIP, SHELL V-Power 100, SP95 SHELL, SP98 TAMOIL, SP95 TAMOIL and AGIP Ethanol 85) to yield marked diesel samples and marked gasoline samples containing the chemical marker at a concentration of 1 µM.

Figure 11:
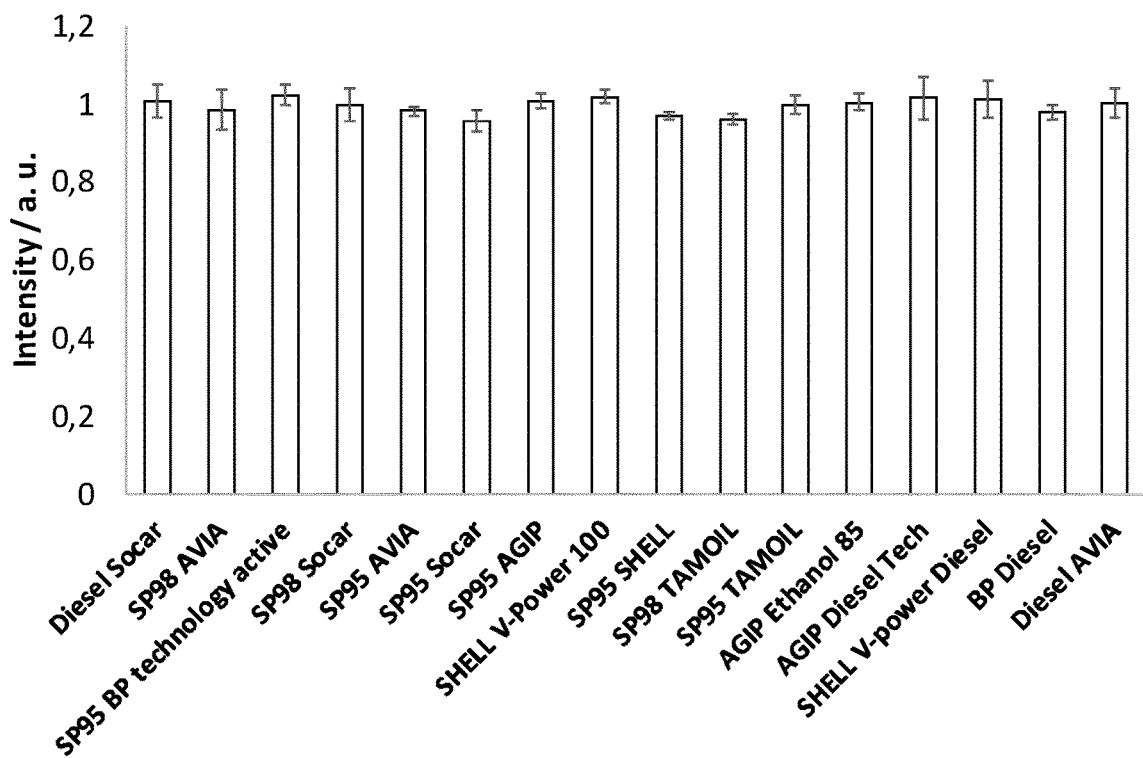
FIG. 11 illustrates the intensity of the drift time peak of the chemical marker $N^1,N^1,N^4,N^4$-tetramethyl benzene-1,4-diamine for a variety of different brands of marked diesel (Diesel Socar, AGIP Diesel Tech, SHELL V-power Diesel, BP Diesel and Diesel AVIA) and marked gasoline (SP98 AVIA, SP95 BP technology active, SP95 AVIA, SP98 Socar, SP95 Socar, SP95 AGIP, SHELL V-Power 100, SP95 SHELL, SP98 TAMOIL, SP95 TAMOIL and AGIP Ethanol 85). Each of the above-listed marked diesels and gasolines contains the chemical marker $N^1,N^1,N^4,N^4$-tetramethyl benzene-1,4-diamine at a concentration of 1 µM.

The sixteen different samples were analyzed by laser ionization at 355 nm (pulsed laser density: 0.63 mJ/mm²) coupled with ion mobility spectrometry (drift gas: helium; flow: 200 mL/min; drift tube voltage: 2.5 kV) using the protocol described at item I.b conducted on the instrument described at item I.b. Each measurement was conducted three times. FIG. 11 illustrates the intensity of the drift time peak of the chemical marker $N^1,N^1,N^4,N^4$-tetramethyl benzene-1,4-diamine for the different brands of marked diesel and marked gasoline. The negligible difference, which reflects also the sample preparation error and the sample manual injection error, between the chemical marker intensity in different brands of marked petroleum hydrocarbons proves that the inventive method described herein is extremely robust and matrix agnostic and enables the detection of the chemical marker described herein in a variety of different petroleum hydrocarbons.

The invention claimed is:

1. A method for determining authenticity of a petroleum hydrocarbon, wherein the petroleum hydrocarbon comprises at least one chemical marker, wherein said at least one chemical marker is selected from:

i) a compound of general formula (I)

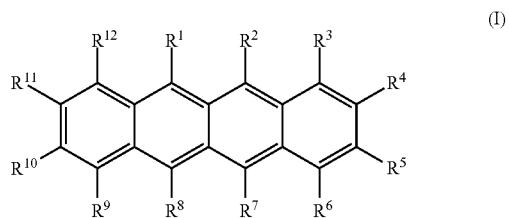

(I)

wherein
the residues $R^1$-$R^{12}$ are independently of each other selected from the group consisting of hydrogen, $C_1$-$C_4$-alkyl,

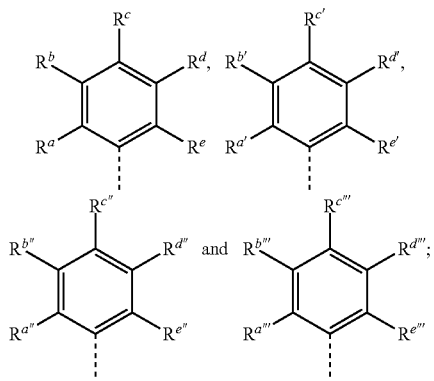

the residues $R^a$-$R^e$, $R^{a'}$-$R^{e'}$, $R^{a''}$-$R^{e''}$ and $R^{a'''}$-$R^{e'''}$ are independently of each other selected from the group consisting of hydrogen and $C_1$-$C_4$-alkyl, with the proviso that at least two of the residues $R^1$-$R^{12}$ are selected from:

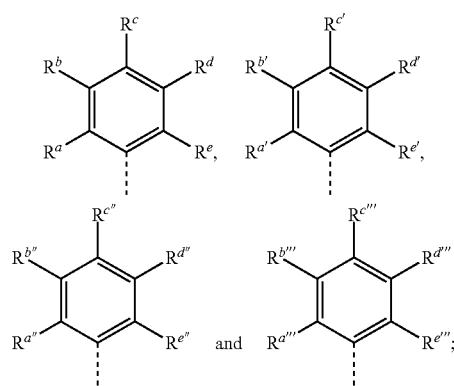

ii) a compound of general formula (II)

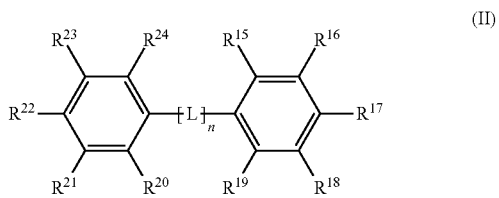

(II)

wherein
the residue -L- represents —CR$^{13}$═CR$^{14}$—;
the residues R$^{13}$ and R$^{14}$ are independently of each other selected from the group consisting of hydrogen and methyl;
the residues R$^{15}$-R$^{24}$ are independently of each other selected from the group consisting of hydrogen and C$_1$-C$_4$ alkyl;
and n is an integer comprised between 2 and 6;
iii) an aromatic compound substituted by one or more N,N-disubstituted amino groups, wherein the substituents of the one or more N,N-disubstituted amino groups are independently of each other selected from C$_1$-C$_6$-alkyl or the two substituents of a N,N-disubstituted amino group taken together form a residue —(CH$_2$)$_p$—, wherein p is an integer comprised between 2 and 6;
and
iv) an aromatic compound substituted by at least one group selected from C$_1$-C$_4$-alkyloxy;
wherein the method comprises the following steps:
  a-1) acquiring a sample of the petroleum hydrocarbon;
  b-1) vaporizing said sample to provide a gaseous sample;
  c-1) illuminating the gaseous sample with a pulsed laser light of a predetermined wavelength of between about 300 nm and about 370 nm, thereby producing gaseous ions; and
  d-1) analyzing the gaseous ions obtained at step c-1) by ion mobility spectrometry or mass spectrometry to detect a presence or an absence of said at least one chemical marker in the petroleum hydrocarbon, and thereby determining the authenticity of said petroleum hydrocarbon.

2. The method according to claim 1, further comprising step f) conducted between step a-1) and step b-1):
  f) diluting the sample with an organic solvent.

3. The method according to claim 2, wherein the organic solvent is selected from the group consisting of pentane, hexane, heptane, octane, toluene, ethanol, methanol, isopropanol, acetone, dimethylformamide, and mixtures thereof.

4. The method according to claim 1, wherein vaporizing the sample to provide a gaseous sample is achieved by: thermal desorption, laser desorption or evaporation in an injector of a gas chromatograph.

5. The method according to claim 1, wherein the predetermined wavelength of the pulsed laser light is about 308 nm, about 337 nm, or about 355 nm.

6. The method according to claim 5, wherein the predetermined wavelength of the pulsed laser light is about 355 nm.

7. The method according to claim 1, wherein the at least one chemical marker is of general formula (I) and in said general formula the residue R$^1$
represents

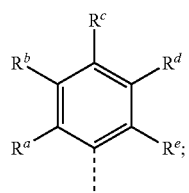

and the residues R$^2$-R$^{12}$ and R$^a$-R$^e$ have the meanings as defined in claim 1.

8. The method according to claim 7, wherein in general formula (I)
the residue R$^7$ represents

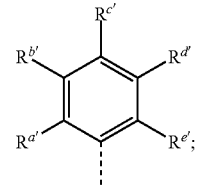

or
the residue R$^8$ represents

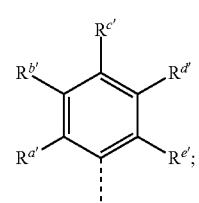

or
the residue R$^2$ represents

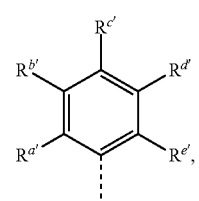

the residue R$^7$ represents

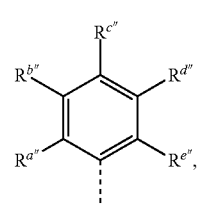

and the residue R$^8$ represents

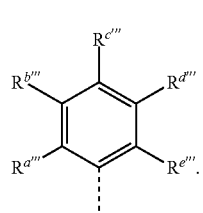

9. The method according to claim 1, wherein the at least one chemical marker is of general formula (II) and in said general formula (II), m out of the n double bonds —$CR^{13}$=$CR^{14}$— present a Z stereochemistry and n-m out of n double bonds —$CR^{13}$=$CR^{14}$— present an E stereochemistry, wherein m is an integer comprised between 0 and 6 and m≤n.

10. The method according to claim 9, wherein m represents 0.

11. The method according to claim 1, wherein the at least one chemical marker is a compound of general formula (III)

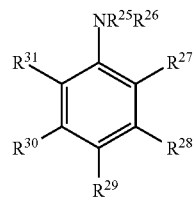

(III)

wherein
the substituents $R^{25}$ and $R^{26}$ are independently of each other selected from $C_1$-$C_6$-alkyl, or alternatively the substituents $R^{25}$ and $R^{26}$ taken together form a residue —$(CH_2)_p$—, with p being an integer comprised between 2 and 6;
the residues $R^{27}$ and $R^{28}$ are independently of each other selected from the group consisting of hydrogen, $C_1$-$C_6$-alkyl, —$NR^{32}R^{33}$ and —$NR^{34}R^{35}$, wherein
the substituents $R^{32}$ and $R^{33}$ are independently of each other selected from $C_1$-$C_6$-alkyl, or alternatively the substituents $R^{32}$ and $R^{33}$ taken together form a residue —$(CH_2)_{p1}$—, with p1 being an integer comprised between 2 and 6, and
the substituents $R^{34}$ and $R^{35}$ are independently of each other selected from $C_1$-$C_6$-alkyl, or alternatively the substituents $R^{34}$ and $R^{35}$ taken together form a residue —$(CH_2)_{p2}$—, with p2 being an integer comprised between 2 and 6; and
wherein
A. the residues $R^{29}$, $R^{30}$ and $R^{31}$ are independently of each other selected from the group consisting of hydrogen, $C_1$-$C_6$-alkyl, —$NR^{36}R^{37}$, —$NR^{38}R^{39}$ and —$NR^{40}R^{41}$; or
B. the residue $R^{29}$ is selected from the group consisting of hydrogen, $C_1$-$C_6$-alkyl and —$NR^{36}R^{37}$, and the residues $R^{30}$ and $R^{31}$ taken together form with the adjacent aromatic ring a 6-membered aromatic ring, optionally substituted by a group —$NR^{38}R^{39}$; or
C. the residue $R^{31}$ is selected from the group consisting of hydrogen, $C_1$-$C_6$-alkyl and —$NR^{36}R^{37}$, and the residues $R^{29}$ and $R^{30}$ taken together form with the adjacent aromatic ring a 6-membered aromatic ring, optionally substituted by a group —$NR^{38}R^{39}$;
wherein
the substituents $R^{36}$ and $R^{37}$ are independently of each other selected from $C_1$-$C_6$-alkyl, or alternatively the substituents $R^{36}$ and $R^{37}$ taken together form a residue —$(CH_2)_{p3}$—, with p3 being an integer comprised between 2 and 6,
the substituents $R^{38}$ and $R^{39}$ are independently of each other selected from $C_1$-$C_6$-alkyl, or alternatively the substituents $R^{38}$ and $R^{39}$ taken together form a residue —$(CH_2)_{p4}$—, with p4 being an integer comprised between 2 and 6, and
the substituents $R^{40}$ and $R^{41}$ are independently of each other selected from $C_1$-$C_6$-alkyl, or alternatively the substituents $R^{40}$ and $R^{41}$ taken together form a residue —$(CH_2)_{p5}$—, with p5 being an integer comprised between 2 and 6.

12. The method according to claim 1, wherein the at least one chemical marker is a compound of general formula (III-a)

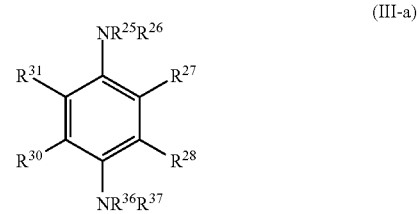

(III-a)

wherein
the residues $R^{27}$ and $R^{28}$ are independently of each other selected from the group consisting of hydrogen and $C_1$-$C_6$-alkyl;
the residues $R^{30}$ and $R^{31}$ are independently of each other selected from the group consisting of hydrogen and $C_1$-$C_6$-alkyl, or the residues $R^{30}$ and $R^{31}$ taken together form with the adjacent aromatic ring a 6-membered aromatic ring, optionally substituted by a group —$NR^{38}R^{39}$;
the substituents $R^{25}$ and $R^{26}$ are independently of each other selected from $C_1$-$C_6$-alkyl, or alternatively the substituents $R^{25}$ and $R^{26}$ taken together form a residue —$(CH_2)_p$—, with p being an integer comprised between 2 and 6;
the substituents $R^{36}$ and $R^{37}$ are independently of each other selected from $C_1$-$C_6$-alkyl, or alternatively the substituents $R^{36}$ and $R^{37}$ taken together form a residue —$(CH_2)_{p3}$—, with p3 being an integer comprised between 2 and 6; and
the substituents $R^{38}$ and $R^{39}$ are independently of each other selected from $C_1$-$C_6$-alkyl, or alternatively the substituents $R^{38}$ and $R^{39}$ taken together form a residue —$(CH_2)_{p4}$—, with p4 being an integer comprised between 2 and 6.

13. The method according to claim 1, wherein the at least one chemical marker is a compound of general formula (IV)

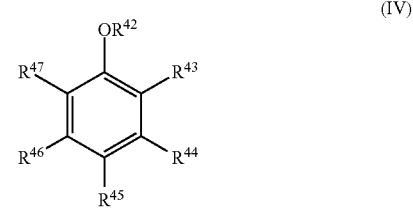

(IV)

wherein
D. the residue $R^{42}$ is selected from $C_1$-$C_4$-alkyl; the residues $R^{43}$, $R^{44}$, $R^{46}$ and $R^{47}$ are independently of each other selected from the group consisting of hydrogen, $C_1$-$C_4$-alkyl, $C_1$-$C_4$-alkyloxy; and the residue $R^{45}$ is selected from the group consisting of hydrogen, $C_1$-$C_4$-alkyl, $C_1$-$C_4$-alkyloxy, phenyl optionally substituted by one or more groups selected from $C_1$-$C_4$-alkyl and $C_1$-$C_4$-alkyloxy, and biphenyl optionally substituted by one or more groups selected from $C_1$-$C_4$-alkyl and $C_1$-$C_4$-alkyloxy; or E. the residue $R^{42}$ is selected from $C_1$-$C_4$-alkyl; the residues $R^{43}$ and $R^{44}$ form with the adjacent carbon atoms of the aromatic ring a 6-membered aromatic ring or a 10-membered bi-cyclic aromatic ring, optionally substituted by one or more groups selected from $C_1$-$C_4$-alkyl and $C_1$-$C_4$-alkyloxy; and the substituents $R^{45}$-$R^{47}$ are independently of each other selected from the group consisting of hydrogen, $C_1$-$C_4$-alkyl and $C_1$-$C_4$-alkyloxy; or F. the residue $R^{42}$ is selected from $C_1$-$C_4$-alkyl; the residues $R^{44}$ and $R^{45}$ form with the adjacent carbon atoms of the aromatic ring a 6-membered aromatic ring or a 10-membered bi-cyclic aromatic ring, optionally substituted by one or more groups selected from $C_1$-$C_4$-alkyl and $C_1$-$C_4$-alkyloxy; and the substituents $R^{43}$, $R^{46}$ and $R^{47}$ are independently of each other selected from the group consisting of hydrogen, $C_1$-$C_4$-alkyl and $C_1$-$C_4$-alkyloxy; or G. the residue $R^{42}$ is selected from $C_1$-$C_4$-alkyl; the residues $R^{43}$ and $R^{44}$ form with the adjacent carbon atoms of the aromatic ring a 6-membered aromatic ring, optionally substituted by one or more groups selected from $C_1$-$C_4$-alkyl and $C_1$-$C_4$-alkyloxy; the residues $R^{46}$ and $R^{47}$ form with the adjacent carbon atoms of the aromatic ring a 6-membered aromatic ring, optionally substituted by one or more groups selected from $C_1$-$C_4$-alkyl and $C_1$-$C_4$-alkyloxy; and the residue $R^{45}$ is selected from the group consisting of hydrogen, $C_1$-$C_4$-alkyl and $C_1$-$C_4$-alkyloxy; or H. the residue $R^{42}$ is selected from $C_1$-$C_4$-alkyl; the residues $R^{43}$ and $R^{44}$ form with the adjacent carbon atoms of the aromatic ring a 6-membered aromatic ring, optionally substituted by one or more groups selected from $C_1$-$C_4$-alkyl and $C_1$-$C_4$-alkyloxy; the residues $R^{45}$ and $R^{46}$ form with the adjacent carbon atoms of the aromatic ring a 6-membered aromatic ring, optionally substituted by one or more groups selected from $C_1$-$C_4$-alkyl and $C_1$-$C_4$-alkyloxy; and the residue $R^{47}$ is selected from the group consisting of hydrogen, $C_1$-$C_4$-alkyl and $C_1$-$C_4$-alkyloxy.

14. The method according to claim 1, wherein the at least one chemical marker is a compound of general formula (IV-a)

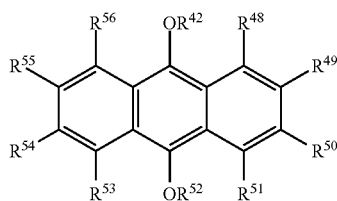

(IV-a)

wherein
the residues $R^{42}$ and $R^{52}$ are independently of each other selected from $C_1$-$C_4$-alkyl;
the residues $R^{48}$-$R^{51}$ and $R^{53}$-$R^{56}$ are independently of each other selected from the group consisting of hydrogen and $C_1$-$C_4$-alkyl.

15. The method according to claim 1, wherein the petroleum hydrocarbon is selected from: crude oil, lubricating oil, mineral oil, brake fluid, gasoline, diesel fuel, kerosene, jet fuel, heating oil and heavy fuel oil.

16. A method for determining adulteration of a marked petroleum hydrocarbon comprising a petroleum hydrocarbon and at least one chemical marker, wherein said at least one chemical marker is selected from:

i) a compound of general formula (I)

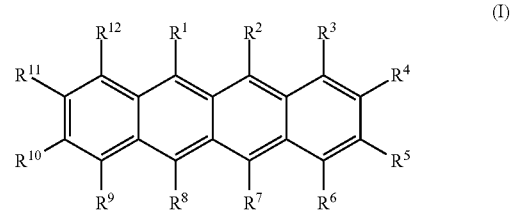

(I)

wherein
the residues $R^1$-$R^{12}$ are independently of each other selected from the group consisting of hydrogen, $C_1$-$C_4$-alkyl,

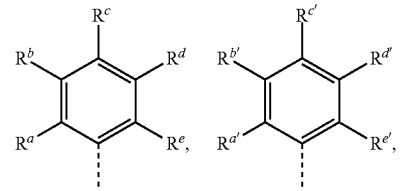

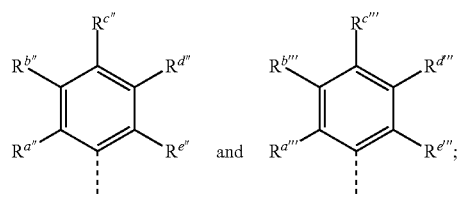

the residues $R^a$-$R^e$, $R^{a'}$-$R^{e'}$, $R^{a''}$-$R^{e''}$ and $R^{a'''}$-$R^{e'''}$ are independently of each other selected from the group consisting of hydrogen and $C_1$-$C_4$-alkyl, with the proviso that at least two of the residues $R^1$-$R^{12}$ are selected from:

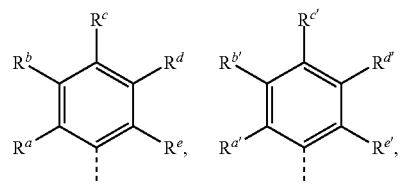

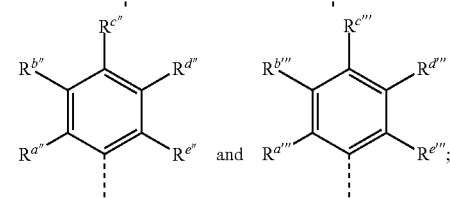

ii) a compound of general formula (II)

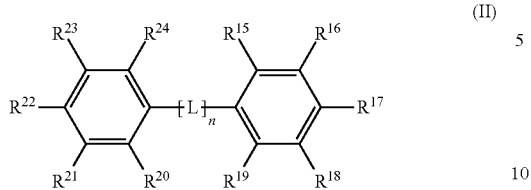

wherein
the residue -L- represents —CR$^{13}$=CR$^{14}$—;
the residues R$^{13}$ and R$^{14}$ are independently of each other selected from the group consisting of hydrogen and methyl;
the residues R$^{15}$-R$^{24}$ are independently of each other selected from the group consisting of hydrogen and C$_1$-C$_4$ alkyl;
and n is an integer comprised between 2 and 6;
iii) an aromatic compound substituted by one or more N,N-disubstituted amino groups, wherein the substituents of the one or more N,N-disubstituted amino groups are independently of each other selected from C$_1$-C$_6$-alkyl or the two substituents of a N,N-disubstituted amino group taken together form a residue —(CH$_2$)$_p$—, wherein p is an integer comprised between 2 and 6;
and
iv) an aromatic compound substituted by at least one group selected from C$_1$-C$_4$-alkyloxy, and
wherein the method comprises the following steps:
a-2) acquiring a sample of the marked petroleum hydrocarbon;
b-2) vaporizing said sample to provide a gaseous sample;
c-2) illuminating the gaseous sample with a pulsed laser light of a predetermined wavelength of between about 300 nm and about 370 nm, thereby producing gaseous ions;
d-2) analyzing the gaseous ions obtained at step c-2) by ion mobility spectrometry or mass spectrometry to determine a concentration of said at least one chemical marker in the marked petroleum hydrocarbon; and
e-2) determining adulteration of the marked petroleum hydrocarbon by comparing the concentration determined at item d-2) with a concentration of the at least one chemical marker in an unadulterated sample of the marked petroleum hydrocarbon.

17. The method according to claim 16, further comprising step f) conducted between step a-2) and step b-2):
f) diluting the sample with an organic solvent.

* * * * *